United States Patent
Smith

(10) Patent No.: US 12,438,504 B2
(45) Date of Patent: Oct. 7, 2025

(54) AUTO-ENGAGING ELECTRICAL CONNECTIONS FOR SOLAR PANELS

(71) Applicant: Sarcos Corp., Salt Lake City, UT (US)

(72) Inventor: Fraser M. Smith, Salt Lake City, UT (US)

(73) Assignee: Sacros Corp., Salt Lake City, UT (US)

( * ) Notice: Subject to any disclaimer, the term of this patent is extended or adjusted under 35 U.S.C. 154(b) by 0 days.

(21) Appl. No.: 18/810,236

(22) Filed: Aug. 20, 2024

(65) Prior Publication Data

US 2024/0413793 A1     Dec. 12, 2024

Related U.S. Application Data

(62) Division of application No. 18/094,983, filed on Jan. 9, 2023.

(51) Int. Cl.
*H02S 40/36*     (2014.01)
*H02S 30/10*     (2014.01)

(52) U.S. Cl.
CPC .............. *H02S 40/36* (2014.12); *H02S 30/10* (2014.12)

(58) Field of Classification Search
CPC .................................. H02S 40/36; H02S 30/10
See application file for complete search history.

(56) References Cited

U.S. PATENT DOCUMENTS 3,893,647  A    7/1975   Kennedy
4,611,090  A    9/1986   Catella et al.
6,325,749  B1  12/2001   Inokuchi et al.

(Continued)

FOREIGN PATENT DOCUMENTS

CN    205901664 U    1/2017
CN    109573509 A    4/2019

(Continued)

OTHER PUBLICATIONS

Enphase Energy, "Installation and Operations Manual: Enphase Micro-Inverter Models M190-72-208 and M190-72-240", [online], 2009. Retrieved from the Internet:<URL: https://s3.amazonaws.com/RealGoods/products/documentation/m190usermanual0-42680.pdf>, pp. 1-27. (Year: 2009).*

(Continued)

*Primary Examiner* — Tae-Sik Kang
(74) *Attorney, Agent, or Firm* — Christopher L. Johnson

(57) ABSTRACT

A solar panel and a solar panel mount system for electrically connecting the solar panel to a solar panel mount upon installation of the solar panel within the solar panel mount. The solar panel can comprise a photovoltaic cell, a support structure in support of the photovoltaic cell, and an auto-connecting electrical contact system comprising a panel electrical contact coupled to the support structure. The solar panel mount system can comprise the solar panel, the solar panel mount, and an auto-connecting electrical contact system operable to electrically connect the solar panel with the solar panel mount. The auto-connecting electrical contact system can include a panel electrical contact coupled to the solar panel and a mount electrical contact coupled to the solar panel mount. The panel electrical contact can be operable to electrically connect with the mount electrical contact upon installing the solar panel within the solar panel mount.

23 Claims, 29 Drawing Sheets

(56) References Cited

U.S. PATENT DOCUMENTS

| | | |
|---|---|---|
| 7,447,605 B2 | 11/2008 | Kuehnrich |
| 8,522,490 B1 | 9/2013 | Stancel |
| 8,567,134 B1 | 10/2013 | Grushkowitz et al. |
| 9,733,646 B1 | 8/2017 | Nusser et al. |
| 10,696,451 B2 | 6/2020 | Britcher et al. |
| 10,801,755 B1 | 10/2020 | Nemat et al. |
| 11,331,799 B1 | 5/2022 | Shafer |
| 11,502,638 B2 | 11/2022 | Watson et al. |
| 11,979,107 B2 | 5/2024 | Watson et al. |
| 2008/0149170 A1* | 6/2008 | Hanoka ............... H02S 40/36 136/251 |
| 2009/0320389 A1* | 12/2009 | White ................... H02S 40/36 52/173.3 |
| 2010/0096073 A1 | 4/2010 | Adriani et al. |
| 2011/0000544 A1 | 1/2011 | West |
| 2011/0005581 A1 | 1/2011 | Kanbara et al. |
| 2011/0073733 A1 | 3/2011 | Hartelius et al. |
| 2011/0162639 A1 | 7/2011 | Jeandeaud |
| 2011/0303262 A1 | 12/2011 | Wolter |
| 2012/0027550 A1 | 2/2012 | Bellacicco et al. |
| 2012/0048345 A1 | 3/2012 | Wood et al. |
| 2012/0142221 A1 | 6/2012 | Naskali |
| 2013/0019925 A1 | 1/2013 | Britcher et al. |
| 2015/0093190 A1 | 4/2015 | Header |
| 2015/0200621 A1 | 7/2015 | Reed et al. |
| 2016/0190976 A1 | 6/2016 | Corio et al. |
| 2016/0344330 A1 | 11/2016 | Gillis |
| 2017/0229998 A1 | 8/2017 | Molina et al. |
| 2017/0250648 A1 | 8/2017 | Haas et al. |
| 2017/0359017 A1 | 12/2017 | Corio |
| 2018/0072168 A1 | 3/2018 | Heinen et al. |
| 2019/0074792 A1 | 3/2019 | Hakenberg |
| 2019/0341878 A1 | 11/2019 | Watson et al. |
| 2020/0274480 A1 | 8/2020 | Lutian |
| 2020/0331737 A1 | 10/2020 | Reischauer et al. |
| 2020/0350850 A1 | 11/2020 | Di Stefano et al. |
| 2021/0180832 A1 | 6/2021 | Schuknecht et al. |
| 2021/0189747 A1 | 6/2021 | Pearson, Jr. |
| 2021/0205995 A1 | 7/2021 | Vu et al. |
| 2021/0206003 A1 | 7/2021 | Zhou et al. |
| 2021/0379757 A1 | 12/2021 | Schneider et al. |
| 2021/0395011 A1 | 12/2021 | Crawford, Jr. et al. |
| 2022/0035379 A1 | 2/2022 | Xu et al. |
| 2022/0049805 A1 | 2/2022 | Hinton |
| 2022/0069770 A1 | 3/2022 | Shelton et al. |
| 2022/0103122 A1 | 3/2022 | Carter |
| 2022/0345076 A1 | 10/2022 | Nickerson |
| 2022/0411245 A1 | 12/2022 | Bailey |
| 2023/0066547 A1 | 3/2023 | Campbell et al. |
| 2023/0188086 A1 | 6/2023 | Garza et al. |
| 2023/0361715 A1 | 11/2023 | Mouniandy et al. |
| 2024/0001836 A1 | 1/2024 | Di Stefano et al. |
| 2024/0030863 A1 | 1/2024 | Brulo et al. |
| 2024/0083699 A1 | 3/2024 | Davis et al. |
| 2024/0190009 A1 | 6/2024 | Asmari et al. |
| 2024/0228195 A1 | 7/2024 | Smith |
| 2024/0235460 A1 | 7/2024 | Smith |
| 2024/0235467 A1 | 7/2024 | Conti et al. |
| 2024/0258958 A1 | 8/2024 | Watson et al. |
| 2024/0367319 A1 | 11/2024 | Smith |
| 2024/0424969 A1 | 12/2024 | Hansel et al. |
| 2024/0424971 A1 | 12/2024 | Hansel et al. |
| 2025/0223118 A1 | 7/2025 | Smith et al. |
| 2025/0226791 A1 | 7/2025 | Smith et al. |
| 2025/0226792 A1 | 7/2025 | Smith et al. |

FOREIGN PATENT DOCUMENTS

| | | |
|---|---|---|
| CN | 110402683 A | 11/2019 |
| CN | 211700658 U | 10/2020 |
| CN | 111342751 B | 7/2021 |
| DE | 102012105726 A1 | 1/2014 |
| JP | 2020-070584 A | 5/2020 |
| WO | WO 2019/136505 A1 | 7/2019 |
| WO | WO 2021/119559 A1 | 6/2021 |
| WO | WO 2021/229387 A2 | 11/2021 |
| WO | WO 2021/252427 A1 | 12/2021 |

OTHER PUBLICATIONS

"11 Advantages of Spring Loaded Contacts", SOS Engineering Inc., [online], [retrieved on 2024-10-18]. Retrieved from the Internet: <URL: https://web.archive.org/web/20190624201422/https://www.soseng.com/11-advantages-of-spring-loaded-contacts/>. (Year: 2019).*

* cited by examiner

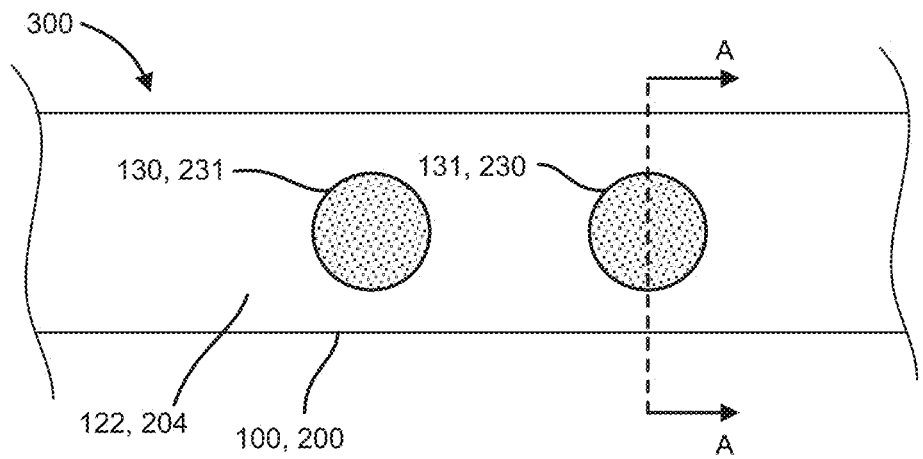
FIG. 4A
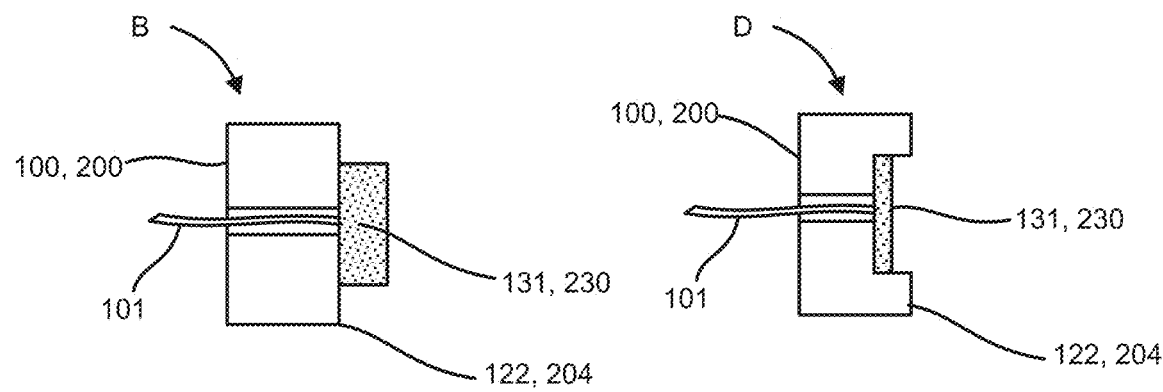
FIG. 4B       FIG. 4D
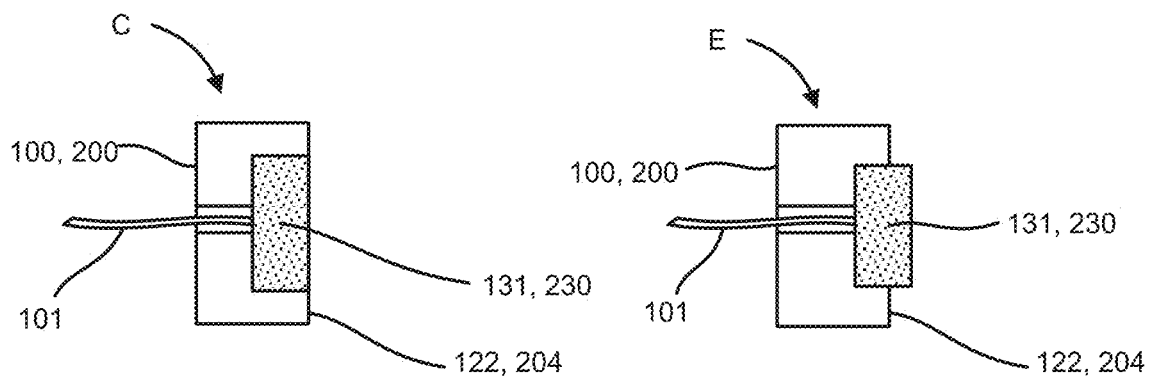
FIG. 4C       FIG. 4E

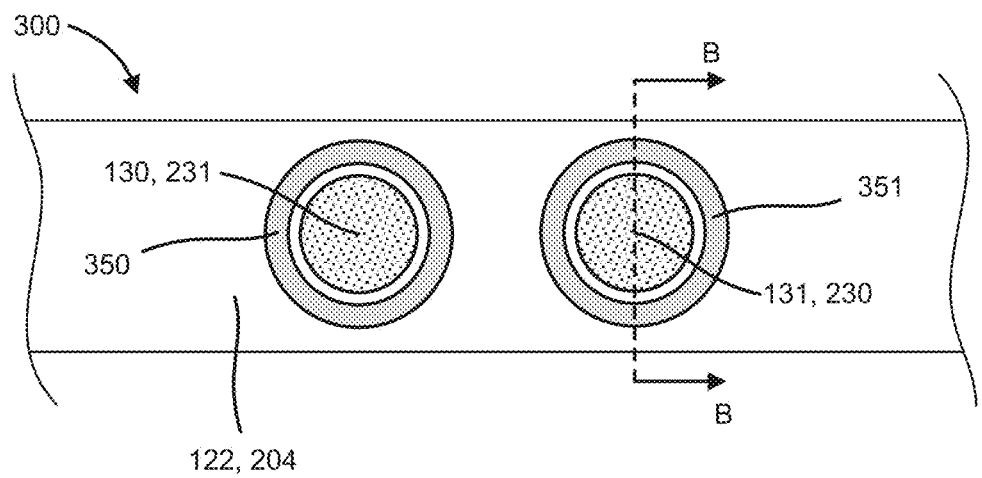
FIG. 5A
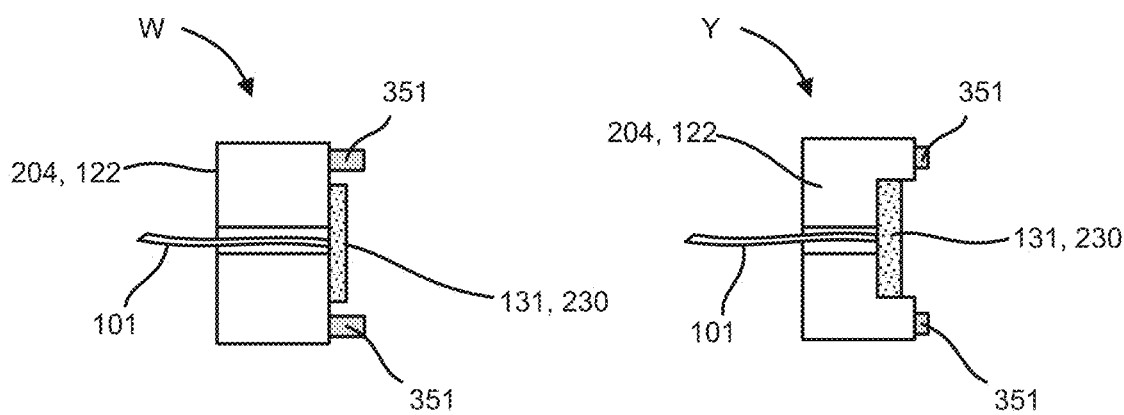
FIG. 5B     FIG. 5D
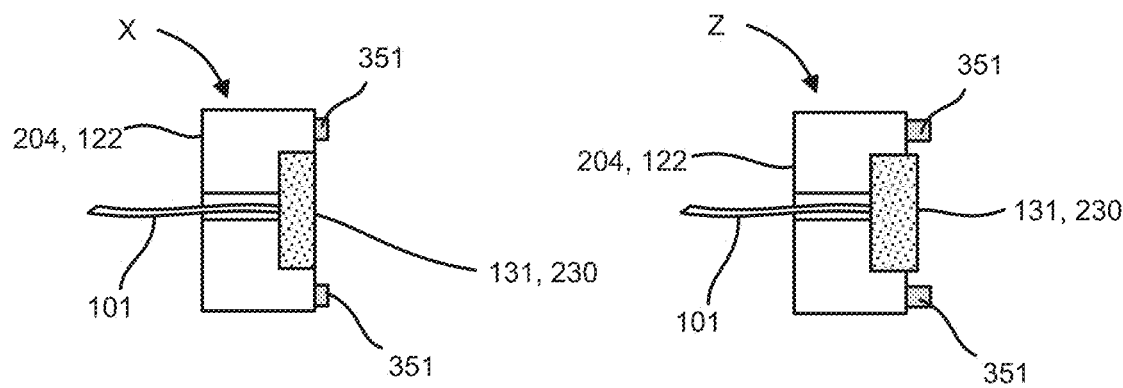
FIG. 5C     FIG. 5E

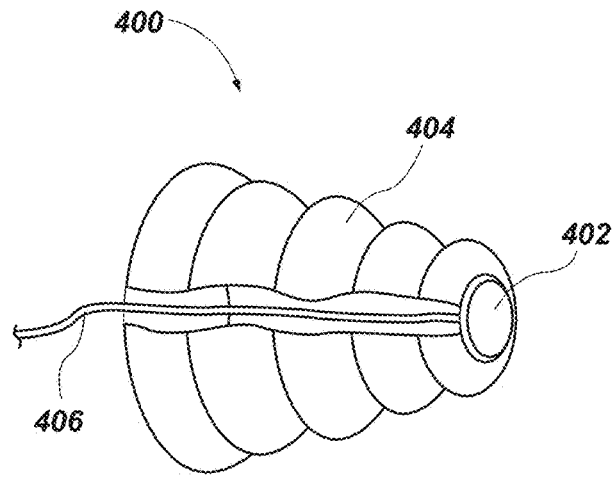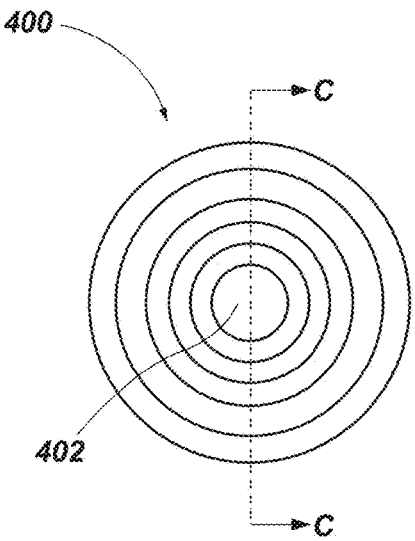
FIG. 8A　　　　　　　　FIG. 8B
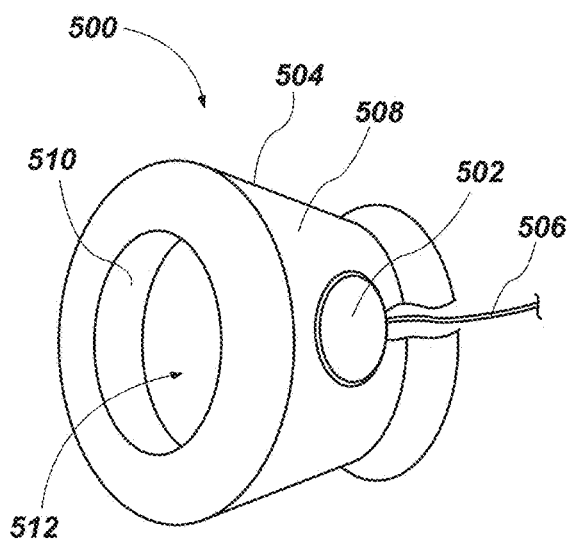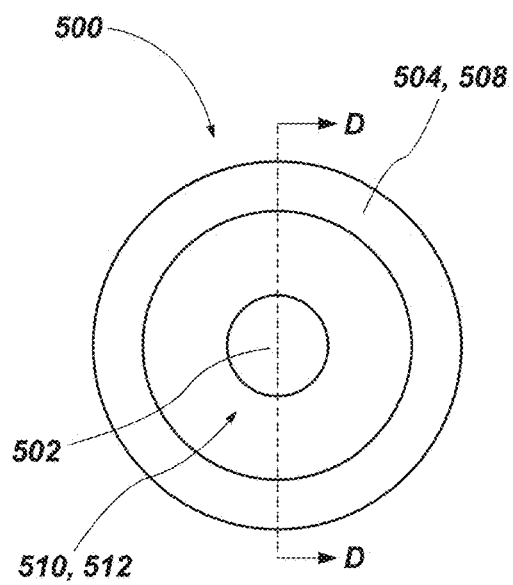
FIG. 9A　　　　　　　　FIG. 9B

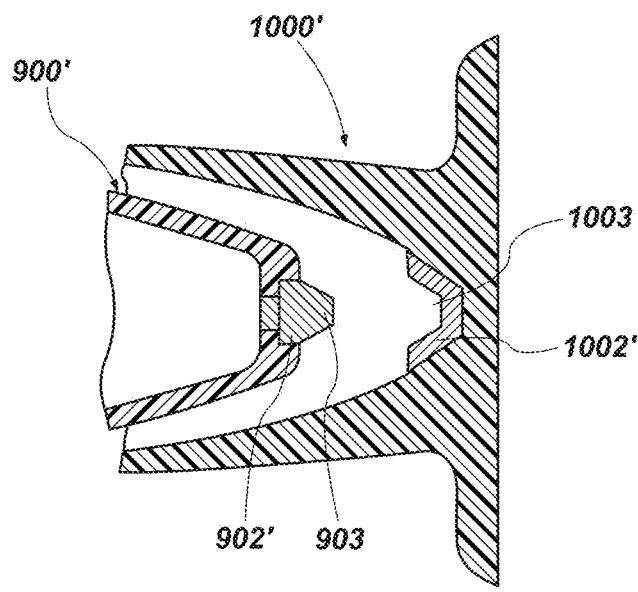
FIG. 20A
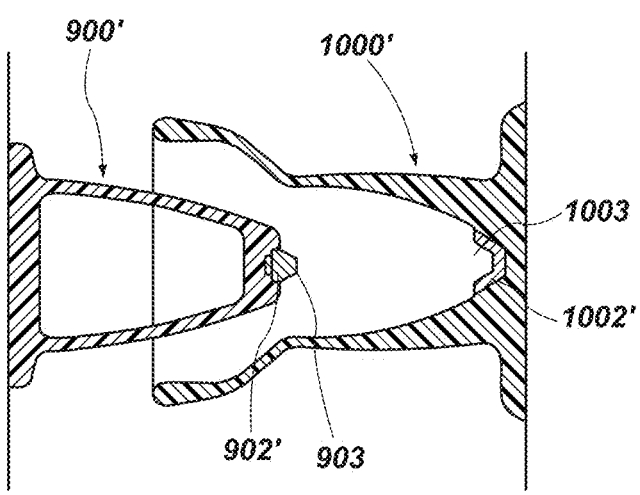 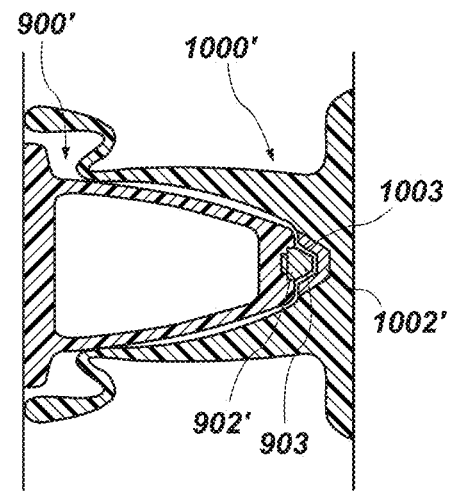
FIG. 20B    FIG. 20C

AUTO-ENGAGING ELECTRICAL CONNECTIONS FOR SOLAR PANELS

RELATED APPLICATIONS

This is a divisional application of U.S. application Ser. No. 18/094,983, filed Jan. 9, 2023, entitled "Auto-Engaging Electrical Connections for Solar Panels", which is incorporated by reference in its entirety herein.

BACKGROUND

In recent years, electricity generation through the use of solar panels, otherwise known as photovoltaic panels, has become much more common and widespread than has been previously known. Solar panels within solar arrays or solar panel arrays, otherwise known as photovoltaic arrays, are commonly installed on both commercial and residential buildings, as well as other structures, using racks, mounts and other structures and mechanisms. Additionally, solar panel arrays are commonly installed on racks or mounts on the ground (i.e., ground mounts), such as in open fields and spaces. Installations are typically designed to maximize available solar energy. Solar panels and solar panel arrays can also be installed on support poles or towers. In many such cases, the solar panels are installed in places that are exposed to the outside environment, possibly causing corrosion and damage to electrical connections of the solar panels.

With solar panel arrays and solar panel installation becoming more common in society, quicker and more efficient ways of installing solar panel arrays, as well as making more robust and reliable electrical connections for solar panels, are continually being developed in order to potentially provide competitive cost and other benefits. Additionally, electrical connections that prevent corrosion caused by the outside environment is also desirable. For this reason, systems, devices, and methods for installing and electrically connecting solar panels continue to be developed.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 4A illustrates a front view of an edge of a solar panel or solar panel mount comprising and supporting one or more electrical contacts.

FIGS. 4B-4E illustrate side cross-sectional views taken along line AA of FIG. 4A of various possible contact configurations of an auto-connecting electrical contact system.

FIG. 5A illustrates a front view of an edge of a solar panel or solar panel mount comprising and supporting electrical contacts of an auto-connecting electrical contact system.

FIGS. 5B-5E illustrate side cross-sectional views of various possible contact configurations of an auto-connecting electrical contact system taken along line BB of FIG. 5A.

FIGS. 8A and 8B respectively illustrate a perspective view and a top view of a plug of an auto-connecting electrical contact system according to at least one example of the present disclosure.

FIGS. 9A and 9B respectively illustrate a perspective view and a top view of a receptacle of an auto-connecting electrical contact system according to at least one example of the present disclosure.

FIGS. 20A-20C illustrate an exemplary configuration of an electrical contact in accordance with at least one example of the present disclosure.

Figure 1:
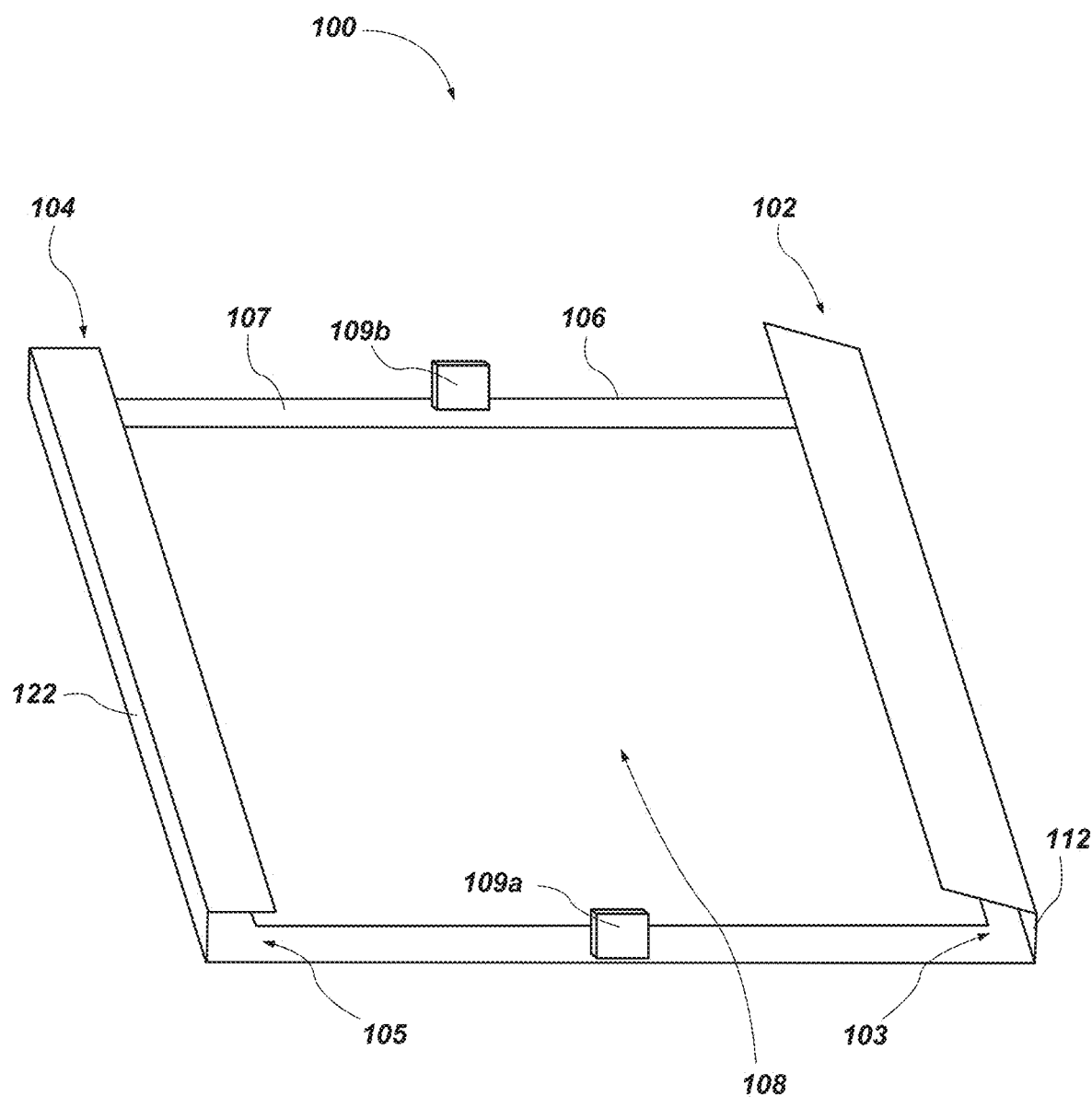
FIG. 1 illustrates a front elevation view of a solar panel mount in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness can in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. In contexts where elements are recited to be "substantially aligned with" another element recited herein, it is intended that the recited element is still "substantially aligned with" another element when the element is either in perfect alignment with, or out of alignment by +/−10 degrees with the other element. In contexts where elements are recited to be "substantially parallel" to another element recited herein, it is intended that the recited element is still "substantially parallel" to the other element when the element is either perfectly parallel with, or is angled away from parallel with the other element by +/−10 degrees.

As used herein, "adjacent" refers to the proximity of two structures or elements. Particularly, elements that are identified as being "adjacent" can be either abutting or connected. Such elements can also be near or close to each other without necessarily contacting each other. The exact degree of proximity can in some cases depend on the specific context.

As used herein, the singular forms "a," and, "the" include plural referents unless the context clearly dictates otherwise.

As used herein, the term "installed position" refers to a final position at which the solar panel is fully installed and resting in a seated position within a solar panel mount, and that corresponds to the operating position of the solar panel for its intended purpose, namely, to receive solar energy and facilitate the production or generation of electricity. In other words, in the "installed position" installation of the solar panel into the solar panel mount is complete, meaning that no further movement or manipulation of the solar panel within the solar panel mount is undertaken to position the solar panel within the mount. For example, the installed position can be a position where the solar panel is resting against both a panel rest (e.g., panel rest 106 of panel mount 100 of FIG. 1) and a second support structure (e.g., second support structure 104 of panel mount 100 of FIG. 1). The "installed position" may, but does not need to, include the solar panel engaged by and secured into place with a retention latch, biasing member, or other locking mechanism. Examples of installed positions are illustrated in at least FIGS. 2D, 3, 27D, 28D, and 29).

The term "installation position" as used herein refers to a position at which a solar panel is initially inserted into, brought into contact or interfaced with the solar panel mount, or at which the solar panel is aligned to be inserted, brought into contact or interfaced with the solar panel mount, for facilitating subsequent placement of the solar panel into the installed position.

As used herein, the term "installation angle" is intended to refer to an orientation angle at which a solar panel is initially inserted into, brought into contact or interfaced with, or aligned to be inserted, brought into contact with, or interfaced with the solar panel mount, for facilitating subsequent placement of the solar panel into the installed position.

As used herein, the term "solar panel mount" refers to a collection of structural supports or support structures (e.g., a frame or frame-like structure, any connections between these, etc.) configured to receive and retain, at least in part, and support one or more solar panels in an operational installed position. A plurality of solar panel mounts can be operable together to provide a solar panel array frame.

As used herein, the term "support structure" refers to a structure or assembly of components of a solar panel mount configured to receive and retain one or more edges of one or more solar panels in an operational installed position As used herein, the term "back stop" refers to a portion of one or more support structures of a solar panel mount configured to receive and provide a positional stop for one or more solar panels.

As used herein, the term "panel rest" refers to a surface of one or more support structures of a solar panel mount configured to provide support, whether directly or indirectly, a surface of the solar panel with the solar panel in the installed position.

As used herein, the term "guide stop" refers to a portion of one or more support structures of a solar panel mount configured to guide a solar panel towards the back stop and/or panel rest during insertion of the solar panel into the solar panel mount.

As used herein, the term "biasing structure" refers to a structure or member, such as a spring, resilient member, or other spring-like structure or member of a solar panel mount configured to bias a solar panel in one or more directions within the solar panel mount in the installed position.

As used herein, the term "retention latch" refers to any structure of a solar panel mount configured to engage with a portion of the solar panel to retain the solar panel in the support structure in the installed position.

As used herein, the term "guiding interior surface" refers to an inner surface that defines a cavity that has a cross-sectional area that decreases from an opening of the cavity to a bottom of the cavity. In other words, the guiding interior surface forms a funneling guide from an opening of a cavity to a feature (e.g., electrical contact) or other element disposed at a bottom of the cavity.

As used herein, the term "panel electrical contact" refers to an electrical contact structural component made of an electrically conductive material that is mounted to, adhered to, integrally formed with or otherwise supported on or by a solar panel, and that facilitates electrical connection of the solar panel to a solar panel mount. In some examples, the panel electrical contact can be a component of a system, housing or other support structure that is mounted to, adhered to, integrally formed with or otherwise supported on or by the solar panel. The panel electrical contact can be in electrical communication with one or more electrically conductive pathways (e.g., one or more wires) that provide an electrical connection between the solar panel and another electrical system (e.g., one or more photovoltaic cells of the solar panel).

As used herein, the term "mount electrical contact" refers to an electrical contact structural component made of an electrically conductive material that is mounted to, adhered to, integrally formed with, or otherwise supported on or by a solar panel mount, and that facilitates electrical connection of the solar panel mount to a solar panel. In some examples, the mount electrical contact can be a component of a system, housing or other support structure that is mounted to, adhered to, integrally formed with or otherwise supported on or by the solar panel mount. The mount electrical contact can be in electrical communication with one or more wires or other electrically conductive pathways that provide an electrical connection between the solar panel mount and another electrical system (e.g., an electrical power system that receives or stores solar energy generated by the solar panel(s)).

As used herein, the term "auto-connecting electrical contact system" refers to any combination of components that comprise one or more panel electrical contacts or one or more mount electrical contacts, or both together, that are sized, configured, and supported by a solar panel and/or a solar panel mount, respectively, so as to automatically establish an electrical connection with one another when the solar panel comprising the one or more panel electrical contacts is caused to be installed in an installed position within the solar panel mount comprising the one or more mount electrical contacts. For example, the auto-connecting electrical contact system can further comprise any system, housing or other structure in support of the panel electrical contacts and/or the mount electrical contacts, or both, such as the mating connector parts of an electrical connector (e.g., plug and receptacle), as well as any seals, springs or spring-like components operable with the panel electrical contacts and/or the mount electrical contacts. In one example, the auto-connecting electrical contact system can comprise one or more panel electrical contacts of a solar panel. In another example, the auto-connecting electrical contact system can comprise one or more mount electrical contacts of a solar panel mount. In another example, the auto-connecting electrical contact system can comprise the to-be-mated or mated combination of the panel electrical contacts and the mount electrical contacts of respective solar panel(s) and solar panel mount(s). In another example, the term "auto-connecting electrical contact system" refers to any combination of components that comprise various panel electrical contacts that are sized, configured, and supported via two solar panels so as to automatically establish an electrical connection with one another when the solar panels are caused to be installed in an installed position within the solar panel mount (i.e., the auto-connecting electrical contact system facilitates automatic electrical connection between one or more adjacent solar panels in addition to, or in the alternative to, an established electrical connection between one or more solar panels and the solar panel mount. In another example, an auto-connecting electrical contact system can further comprise a mounting system or assembly comprising various structural components operable to couple one or more panel electrical contacts to a solar panel, or one or more mount electrical contacts to a solar panel mount.

An initial overview of the inventive concepts is provided below and then specific examples are described in further detail later. This initial summary is intended to aid readers in understanding the examples more quickly, but is not intended to identify key features.

In one example, disclosed is a solar panel mount for electrically connecting an installed solar panel. The solar panel mount can comprise a support structure and a panel rest, the support structure being configured to support a solar panel in an installed position on the panel rest. The solar panel mount can further comprise an auto-connecting electrical contact system comprising a mount electrical contact supported by the support structure, wherein the mount electrical contact is operable to electrically connect with a corresponding panel electrical contact of the solar panel in an installed position.

In another example, disclosed is a solar panel mount system comprising the solar panel mount of the preceding example, and a solar panel supported in an installed position within the solar panel mount.

In another example, disclosed is a solar panel comprising at least one photovoltaic cell, a support structure in support of the photovoltaic cell, and an auto-connecting electrical contact system. The auto-connecting electrical contact system can comprise a panel electrical contact coupled to the support structure, and operable to electrically connect the panel electrical contact to a mount electrical contact of a corresponding solar panel mount in an installed position.

In another example, disclosed is an auto-connecting electrical contact system operable to electrically connect a solar panel with a solar panel mount. The auto-connecting electrical contact system can comprise a panel electrical contact configured to be coupled to the solar panel, and a mount electrical contact configured to be coupled to the solar panel mount. The panel electrical contact can be operable to electrically connect with the mount electrical contact upon installing the solar panel within the solar panel mount.

In another example, disclosed is a method of configuring a solar panel mount system for electrically connecting an installed solar panel with an electrical power system. The method can comprise configuring the solar panel mount system to comprise a solar panel and a solar panel mount configured to receive the solar panel. The method can further comprise configuring the solar panel mount system to comprise an auto-connecting electrical contact system operable to electrically connect the solar panel with the solar panel mount. In one example, the auto-connecting electrical contact system can comprise a panel electrical contact coupled to the solar panel, and a mount electrical contact coupled to the solar panel mount, wherein the panel electrical contact is operable to electrically connect with the mount electrical contact with the solar panel in the installed position. The method can further comprise configuring the mount electrical contact of the auto-connecting electrical contact system to facilitate electrical connection of the mount electrical contact with an electrical power system, thereby facilitating electrical connection of the solar panel with the electrical power system. It is noted that the method can be implemented to configure any of the solar panel mount, the solar panel, and/or the auto-connecting electrical contract system to comprise any of the elements, features, components, etc. with respect to any example discussed herein.

In one or more of the preceding examples, the auto-connecting electrical contact system can comprise a plug comprising a housing in support of a plug electrical contact, wherein the plug electrical contact comprises the mount electrical contact.

In one or more of the preceding examples, the plug can comprise a spring supported by the housing of the plug operable to supply a biasing force configured to bias the plug electrical contact into electrical connection with a receptacle electrical contact within a receptacle.

In one or more of the preceding examples, the housing of the plug can comprise a surface configuration having a receptacle interface.

In one or more of the preceding examples, the housing of the plug can comprise one or more materials configured to deform under an applied load.

In one or more of the preceding examples, the one or more materials of the housing of the plug can comprise an elastic material configured to deform under an applied load and biased to return to an undeformed state.

In one or more of the preceding examples, the plug can comprise a spring encapsulated in the housing of the plug, wherein the spring is operable to supply a biasing force to the plug electrical contact, and to the housing of the plug.

In one or more of the preceding examples, the housing of the plug can be operable to form a seal with a housing of a connected receptacle.

In one or more of the preceding examples, the auto-connecting electrical contact system can comprise a receptacle comprising a housing in support of a receptacle electrical contact, wherein the receptacle electrical contact comprises the mount electrical contact.

In one or more of the preceding examples, the housing of the receptacle can comprise an opening, an interior cavity, and a guiding surface comprising a plug interface.

In one or more of the preceding examples, the housing of the receptacle can comprise one or more materials configured to deform under an applied load.

In one or more of the preceding examples, the housing of the receptacle can be operable to form a seal with a housing of a connected plug.

In one or more of the preceding examples, the housing of the receptacle can comprise one or more materials configured to deform under an applied load.

In one or more of the preceding examples, the one or more materials of the receptacle can comprise an elastic material configured to deform under an applied load and biased to return to an undeformed state.

In one or more of the preceding examples, the auto-connecting electrical contact system can be configured to facilitate multi-axis alignment of the mount electrical contact with the plug electrical contact.

In one or more of the preceding examples, the solar panel mount can comprise a conductive pathway electrically connecting the mount electrical contact to an electrical power system, thereby facilitating connection of the solar panel to the electrical power system.

In one or more of the preceding examples, the solar panel mount can comprise a seal disposed between the solar panel and the solar panel mount, the seal being configured to seal a panel electrical contact and the mount electrical contact from the environment with the solar panel in the installed position.

In one or more of the preceding examples, the solar panel mount can comprise a seal disposed around the mount electrical contact, the seal being operable to seal the mount electrical contact from the environment with the solar panel in the installed position.

In one or more of the preceding examples, the mount electrical contact can comprise an outer contact surface having one of a recess, flush or a protruding configuration.

In one or more of the preceding examples, the auto-connecting electrical contact system can comprise a mounting assembly operable to couple the mount electrical contact to the support structure.

In one or more of the preceding examples, the auto-connecting electrical contact system can comprise a panel electrical contract coupled to the solar panel, and wherein the panel electrical contact is electrically connected with the mount electrical contact.

In one or more of the preceding examples, the auto-connecting electrical contact system can comprise a plug comprising a housing in support of a plug electrical contact, wherein the plug electrical contact comprises one of the panel electrical contact or the mount electrical contact.

In one or more of the preceding examples, the plug can comprise a spring supported by the housing of the plug to supply a biasing force that biases the plug electrical contact into electrical connection with the receptacle electrical contact within the receptacle.

In one or more of the preceding examples, the auto-connecting electrical contact system can comprise a receptacle comprising a housing in support of a receptacle electrical contact, and wherein the receptacle electrical contact can comprise the other of the panel electrical contact or the mount electrical contact.

In one or more of the preceding examples, the housing of the receptacle can comprise an opening and an interior cavity defining a guiding surface; the housing of the plug comprises a surface configuration operable to be received within the opening, wherein the plug is operable to be guided within the interior cavity of the receptacle such that the plug electrical contact aligns and electrically connects with the receptacle electrical contact as the solar panel is moved into the installed position within the solar panel mount.

In one or more of the preceding examples, the auto-connecting electrical contact system can be configured to facilitate multi-axis alignment in which the plug is guided by the guiding surface of the housing of the receptacle in two or more directions each corresponding to an axis.

In one or more of the preceding examples, the housing of the plug can comprise one or more materials configured to deform under an applied load.

In one or more of the preceding examples, the plug can comprise a spring encapsulated in the housing of the plug, wherein the spring supplies a biasing force that biases the plug electrical contact into electrical connection with the receptacle electrical contact and biases the housing of the plug into contact with the guiding interior surface of the housing of the receptacle, thereby forming a seal at an interface between the housing of the receptacle and the housing of the plug.

In one or more of the preceding examples, the one or more materials of the plug can comprise an elastic material configured to deform under an applied load and to be biased to return to an undeformed state.

In one or more of the preceding examples, the housing of the plug can comprise an elastic material configured to apply a biasing force to bias the housing of the plug to the undeformed state and to bias the plug electrical contact into electrical connection with the receptacle electrical contact within the receptacle.

In one or more of the preceding examples, the elastic material of the housing of the plug provides a biasing force to bias the housing of the plug into contact with the housing of the receptacle, the biasing force being configured to be sufficient to form a seal between the plug and the receptacle.

In one or more of the preceding examples, the housing of the receptacle can comprise one or more materials configured to deform under an applied load.

In one or more of the preceding examples, the one or more materials of the receptacle can comprise an elastic material configured to deform under an applied load and biased to return to an undeformed state, and wherein the elastic material of the housing of the receptacle provides a biasing force to bias the housing of the receptacle to the undeformed state and to bias the guiding interior surface of the housing of the receptacle into contact with the housing of the plug, thereby forming a seal at an interface between the housing of the receptacle and the housing of the plug.

In one or more of the preceding examples, the solar panel mount system can comprise an electrical power system comprising at least one of an electrical power grid, a battery, or a device powered by electricity; and an conductive pathway electrically connecting the mount electrical contact to the electrical power system.

In one or more of the preceding examples, the solar panel mount system can comprise a conductive pathway electrically connecting the panel electrical contact to a photovoltaic cell of the solar panel.

In one or more of the preceding examples, the solar panel mount system can comprise a seal disposed between the solar panel and the solar panel mount, the seal being configured to seal the panel electrical contact and the mount electrical contact from the environment with the panel electrical contact and the mount electrical electrically connected to one another.

In one or more of the preceding examples, one of the panel electrical contact or the mount electrical contact can comprise a recess and the other of the panel electrical contact or the mount electrical contact can comprise a protrusion shaped to engage with the recess.

In one or more of the preceding examples, the auto-connecting electrical contact system can comprise a second panel electrical contact coupled to the solar panel; and a second mount electrical contact coupled to the solar panel mount, wherein the second panel electrical contact is electrically connected with the second mount electrical contact.

In one or more of the preceding examples, the auto-connecting electrical contact system can comprise a plug comprising a housing in support of a pair of plug electrical contacts comprising either: the panel electrical contact and the second panel electrical contact; or the mount electrical contact and the second mount electrical contact.

In one or more of the preceding examples, the auto-connecting electrical contact system can comprise a receptacle comprising a housing in support of a pair of receptacle electrical contacts comprising the other of the panel electrical contact and the second panel electrical contact; or the mount electrical contact and the second mount electrical contact.

In one or more of the preceding examples, the housing of the receptacle can comprise an opening and an interior cavity formed from a guiding interior surface, wherein the housing of the plug can comprise a surface configuration operable to be received within the opening, wherein the plug is received within the receptacle upon the solar panel being moved into the installation position, and wherein the plug is guided within the interior cavity of the receptacle such that the pair of plug electrical contacts electrically connect with the pair of receptacle electrical contacts upon installing the solar panel within the solar panel mount.

In one or more of the preceding examples, the auto-connecting electrical contact system can be configured to facilitate multi-axis alignment in which the plug is guided by the guiding surface of the housing of the receptacle in two or more directions each corresponding to an axis.

In one or more of the preceding examples, the housing of the plug can comprise one or more materials configured to deform under an applied load.

In one or more of the preceding examples, the plug can comprise a spring encapsulated in the housing of the plug, wherein the spring supplies a biasing force that biases the plug electrical contact into electrical connection with the receptacle electrical contact and biases the housing of the plug into contact with the guiding interior surface of the housing of the receptacle, the biasing force being configured to be sufficient to form a seal at an interface between the housing of the receptacle and the housing of the plug.

In one or more of the preceding examples, the one or more materials of the plug can comprise an elastic material configured to deform under an applied load and to be biased to return to an undeformed state.

In one or more of the preceding examples, the housing of the plug comprises an elastic material can be configured to apply a biasing force to bias the housing of the plug to the undeformed state and to biases the plug electrical contact into electrical connection with the receptacle electrical contact within the receptacle.

In one or more of the preceding examples, the housing of the plug comprises an elastic material can be configured to provide a biasing force to bias the housing of the plug to the undeformed state and to bias the pair of plug electrical contacts into electrical connection with the pair of receptacle electrical contacts within the receptacle.

In one or more of the preceding examples, the housing of the receptacle can comprise one or more materials configured to deform under an applied load.

In one or more of the preceding examples, the one or more materials of the receptacle can comprise an elastic material configured to deform under an applied load and to be biased to return to an undeformed state, and wherein the elastic material of the housing of the receptacle provides a biasing force to bias the housing of the receptacle to the undeformed state and to bias the guiding interior surface of the housing of the receptacle into contact with the housing of the plug, thereby forming a seal at an interface between the housing of the receptacle and the housing of the plug.

In one or more of the preceding examples, the solar panel mount system can comprise an electrical power system comprising at least one of an electrical power grid, a battery, or a device powered by electricity; and a first conductive pathway electrically connecting the mount electrical contact to the electrical power system and a second conductive pathway electrically connecting the second mount electrical contact to the electrical power system.

In one or more of the preceding examples, the solar panel mount system can comprise a first conductive pathway electrically connecting the panel electrical contact to a photovoltaic cell of the solar panel and a second conductive pathway electrically connecting the second panel electrical contact to the photovoltaic cell of the solar panel.

In one or more of the preceding examples, the solar panel mount system can comprise a seal disposed between the solar panel and the solar panel mount, the seal being configured to seal the panel electrical contact, the second panel electrical contact, the mount electrical contact, and the second mount electrical contact from the environment with the panel electrical contact and the mount electrical contact electrically connected to one another, and with the second panel electrical contact and the second mount electrical contact electrically connected to one another.

In one or more of the preceding examples, one of the panel electrical contact or the mount electrical contact can comprise a recess and the other of the panel electrical contact or the mount electrical contact can comprise a protrusion shaped to engage with the recess.

In one or more of the preceding examples, one of the second panel electrical contact or the second mount electrical contact can comprise a recess and the other of the second panel electrical contact or the second mount electrical contact can comprise a protrusion shaped to engage with the recess.

In one or more of the preceding examples, the auto-connecting electrical contact system can comprise a plurality of panel electrical contacts coupled to the solar panel; and a plurality of mount electrical contacts coupled to the solar panel mount, wherein the plurality of panel electrical contacts are each electrically connected with one of the plurality of mount electrical contacts.

In one or more of the preceding examples, the auto-connecting electrical contact system can comprise a mounting assembly operable to facilitate coupling of the panel electrical contact to the solar panel.

In one or more of the preceding examples, the auto-connecting electrical contact system can comprise a mounting assembly operable to facilitate coupling of the mount electrical contact to the solar panel mount.

Solar Panel Mount and Auto-Connecting Electrical Contact System

To further describe the present technology, examples are now provided with reference to the figures. Illustrated in the figures is a solar panel mount system for automatically electrically connecting a solar panel installed in a solar panel mount to an electrical power system. To clearly describe the examples and benefits of the said solar panel mount system described herein, the installation of a solar panel into a solar panel mount will first be described with reference to FIG. 1 and FIGS. 2A-2D.

FIG. 1 illustrates a solar panel mount 100 in accordance with an example of the present disclosure. As illustrated, the solar panel mount 100 can be configured to hold a solar panel, otherwise known as a photovoltaic panel, in an installed position in which the solar panel can be part of a solar array, otherwise known as a photovoltaic array, and is operable to receive solar energy and generate electricity. The solar panel mount 100, can include a first support structure 102 comprising and defining, at least in part, a first retaining channel 103 configured to receive and support a first edge of a solar panel in an installed position (the solar panel can comprise any type of support frame or other structure in support of one or more photovoltaic cells as will be apparent to those skilled in the art). The solar panel mount 100 can further include a second support structure 104 disposed at a position that is opposed to and offset from the first support structure 102. The second support structure 104 can comprise and define, at least in part, a second retaining channel 105 configured to receive and retain a second edge of the solar panel in the installed position to retain the solar panel in the first support structure 102. The first and second retention channels 103 and 105 can be configured as c-channels, or any other channel or configuration suitable to receive a solar panel. The solar panel mount 100 can further include a panel rest 106 configured to receive and support a lower surface of the solar panel in the installed position.

In one example, the panel rest 106 can include a support surface 107 configured to support a solar panel. The panel rest 106 can comprise one or more rails that define one or more apertures 108 of any size or shape formed therein to allow for additional elements to interface with the solar panel through the one or more apertures 108. For example, a retention latch could interface with a solar panel through an aperture in the panel rest to hold the solar panel in place within the solar panel mount 100. The panel rest 106 can be integrally formed with at least one of the first support structure 102 or the second support structure 104 or it can be formed separately and attached to the support structures 102 or 104. Furthermore, the panel rest 106 can comprise one piece (e.g., rail) or a plurality of pieces (e.g., rails) formed or joined into the panel rest 106.

An operation of installing a solar panel 200 into the solar panel mount 100 is illustrated in FIGS. 2A-2D, which solar panel 200 and solar panel mount 100 are part of a solar panel mount system discussed below. With reference to FIGS. 2A-2D showing the example solar panel mount 100 and example solar panel 200, inserting the solar panel 200 can be accomplished by inserting the solar panel 200 into the first support structure 102 and causing the solar panel 200, and particularly different portions of the solar panel 200 (e.g., the first edge 202 of the support frame of the solar panel), to be captured by first support structure 102 and secured within the first retention channel 103. As illustrated in FIGS. 2A-2D, the first retaining channel 103 and the second retaining channel 105 (at least partially defined by the first support structure 102 and the second support structure 104) can be spatially positioned and oriented relative to one another to facilitate quick capture of the solar panel 200, and to secure the solar panel 200 in the installed position within the solar panel mount 100.

For example, the first edge 202 of the solar panel 200 can be inserted and rotated about a lateral axis so that it is oriented on an incline relative to the panel rest 106 when being inserted into the solar panel mount 100. The angle of incline of the solar panel 200 upon an initial insertion of the solar panel 200 into the solar panel mount 100 is referred to herein as an access angle $\theta_1$ shown in FIG. 2A. As shown in FIG. 2B, with the solar panel 200 oriented on an access angle $\theta_1$, the first edge 202 of the solar panel 200 can be inserted substantially fully (e.g., up to a point where contact between the solar panel 200 and a back stop 112 of the solar panel mount 100 is possible) into the first support structure 102 defining the first retention channel 103.

Figure 2A:
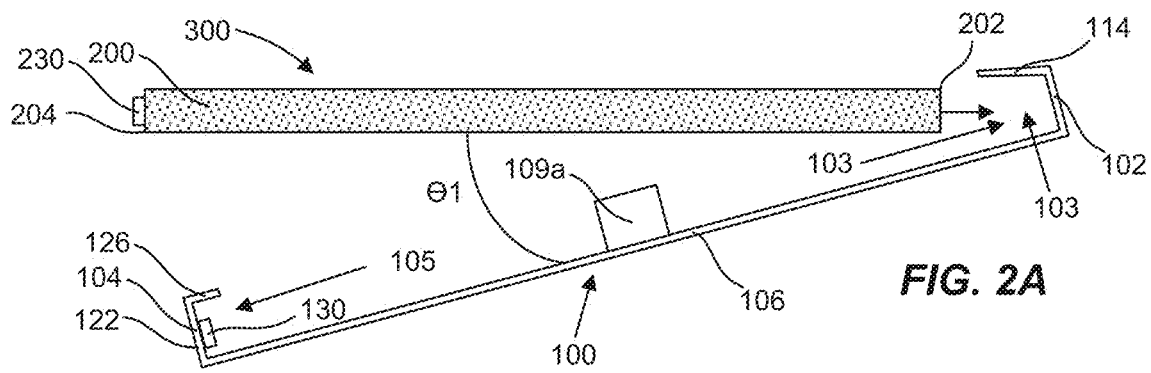
FIGS. 2A-2D illustrate various steps of a solar panel being installed in the solar panel mount of FIG. 1.
Figure 2B:
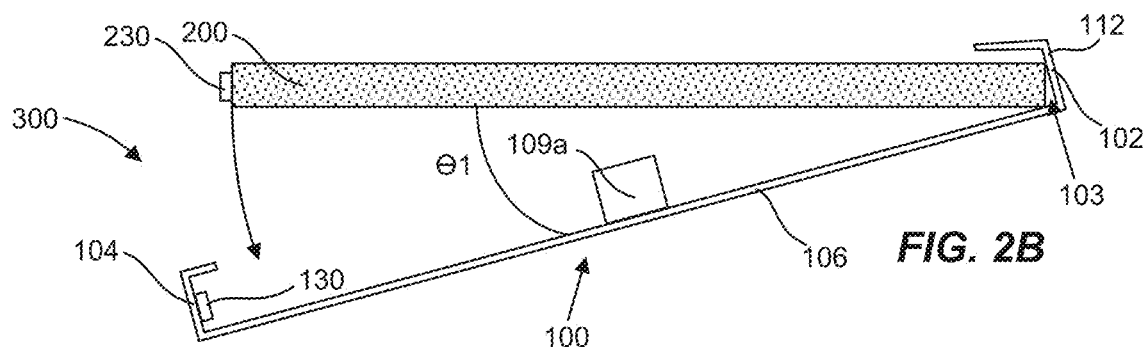

As shown in FIG. 2A, the solar panel 200 can be inserted into the solar panel mount 100 at angle $\theta_1$ such that the solar panel 200 is substantially aligned with and/or parallel to a upper guide stop 114 of the first support structure 102. In this angle $\theta_1$, the second edge 202 of the solar panel 200 can be inserted into first support structure 102 and the first retention channel 103. The first edge 102 can be inserted completely, or nearly completely, into the first retention channel 103 at the access angle $\theta_1$ without causing the solar panel 200 to bind against the first support structure 102, thereby preventing a deep or full insertion of the solar panel 200 into the first support structure 100.

Figure 2C:
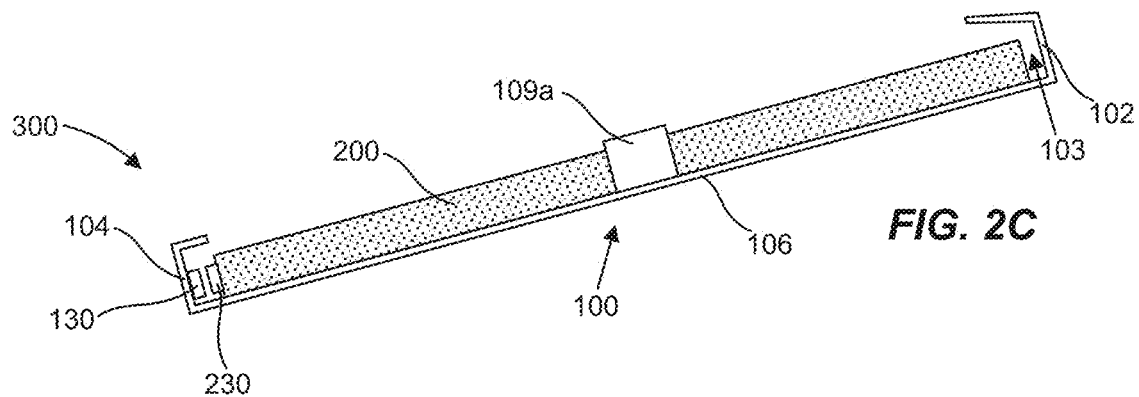
Figure 2D:
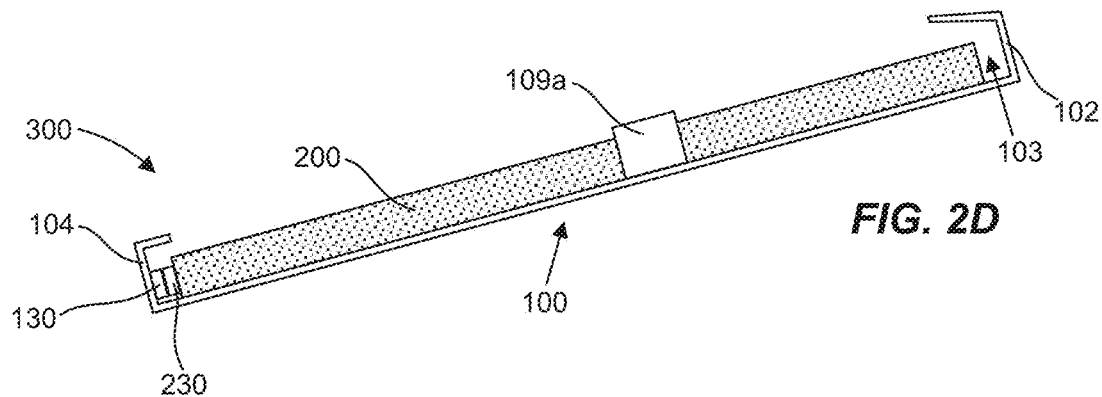

As shown in FIG. 2B, even at the steep angle of $\theta_1$ the solar panel 200 can be inserted into the first retention channel 103 until it abuts the back stop 112 of the first support structure 102 without requiring additional rotation or adjustment of the solar panel 200 toward the panel rest 106 before full insertion can be achieved. As illustrated in FIG. 2C, the solar panel 200 can clear the second support structure 104 and rotate into position against the solar panel rest 106. Additionally, the solar panel 200 can move toward the second support structure 104 within the solar panel mount 100 and eventually rest adjacent to a back stop 122 of the second support structure 104 and the panel rest 106 to be retained within the solar panel mount 100. The lengths of the upper guide stop 114 and upper guide stop 126 of the first and second support structures 102 and 104, respectively, can be formed and set apart from each other to ensure the solar panel 200 can be retained and cannot be removed from the solar panel mount 100 unless the solar panel 200 is moved up toward the first support structure 102 and then rotated away from the solar panel rest 106 to clear the second support structure 104, as shown in the position illustrated in FIG. 2B.

The panel rest 106 is illustrated as being a panel spanning an entire region between the first support structure 102 and the second support structure 104. The panel rest 106 can be a length that is greater than a length of the solar panel 200 that is to be retained in the solar panel mount 100 in order to fully accommodate a solar panel 200 in the mount 100. In other words, the first and second retaining channels 103 and 105 spaced apart by the panel rest 106 can be spatially positioned apart from, and oriented relative to, one another at a distance greater than a length of the solar panel 200 such that the first retaining channel 103 is positioned to receive the first edge 202 of the solar panel 200 and the second retaining channel 105 is positioned to receive a second edge 204 of the solar panel 200 opposite the first edge 202 to secure the solar panel 200 in the installed position shown in FIG. 2D.

FIGS. 2A-7H illustrate a solar panel mount system 300, according to one example of the present disclosure, for electrically connecting the installed solar panel 200 at least one of directly or indirectly to an electrical power system during installation of the solar panel 200 into the solar panel mount 100 (with the solar panel in an installed position). The solar panel mount system 300 can comprise the solar panel mount 100 in support of a portion of an auto-connecting electrical contact system, and the solar panel 200, also with a portion of the auto-connecting electrical contact system. Stated differently, FIGS. 2A-7H illustrate the elements of a solar panel mount system 300. For example, FIGS. 2A-7H illustrate a solar panel mount 100 comprising a support structure and a panel rest, the support structure being configured to support the solar panel 200 in an installed position on the panel rest. The solar panel mount 100 can further comprise an auto-connecting electrical contact system comprising a mount electrical contact supported by the support structure, wherein the mount electrical contact is operable to electrically connect with a corresponding panel electrical contact of the solar panel 200 in an installed position. FIGS. 2A-7H further illustrate a solar panel 200 comprising one or more photovoltaic cells, a support structure in support of the photovoltaic cell(s). The solar panel 200 can further comprise an auto-connecting electrical contact system comprising a panel electrical contact coupled to the support structure, and operable to electrically connect the panel electrical contact to a mount electrical contact of a corresponding solar panel mount with the solar panel 200 in an installed position. Each one of these elements will be described in more detail below with respect to the overall solar panel mount system 300.

The solar panel mount system 300, namely via the solar panel mount 100 and the solar panel 200, can comprise an auto-connecting electrical contact system operable to electrically connect the solar panel 200 with the solar panel mount 100, and to an electrical power system via the solar panel mount 100. The auto-connecting electrical contact system can include one or more panel electrical contacts, such as panel electrical contact 230, coupled to the solar panel 200 and one or more mount electrical contacts, such as mount 130, coupled to the solar panel mount 100. The panel electrical contact 230 can be operable to electrically connect with the mount electrical contact 130 upon installing the solar panel 200 into the solar panel mount 100, such as, for example, upon transitioning the solar panel 200 from an installation position (e.g., positions shown in FIGS. 2A-2C, or in other words, positions prior to the installed position) to an installed position (e.g., position shown in FIG. 2D) within the solar panel mount 100.

The panel electrical contact 230 can be disposed or supported on the solar panel 200 at a position to align with the mount electrical contact 130 disposed or supported on the solar panel mount 100. Likewise, the mount electrical contact 130 can be positioned on the solar panel mount 100 at a position to align with the panel electrical contact 230 on the solar panel 200. In other words, as the solar panel 200 is installed into the solar panel mount 100, the solar panel 200 can be installed relative to the solar panel mount 100, such that the panel electrical contact 230 and the mount electrical contact 130 are in alignment and caused to make contact with each other. In one example, this can be accomplished as the solar panel 200 is moved and manipulated to transition from an installation position (FIGS. 2A-2C) to the final installed position (FIG. 2D) relative to the solar panel mount 100. The solar panel mount 100 can further include guides 109a and 109b to constrain lateral movement of the solar panel 200 within the first and second retaining channels 103 and 105 of the solar panel mount 100 and to ensure alignment of the panel electrical contact 230 with the mount electrical contact 130.

Figure 3:
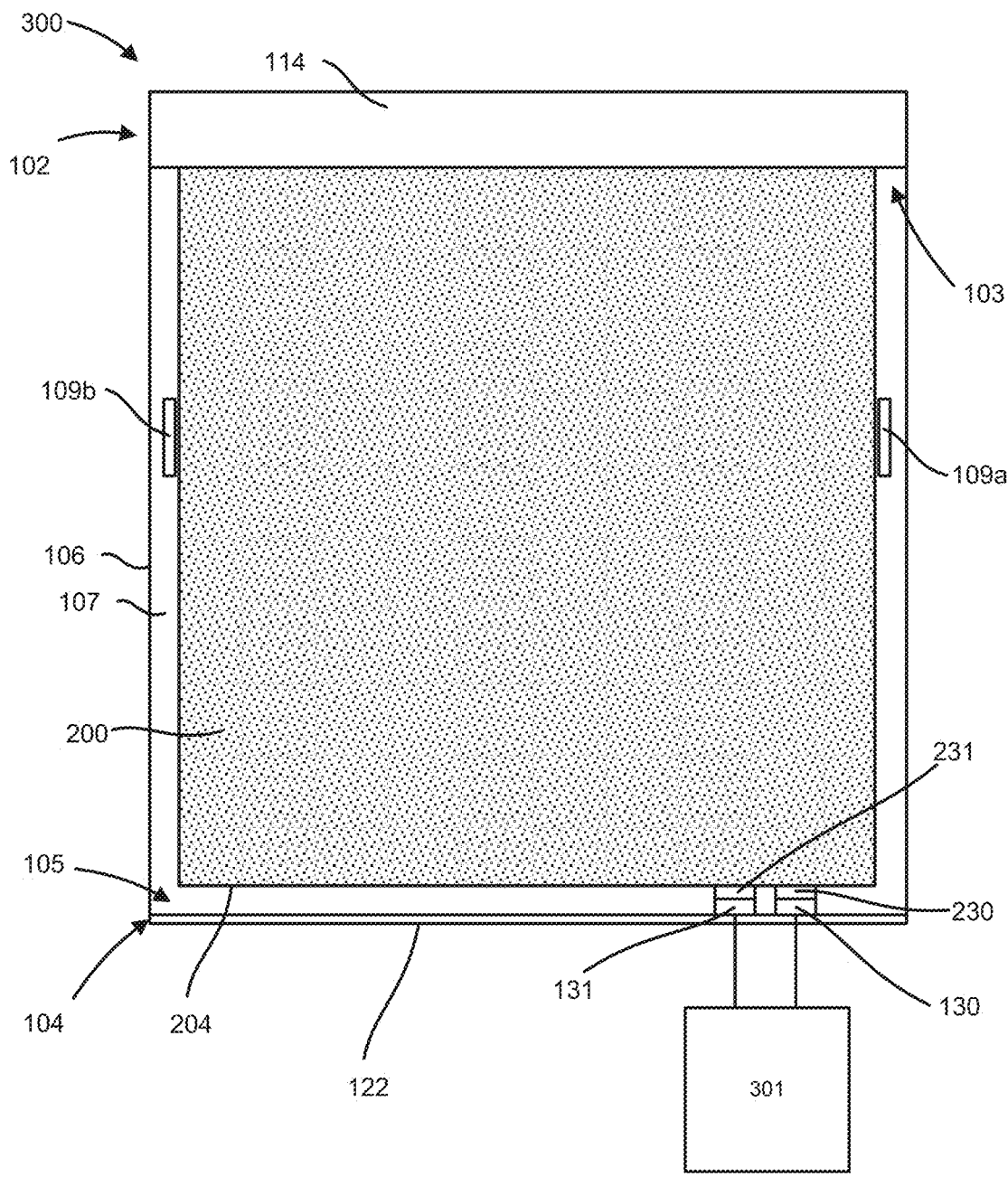
FIG. 3 illustrates a front view of a solar panel mount system including the solar panel mount of FIG. 1 and a solar panel installed therein

FIG. 3 illustrates a front view of the solar panel 200 in the installed position (e.g., as in FIG. 2D) in the solar panel mount 100 to better illustrate the alignment of the electrical contacts of the solar panel 200 and the solar panel mount 100. In FIG. 3, the upper stop 114 of the second support structure 104 has been omitted to show the interface between mount and panel electrical contacts 130 and 230 of the solar panel 200 and the solar panel mount 100, respectively, as well as positions of the mount and panel electrical contacts 130 and 230 relative to the solar panel 200 and the solar panel mount 100. The panel electrical contact 230 and the mount electrical contact 130 can be positioned at any suitable location. As in the example shown, the panel electrical contact 230 and the mount electrical contact near the lower right corners of the solar panel 200 and the solar panel mount 100, respectively, as shown in FIG. 3. However, it is to be appreciated that the respective mount and panel electrical contacts 130 and 230 can be placed anywhere on the solar panel and anywhere on the solar panel mount without any intended limitation. The positions of the respective mount and panel electrical contacts 130 and 230 are only intended to be limited in that the mount and panel electrical contacts 130 and 230 should correspond to each other and placed so as to establish an electrical connection between them when the solar panel 200 is in the installed position within the solar panel mount 100.

Additionally, as further shown in FIG. 3, additional electrical contacts can be included in the auto-connecting electrical contact system, and supported on or by the solar panel 200 and the solar panel mount 100. For example, a second panel electrical contact 231 and a second mount electrical contact 131 can be mounted respectively to the solar panel 200 and the solar panel mount 100 to provide an additional electrical connection between the solar panel 200 and the solar panel mount 100. While the second respective mount and panel electrical contacts 131 and 231 are shown located at the same corner as the first electrical contacts 130 and 230, it is to be understood that the second mount and panel electrical contacts 131 and 231 can be placed anywhere, whether proximal to or remote from the first electrical contacts 130 and 230, without any intended limitation as long as the second electrical contacts 131 and 231 align with each other to electrically connect to each other when the solar panel 200 is placed in the installed position within the solar panel mount 100. The guides 109a and 109b can act to constrain lateral movement of the solar panel 200 within the solar panel mount 100 to ensure that the mount and panel electrical contacts 130 and 230, as well as the mount and panel electrical contacts 131 and 231, are properly aligned with each other to provide electrical connection between the solar panel 200 and the solar panel mount 100.

The mount electrical contacts 130 and 131 of the solar panel mount 100 can be in electrical communication with an electrical power system 301 that receives or stores solar energy generated by the solar panel 200. As such, it can be said that the solar panels 200 are also in electrical communication with the electrical power system 301, although their connection is through the solar panel mount 100. Moreover, the panel electrical contacts 230 and 231 of the solar panel 200 can be connected via one or more electrically conductive pathways (e.g., wires) to one or more photovoltaic cells of the solar panel 200. Accordingly, when the solar panel 200 generates solar power via the photovoltaic cells thereof, the panel electrical contacts 230 and 231 can provide or convey the generated power to the mount electrical contacts 130 and 131, which in turn provide or convey the power to the electrical system 301.

The electrical power system 301 can comprise one or more batteries that store the solar power generated by the solar panel 200, and/or an electrical power grid that receives and distributes electrical power generated by the solar panel 200, and/or a device, mechanism, apparatus, or system powered by the solar power generated by the solar panel 200. The first mount and panel electrical contacts 130 and 230 can have a positive potential and the second mount and panel electrical contacts 131 and 231 can have a negative potential. Alternatively, the electrical contacts 130 and 230 can have a negative potential and the second electrical contacts 131 and 231 can have a positive potential. Alternatively, the electrical contacts 130 and 230 can have a ground potential and the second electrical contacts 131 and 231 can have a positive or negative potential. Furthermore, the electrical contacts 130 and 230 can have a positive or negative potential and the second electrical contacts 131 and 231 can have a ground potential. In short, any combination of potentials used for solar panels can be provided by the electrical contacts 130 and 230 and the second electrical contacts 131 and 231. Furthermore, any number of electrical contacts can be used in the solar panel mount system 300; the system is not intended to be limited to just those shown in FIGS. 2A-3. The electrical power system 301 can further comprise, or in the alternative be operable with, various other components that enable the operation and function of the solar panel(s) and any associated solar panel array, such as inverters, AC/DC disconnects, charge controllers, power meters, backup power sources, and any others or any combination of these.

Various examples of the mount electrical contacts (e.g., 130, 131), and the panel electrical contacts (e.g., 230, and 231) will be described with reference to FIGS. 4A-5E. In FIG. 4A, a portion of solar panel mount system 300 is illustrated. A pair of electrical contacts are illustrated as being supported on, or integrally formed within a structure. For purposes of FIG. 4A, it is to be understood that the structure can be either a portion of the solar panel 200 (e.g., the second edge 204 of the solar panel 200), or a portion of the solar panel mount 100 (e.g., the back stop 122 of the solar panel mount 100) shown in FIGS. 1-3, however this is not intended to be limiting in any way as those skilled in the art will recognize that the electrical contacts can be supported on any structural portion of a solar panel or a solar panel mount. It is to be further understood that the electrical contacts can represent either contacts of the solar panel 200 (e.g., panel electrical contacts 230 and 231) or electrical contacts of the solar panel mount 100 (e.g., panel mount electrical contacts 130 and 131).

Exemplary configurations of an electrical contact, which can be any of the electrical contacts (e.g., mount electrical contacts 130, 131, or panel electrical contacts 230, 231) are illustrated in FIGS. 4B-4E. Each of FIGS. 4B-4E show a cross-sectional view of the solar panel mount system 300 taken along line AA shown in FIG. 4A. While the electrical contacts are shown to be of a certain size and configuration (e.g., circular cross-section) in FIG. 4A, the size and configuration or shape of the electrical contacts are not intended to be limited in any way by the disclosure. Indeed, these can comprise a circular, oval, square, rectangular, triangular, or any other cross-sectional shape, as well as other configurations, without departing from the disclosure.

FIGS. 4B-4E illustrate various configurations of electrical contacts that make face-to-face contact to form an electrical connection. As such, in some examples these face-to-face electrical contacts can be referred to as face connecting electrical contacts. As shown in FIGS. 4B-4E, the electrical contact can be coupled to, integrally formed with, or otherwise supported on or by a surface of the solar panel or a surface of the solar panel mount. The electrical contact can sit directly on the surface, or can be at least partially recessed into the surface of the solar panel or the solar panel mount.

FIG. 4B illustrates an exemplary configuration B of an electrical contact (e.g., 131 or 230) in which the electrical contact 131 or 230 is directly coupled to a surface of the solar panel 200 (e.g., the edge 204) or to a surface of the solar panel mount 100 (e.g., the back stop 122), and therefore extends outward from the surface. FIG. 4C illustrates an exemplary configuration C of an electrical contact (e.g., 131 or 230) in which the electrical contact 131 or 230 is fully recessed into the surface of the solar panel 200 or the solar panel mount 100, and therefore is flush with the surface. FIG. 4D illustrates an exemplary configuration D of an electrical contact (e.g., 131 or 230) in which the electrical contact 131 or 230 is fully recessed into the surface of the solar panel 200 or the solar panel mount 100, such that the electrical contact 131 or 230 is recessed below the surface of the solar panel 200 or the solar panel mount 100. FIG. 4E illustrates an exemplary configuration E of an electrical contact (e.g., 131 or 230) in which the electrical contact 131 or 230 is partially recessed into the surface of the solar panel 200 or the solar panel mount 100, but is configured such that the electrical contact 131 or 230 at least partially extends outward away from the surface of the solar panel 200 or the solar panel mount 100.

Each of the electrical contacts 131, 230 are shown to be in contact with an electrically conductive pathway such as a wire 101 that is disposed within, or that runs adjacent to, the solar panel 200 or solar panel mount 100 and provides electrical connection between the solar panel 200 or solar panel mount 100 and another electrical system (e.g., see the electrical system 301 of FIG. 3). While certain configurations illustrate the electrical contacts in direct contact with the edge 204 of the solar panel 200 or the back stop 122 of the solar panel mount 100, it is to be understood that an electrically insulating material can be provided between the electrical contacts and the surface of the solar panel 200 or the solar panel mount 100 in support of the electrical contacts to ensure that the electrical contacts cause flow of electrons into the solar panel 200 or the solar panel mount 100.

It is to be understood by this disclosure that the electrical contacts 130, 131, 230, and 231 can be any combination of the configurations B, C, D, and E shown in FIGS. 4B-4E as long as electrical contact can be made between corresponding electrical contacts. For example, the electrical contact 230 of the solar panel 200 can have an outer contact surface comprising the protruding configuration B which can make electrical contact with an electrical contact 130 of the solar panel mount 100 having an outer contact surface having any of configurations B, C, D, or E. In other words, the protruding electrical contact of configuration B of the electrical contact 230 can make electrical contact with a corresponding (the term "corresponding" meaning two respective electrical contacts that are intended to connect with or to one another to establish an electrical connection) electrical contact having any of the recessed (e.g., configuration D), flush (e.g., configuration C), or protruding (e.g., configurations B and E) configurations. In another example, the electrical contact 230 of the solar panel 200 can have the flush configuration C which can make electrical contact with a corresponding electrical contact 130 of the solar panel mount 100 having the flush (e.g., configuration C) or protruding (e.g., configurations B and E) configurations. In another example, the electrical contact 230 of the solar panel 200 can have an outer contact surface having the recessed configuration D which can make electrical contact with a corresponding electrical contact 130 of the solar panel mount 100 having an outer contact surface having the protruding (e.g., configurations B and E) configurations. In another example, the electrical contact 230 of the solar panel 200 can have an outer contact surface having the protruding, partially recessed configuration E which can make electrical contact with a corresponding electrical contact 130 of the solar panel mount 100 having an outer contact surface having any of the recessed (e.g., configuration D), flush (e.g., configuration C), or protruding (e.g., configurations B and E) configurations.

Alternative examples of the panel electrical contacts (e.g., 230, 231) and the mount electrical contacts (e.g., 130, 131) will be described with reference to FIGS. 5A-5E. In FIG. 5A, a portion of solar panel mount system 300 is illustrated. A pair of electrical contacts are illustrated on a structure. For purposes of FIG. 5A, it is to be understood that the structure can be either a portion of the solar panel 200 (e.g., the second edge 204 of the solar panel 200), or a portion of the solar panel mount 100 (e.g., the back stop 122 of the solar panel mount 100) shown in FIGS. 1-3. It is to be further understood that the electrical contacts can represent either contacts of the solar panel 200 (e.g., electrical contacts 230 and 231) or electrical contacts of the solar panel mount 100 (e.g., electrical contacts 130 and 131).

Exemplary configurations of an electrical contact, which can be any of the electrical contacts (e.g., mount electrical contacts 130, 131, or panel electrical contacts 230, 231) are illustrated in FIGS. 5B-5E. Each of FIGS. 5B-5E show a cross-sectional view of the solar panel mount system 300 taken along line BB shown in FIG. 5A. While the electrical contacts are shown to be of a certain size and configuration (e.g., circular cross-section) in FIG. 4A, the size and configuration or shape of the electrical contacts are not intended to be limited in any way by the disclosure. Indeed, these can comprise a circular, oval, square, rectangular, triangular, or any other cross-sectional shape, as well as other configurations, without departing from the disclosure.

FIGS. 5B-5E illustrate various alternative configurations of the electrical contacts of FIGS. 4B-4E. The configurations W, X, Y, and Z of FIGS. 5B-5E illustrate electrical contacts including a seal (e.g., 350 or 351) disposed around a perimeter of the electrical contacts (e.g., 130, 131, or 230, 231).

FIG. 5B illustrates an exemplary configuration W of an electrical contact (e.g., 131 or 230) in which the electrical contact 131 or 230 is directly coupled to a surface of the solar panel 200 (e.g., the edge 204) or to a surface of the solar panel mount 100 (e.g., the back stop 122), and therefore extends outward from the surface. FIG. 5C illustrates an exemplary configuration X of an electrical contact (e.g., 131 or 230) in which the electrical contact 131 or 230 is fully recessed into the surface of the solar panel 200 or the solar panel mount 100 and therefore is flush with the surface. FIG. 5D illustrates an exemplary configuration Y of an electrical contact (e.g., 131 or 230) in which the electrical contact 131 or 230 is fully recessed into the surface of the solar panel 200 or the solar panel mount 100 such that the electrical contact 131 or 230 recessed below the surface of the solar panel 200 or the solar panel mount 100. FIG. 5E illustrates an exemplary configuration Z of an electrical contact (e.g., 131 or 230) in which the electrical contact 131 or 230 is partially recessed into the surface of the solar panel 200 or the solar panel mount 100 such that the electrical contact 131 or 230 at least partially extends outward away from the surface of the solar panel 200 or the solar panel mount 100.

Each of the electrical contacts 131, 230 are shown to be in contact with an electrically conductive pathway such as a wire 101 that is disposed within, or that runs adjacent to, the solar panel 200 or solar panel mount 100 and provides electrical connection between the solar panel 200 or solar panel mount 100 and another electrical system (e.g., see the electrical system 301 of FIG. 3). While certain configurations illustrate the electrical contacts in direct contact with the edge 204 of the solar panel 200 or the back stop 122 of the solar panel mount 100, it is to be understood that an electrically insulating material can be provided between the electrical contacts and the surface of the solar panel 200 or the solar panel mount 100 in support of the electrical contacts to ensure that the electrical contacts cause flow of electrons into the solar panel 200 or the solar panel mount 100.

It is to be understood by this disclosure that the electrical contacts 130, 131, 230, and 231 can be any combination of the configurations W, X, Y, and Z shown in FIGS. 5B-5E as long as electrical contact can be made between corresponding electrical contacts. For example, the electrical contact 230 of the solar panel 200 can have an outer contact surface having the protruding configuration W which can make electrical contact with an electrical contact 130 of the solar panel mount 100 having an outer contact surface having any of configurations W, X, Y, and Z. In other words, the protruding electrical contact of configuration W can make electrical contact with a corresponding electrical contact having any of the recessed (e.g., configuration Y), flush (e.g., configuration X), or protruding (e.g., configurations W and Z) configurations. In another example, the electrical contact 230 of the solar panel 200 can have an outer contact surface having the flush configuration X which can make electrical contact with a corresponding electrical contact 130 of the solar panel mount 100 having an outer contact surface having the flush (e.g., configuration X) or protruding (e.g., configurations W and Z) configurations. In another example, the electrical contact 230 of the solar panel 200 can have an outer contact surface having the recessed configuration Y which can make electrical contact with a corresponding electrical contact 130 having an outer contact surface having the protruding (e.g., configurations W and Z) configurations. In another example, the electrical contact 230 of the solar panel 200 can have an outer contact surface having the protruding, partially recessed configuration Z which can make electrical contact with a corresponding electrical contact 130 of the solar panel mount 100 having an outer contact surface having any of the recessed (e.g., configuration Y), flush (e.g., configuration X), or protruding (e.g., configurations W and Z) configurations.

In each configuration combination for electrically connecting the solar panel 200 to the solar panel mount system 300, one or more seals can be disposed between the solar panel 200 and the solar panel mount 100. The seal(s) can be configured to enclose or surround the electrical contacts, and can act to seal corresponding electrical contacts (again, corresponding meaning two respective electrical contacts that are intended to connect with or to one another for the purpose of establishing an electrical connection), namely, a panel electrical contact (e.g., panel electrical contact 230) in electrical connection with a mount electrical contact (e.g., the mount electrical contact 130), from the environment with the panel electrical contact 230 and the mount electrical contact 100 being electrically connected to one another upon installation of the solar panel 200 with the solar panel mount 100. Indeed, although FIG. 5A is intended to illustrate a solar panel mount 100 with its mount electrical contacts 130, 131, or in the alternative, a solar panel 200 with its panel electrical contacts 230, 231, it will be apparent from the disclosure and the drawings that a seal 350 around a panel electrical contact 230 or 231 of a solar panel 200 can mate with a seal 351 around a corresponding mount electrical contact 130 or 131 of a solar panel mount 100 to seal off both the mount and panel electrical contacts 130, 131 and 230, 231, respectively, from an outside environment, thereby preventing corrosion and contamination of the mount and panel electrical contacts 130 and 230, and ensuring a clean and reliable electrical connection is made. Of course, this example arrangement is not intended to be limiting in any way. Indeed, the present disclosure contemplates any number of seals in any arrangement designed and configured to seal the electrical contacts and the established electrical connection between two or more electrical contacts. In one example, a seal (e.g., seal 350 and/or 351) can be supported about a surface of the solar panel mount 100 adjacent a mount electrical contact, and the seal can be configured to extend away from the surface to a distance sufficient to mate or engage with a corresponding seal in connection with a corresponding panel electrical contact of the solar panel 200, or with a surface of the solar panel 200, upon installing the solar panel 200 with the solar panel mount 100. In this way, as the solar panel 200 is installed with the solar panel mount 100, a seal is formed that seals both the mount and panel electrical contacts from the outside environment.

The seals 350 and/or 351 can be made of any material or combination of materials suitable for forming a watertight seal to seal the electrical contact off from the outside environment. The materials can be a polymer, rubber, elastomer, or other compliant or elastic material that can deform under an applied load and return to an original shape after removal of the applied load. For example, the seals 350 and/or 351 can be made of one or more materials such as, but not limited to, natural rubber, butyl rubber, and nitrile rubbers, highly saturated nitrile rubber, carboxilated nitrile rubber, fluoroelastomers, fluororubber (Viton), fluorinated ethylene propylene, polytetrafluoroethylene (Teflon), polypropylene, polyethylene, acrylonitrile rubbers, silicone, polyurethane, Ethylene propylene diene monomer, fluorosilicone, ethylene propylene diene monomer (EPDM) rubber, polychloroprene synthetic rubber (Neoprene), butyl rubber, ethylene acrylic copolymer, chlorosulfonated polyethylene synthetic rubber, polyacrylate rubber, styrene-butadiene rubber.

It is to be further understood that the seals (e.g., seal 350 and/or seal 351) can be an adhesive that cures around the electrical contacts and adheres to a solar panel or panel mount opposite the seal to form a bond sealing the electrical contacts and connections off from the outside environment.

It is to be further understood that the configurations B, C, D, and E illustrated in FIGS. 4B-4E can also connect with the configurations W, X, Y, and Z illustrated in FIGS. 5B-5E in various combinations to seal the electrical contacts 130 and 230 from the outside environment. In other words, it is not necessary for a seal 350 to be around both the electrical contact 230 of the solar panel 200 and the electrical contact 130 of the solar panel mount 100 to seal the electrical contacts off from the outside environment. One seal around one of the contacts can be sufficient to seal the contacts from the environment.

With reference to FIGS. 6A-6I, various examples of auto-connecting electrical contact systems including various combinations of connection configurations or arrangements (e.g., B-E of FIGS. 4B-4E, and W-Z of FIGS. 5B-5E) are shown in electrical contact with each other to show the variations of electrical contacts and their configurations that can be used together. In FIGS. 6A-6I the electrical contacts are shown in a face-to-face connection in which a face of one electrical contact is in contact with a face of another electrical contact. As such, in some examples these face-to-face electrical contacts can be referred to as face connecting electrical contacts. For purposes of convenience the solar panel and solar panel mount structures in support of the electrical contacts are labeled as M and N. It is to be understood that any of the structures M and N for each connection shown in FIGS. 6A-7H can be either the solar panel 200 or the solar panel mount 100. Moreover, it is to be understood that the electrical contacts can be supported about any surface of the solar panel and solar panel mount structures (M and N), not just those surfaces shown, as long as the one or more electrical contacts supported on a solar panel establish an electrical connection with a corresponding electrical contact supported in a solar panel mount upon installation of the solar panel with the solar panel mount.

Figure 6A:
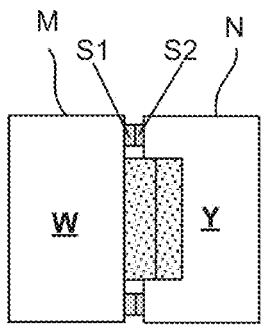
FIGS. 6A-6I illustrate various connection combinations of the electrical contact configurations shown in FIGS. 4B-4E and 5B-5E.
Figure 6B:
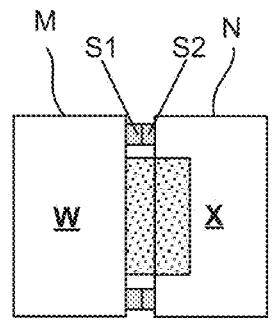
Figure 6C:
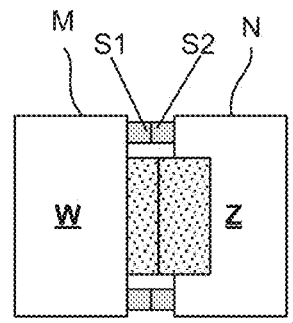
Figure 6D:
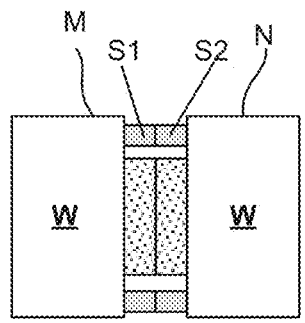
Figure 6E:
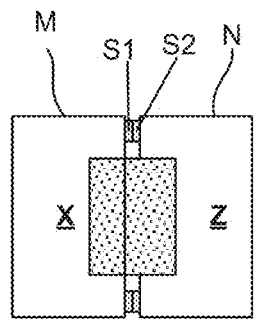
Figure 6F:
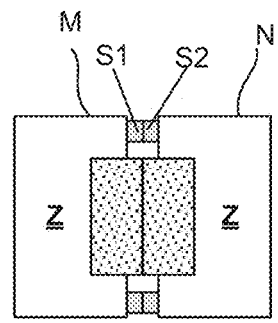
Figure 6G:
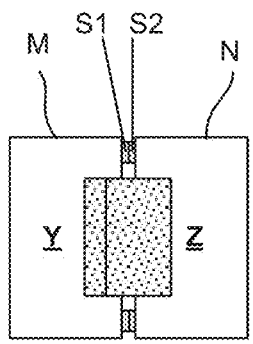

FIG. 6A illustrates an example in which the protruding electrical contact of configuration W (e.g., shown in FIG. 5B) is in electrical contact with the recessed electrical contact of configuration Y (e.g., as shown in FIG. 5D). FIG. 6B illustrates an example in which the electrical contact of configuration W is in electrical contact with the flush electrical contact configuration X (e.g., as shown in FIG. 5C). FIG. 6C illustrates an example in which the electrical contact of configuration W is in electrical contact with the recessed and protruding electrical contact configuration Z (e.g., as shown in FIG. 5E). FIG. 6D illustrates an example in which the electrical contact of configuration W is in electrical contact with the electrical contact of configuration W. FIG. 6E illustrates an example in which the electrical contact of configuration X is in electrical contact with the electrical contact of configuration Z. FIG. 6F illustrates an example in which the electrical contact of configuration Z is in electrical contact with the electrical contact of configuration Z. FIG. 6G illustrates an example in which the electrical contact of configuration Y is in electrical contact with the electrical contact of configuration Z.

In each of the configurations shown in FIGS. 6A-6G, each of the configurations comprise at least one seal (e.g., seal S1 and/or seal S2) situated between each of the structures M and N. As illustrated the seals S1 and S2 can seat against each other when electrical contact is made to seal the electrical contacts from the outside environment. Of course, a single seal could be used in any of these examples that seals between opposing surfaces of M and N and around the electrical contacts. It is to be further understood that the seals (e.g., seal S1 and seal S2) can each be separate compounds of a two-part adhesive such as an epoxy that, when in contact with each other, cure around the electrical contacts and adheres to a solar panel or panel mount opposite the seal to form a bond sealing the electrical contacts and connections off from the outside environment.

Figure 6H:
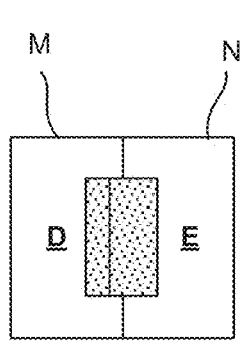
Figure 6I:
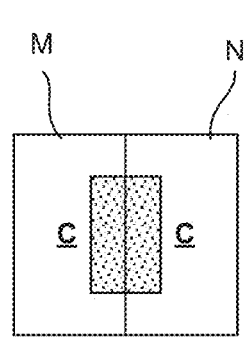

In alternative connection arrangements, and particularly alternative contact surface configurations, FIG. 6H illustrates an example in which the recessed electrical contact of configuration D (e.g., shown in FIG. 4D) is in contact with the electrical contact of configuration E (e.g., shown in FIG. 4E). FIG. 6I illustrates an example in which the flush electrical contact of configuration C (e.g., shown in FIG. 4C) is in electrical contact with another electrical contact of configuration C. In the examples of FIGS. 6H and 6I no seals are present such that the contacts, and optionally surfaces of the structures M and N, seat directly against each other. Of course, as stated, a seal, such as seal S1, can be situated between the opposing surfaces of M and N to provide an enhanced or more robust seal over one formed between the two opposing surfaces of M and N in direct contact with one another.

Figure 7A:
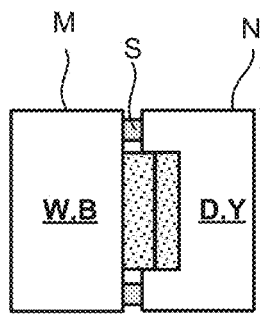
FIGS. 7A-7H illustrate various connection combinations of the electrical contact configurations shown in FIGS. 4B-4E and 5B-5E.
Figure 7B:
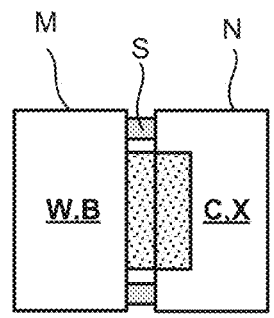
Figure 7C:
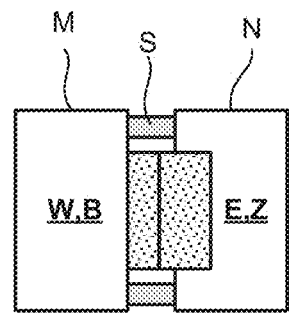
Figure 7D:
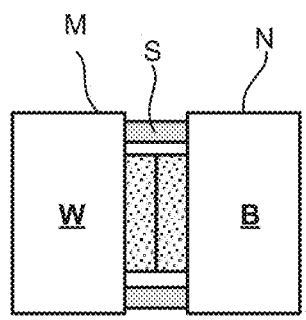
Figure 7E:
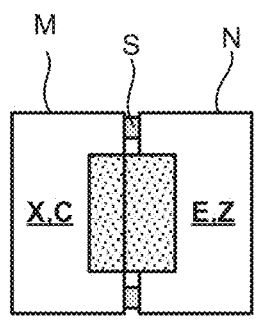
Figure 7F:
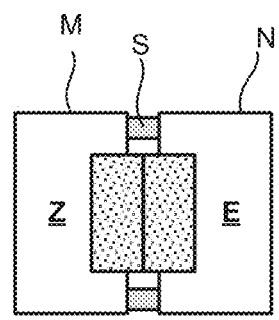
Figure 7G:
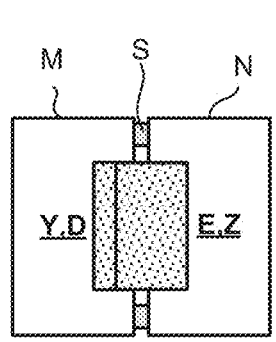

With reference to FIGS. 7A-7H, various examples of auto-connecting electrical contact systems including various combinations of connection arrangements or configurations (e.g., B-E of FIGS. 4B-4E and W-Z of FIGS. 5B-5E) are shown in electrical contact with each other to show the variations of electrical contacts and their configurations that can be used together. Because only one seal S is necessary to seal the electrical contacts from the outside environment in these examples, FIGS. 7A-7G illustrate connection configurations in which one of configurations B, C, D, and E (e.g., FIGS. 4B-4E) is connected to one of the configurations W, X, Y, and Z (e.g., FIGS. 5B-5E). In FIGS. 7A-7H, the electrical contacts are shown in a face-to-face connection in which a face of one electrical contact is in contact with a face of another electrical contact. As such, in some examples these face-to-face electrical contacts can be referred to as face connecting electrical contacts. FIG. 7A illustrates an example in which the electrical contact of configuration W is in contact with the electrical contact of configuration D, or the electrical contact of configuration B is in contact with the electrical contact of configuration Y. FIG. 7B illustrates an example in which the electrical contact of configuration W is in contact with the electrical contact of configuration C, or the electrical contact of configuration B is in contact with the electrical contact of configuration X. FIG. 7C illustrates an example in which the electrical contact of configuration W is in contact with the electrical contact of configuration E, or the electrical contact of configuration B is in contact with the electrical contact of configuration Z. FIG. 7D illustrates an example in which the electrical contact of configuration W is in contact with the electrical contact of configuration B. FIG. 7E illustrates an example in which the electrical contact of configuration X is in contact with the electrical contact of configuration E, or the electrical contact of configuration C is in contact with the electrical contact of configuration Z. FIG. 7F illustrates an example in which the electrical contact of configuration Z is in contact with the electrical contact of configuration E. FIG. 7G illustrates an example in which the electrical contact of configuration Y is in contact with the electrical contact of configuration E, or the electrical contact of configuration D is in contact with the electrical contact of configuration Z. As will be appreciated by the above paragraph in light of the rest of the disclosure, only one of the structures in each combination illustrated in FIGS. 7A-7G includes a seal S. In other words, only configurations W, X, Y, and Z include a seal S while configurations B, C, D, and E do not. Accordingly, in each of the examples of 7A-7G, the seals S seat against surfaces of structures M or N to form a watertight seal and to seal the electrical contacts from the outside environment.

It is to be further understood that the seal S can be an adhesive that cures around the electrical contacts and adheres to a solar panel and/or panel mount (e.g., structures M and/or N) to form a bond sealing the electrical contacts and connections off from the outside environment.

Figure 7H:
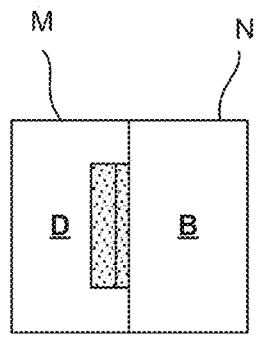

In an alternative connection shown in FIG. 7H, no seal is present and an example is illustrated in which the recessed electrical contact of configuration D (e.g., shown in FIG. 4D) is in contact with the electrical contact of configuration B (e.g., shown in FIG. 4B). In the examples of FIG. 7H no seal is present, such that the electrical contacts, and optionally surfaces of the structures M and N, seat directly against each other.

Any of the electrical contacts (e.g., configurations B, C, D, E, W, X, Y, and Z) and any connection combinations thereof (e.g., connections illustrated in FIGS. 6A-7H) described above can be used in a solar panel mount system (e.g., the solar panel mount system 300) for electrically connecting an installed solar panel to a solar panel mount, and ultimately to an electrical power system. More specifically, any of the electrical contacts and connection combinations can be part of the auto-connecting electrical contact system operable to electrically connect a solar panel with a solar panel mount. The electrical contacts illustrated in FIGS. 6A-7H can each serve as either a panel electrical contact coupled to the solar panel or a mount electrical contact coupled to the solar panel mount.

It is noted herein, and it will be apparent to one of ordinary skill in the art, that a solar panel (e.g., solar panel 200) and a solar panel mount (e.g., solar panel mount 100) can each comprise any number of respective electrical contacts needed or desired in order to establish the needed or desired electrical connections to facilitate sufficient operation of the solar panel within the respective solar panel mount system.

An alternative example of an auto-connecting electrical contact system and an electrical contact connection arrangement is described with respect to FIGS. 8A and 8B, which can be incorporated into any solar panel mount system discussed herein (e.g., solar panel mount system 300). In this example, the panel and mount electrical contacts are supported about different connector parts of an electrical connector. FIG. 8A and FIG. 8B respectively illustrate a perspective view and a top view of an electrical plug 400 as a first connector part of an electrical connector of an auto-connecting electrical contact system for solar panels in accordance with an example of the present disclosure. The electrical plug 400 can include a housing 404 in support of an electrical contact 402 at a distal end of the housing 404. The electrical contact 402 of the electrical plug 400 can be electrically connected to an electrically conductive pathway 406 (e.g., wire) that conducts electricity to and from the electrical contact 402 to facilitate collection of solar power by a solar panel associated with the plug 400. The electrical contact 402 can comprise either of the electrical contact for a solar panel (e.g., a panel electrical contact as associated with the solar panel), or the electrical contact for a solar panel mount (e.g., the mount electrical contact as associated with the solar panel mount).

The housing 404 can comprise a surface configuration defining or comprising a receptacle interface, and can be made of a material that is compressible and/or that deforms under an applied load. Furthermore, the material can be an elastic material that exerts a biasing force to bias the housing 404 to return to an uncompressed state upon removal of the applied load. The housing 404 can be formed of a polymer or elastomer material, or any material that is compressible under an applied load and/or is biased to return to an uncompressed or undeformed state. Additionally, the housing 404 can be made of a material suitable for forming a water tight seal to seal the electrical contact 402 off from the outside environment. For example, the housing 404 can be made of one or more materials such as, but not limited to, natural rubber, butyl rubber, and nitrile rubbers, highly saturated nitrile rubber, carboxilated nitrile rubber, fluoroelastomers, fluororubber (Viton), fluorinated ethylene propylene, polytetrafluoroethylene (Teflon), polypropylene, polyethylene, acrylonitrile rubbers, silicone, polyurethane, Ethylene propylene diene monomer, fluorosilicone, ethylene propylene diene monomer (EPDM) rubber, polychloroprene synthetic rubber (Neoprene), butyl rubber, ethylene acrylic copolymer, chlorosulfonated polyethylene synthetic rubber, polyacrylate rubber, styrene-butadiene rubber.

FIG. 9A and FIG. 9B respectively illustrate a perspective view and a top view of an electrical receptacle 500 as a second connector part of the electrical connector of an auto-connecting electrical contact system for solar panels in accordance with an example of the present disclosure, which can be incorporated into any solar panel mount system discussed herein (e.g., solar panel mount system 300). The electrical receptacle 500 can include an electrical contact 502. The electrical receptacle 500 can further include a housing 504 in support of the electrical contact 502 and disposed to house the electrical contact 502. The electrical contact 502 can comprise either of the electrical contact for a solar panel (e.g., a panel electrical contact as associated with the solar panel), or the electrical contact for a solar panel mount (e.g., the mount electrical contact as associated with the solar panel mount). In some examples, the electrical contact 502 can be the panel electrical contact and the electrical contact 402 can be the mount electrical contact. In other examples, the electrical contact 502 can be the mount electrical contact and the electrical contact 402 can be the panel electrical contact.

The housing 504 of the electrical receptacle 500 can include a wall 508 comprising a surface configuration defining or comprising a plug interface, and defining an opening 510 and an interior cavity 512 sized and configured to receive the housing 404 of the electrical plug 400 therein. The electrical contact 502 can be supported and located at a bottom of the housing 504 and can be electrically connected to a conductive pathway 506 (e.g., wire) that conducts electricity to and from the electrical contact 502 of the electrical receptacle 500 to facilitate collection of solar energy by a solar panel.

The electrical receptacle 500 (first connector part of the electrical connector), as supported on one of the solar panel or the solar panel mount, can be configured to receive and electrically connect with the electrical plug 400 (second connector part of the electrical connector), as supported on the other of the solar panel or the solar panel mount not in support of the electrical receptacle 500. The electrical contact 502 of the receptacle 500 can be configured to contact the electrical contact 402 of the plug 400 to establish an electrical connection, and to facilitate electrical conduction through the plug 400 and the receptacle 500. In other words, the housing 404 of the electrical plug 400 can be inserted into the opening 510 and cavity 512 of the housing 504 of the electrical receptacle 500 upon the solar panel being installed with the solar panel mount (e.g., see solar panel 200 installed with the solar panel mount 100 of FIGS. 1-3) to make an electrical connection between the electrical plug 400 and the electrical receptacle 500.

Figure 10:
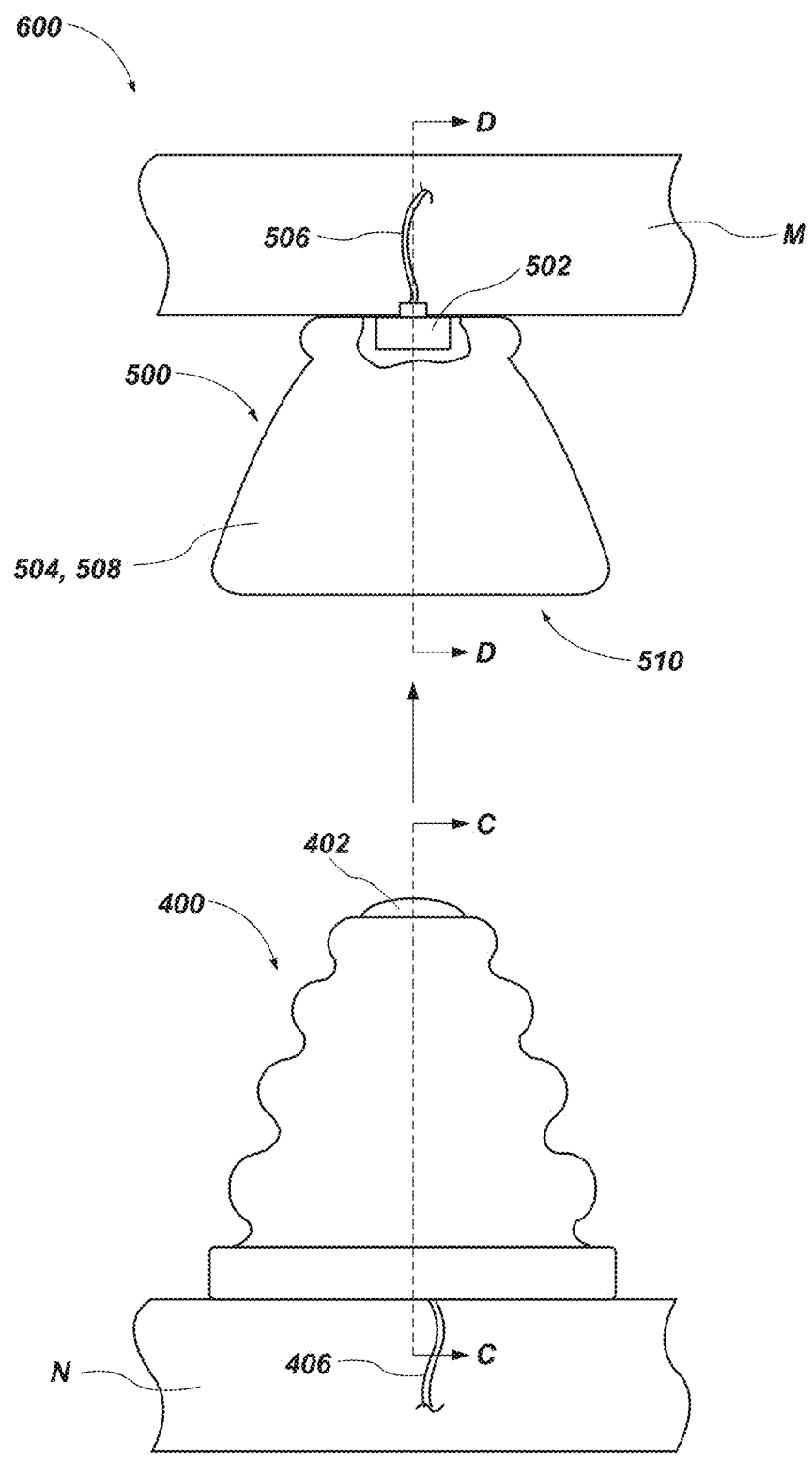
FIG. 10 illustrates a view of the receptacle of FIG. 9A connecting with the plug of FIG. 8A.

FIG. 10 illustrates an exemplary view of an auto-connecting electrical contact system 600 including the electrical plug 400 and the electrical receptacle 500 of FIGS. 8A-9B, respectively, which can be incorporated into any solar panel mount system discussed herein (e.g., solar panel mount system 300). The state shown in FIG. 10 is a state in which the electrical plug 400 is disconnected from the electrical receptacle 500. From the disconnected state shown in FIG. 10, the electrical plug 400 can be moved toward and inserted into the electrical receptacle 500 to bring the electrical contact 502 into electrical connection with the electrical contact 402 by installing the solar panel with the solar panel mount, wherein an electrical connection is established between the electrical plug 400 and the electrical receptacle 500. In other words, the electrical plug 400, as one side of the electrical connector, and the electrical receptacle 500, as the other side of the electrical connector, can be configured to mate with one another upon the solar panel being installed with the solar panel mount. As such, their respective positions on the solar panel and the solar panel mount will be such that they are at least partially aligned with one another as the solar panel is received within the solar panel mount and placed in the installation position, wherein these are caused to mate with one another and form an electrical connection upon the solar panel being placed in the installed position.

The housing 504 of the electrical receptacle 500 can be made of a material that is compressible and/or deforms under an applied load. Furthermore, the material can be an elastic material that exerts a biasing force to bias the housing 504 to return to an uncompressed or undeformed state upon removal of the applied load. The housing 504 can be formed of a polymer or elastomer material, or any material that is compressible or deformable under an applied load and/or is biased to return to an uncompressed state. Additionally, the housing 504 can be made of a material suitable for forming a water tight seal to seal the electrical contact 502 off from the outside environment. For example, the housing 504 can be made of one or more materials such as, but not limited to, natural rubber, butyl rubber, and nitrile rubbers, highly saturated nitrile rubber, carboxilated nitrile rubber, fluoroelastomers, fluororubber (Viton), fluorinated ethylene propylene, polytetrafluoroethylene (Teflon), polypropylene, polyethylene, acrylonitrile rubbers, silicone, polyurethane, Ethylene propylene diene monomer, fluorosilicone, ethylene propylene diene monomer (EPDM) rubber, polychloroprene synthetic rubber (Neoprene), butyl rubber, ethylene acrylic copolymer, chlorosulfonated polyethylene synthetic rubber, polyacrylate rubber, styrene-butadiene rubber.

As shown in FIG. 10 the plug 400 can be coupled to a structure M and the receptacle 500 can be coupled to a structure N. For facilitating power transfer to/from a solar panel, one of the structures M or N can be a solar panel. It is to be understood that the electrical receptacle 500 or the electrical plug 400 can be coupled to a solar panel while the other of the electrical receptacle 500 or the electrical plug 400 is connected to another structure, such as a solar panel mount structure configured to receive and retain the solar panel therein. For example, the structure M can be the solar panel and the structure N can be the solar panel mount structure. Alternatively, the structure N can be the solar panel and the structure M can be the solar panel mount structure. The solar panel mount structure can be electrically connected to an electrical system (e.g., batteries, a power grid, or other electrical storage or disbursement system) configured to receive and/or store electricity generated by the solar panel collecting solar energy. Accordingly, electrical connection via the electrical plug 400 and the electrical receptacle 500 facilitates transfer of electrical power from the solar panel to an electrical system that utilizes the power derived from the energy collected by the solar panel.

It is noted herein that any of the auto-connecting electrical contact systems discussed herein can also be used to connect a solar panel (e.g., in this example the structure M comprises a first solar panel) to one or more adjacent solar panels (e.g., the structure N comprises a second solar panel), or any structure or system without intended limitation in order to generally speaking conduct electricity between a solar panel and at least one other device.

Figure 11:
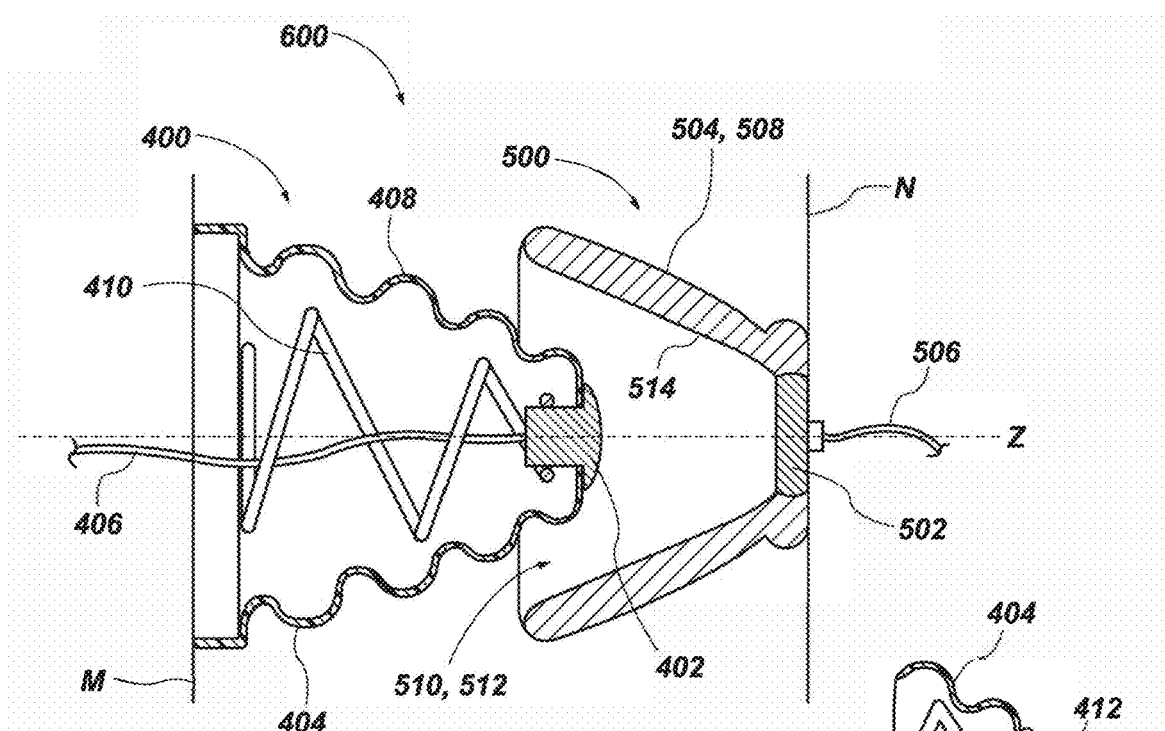
FIG. 11 illustrates a cross-sectional view of the plug of FIGS. 8B and 10 taken along line CC connecting with a cross-sectional view of the receptacle of FIGS. 9B and 10 taken along line DD.
Figure 12:
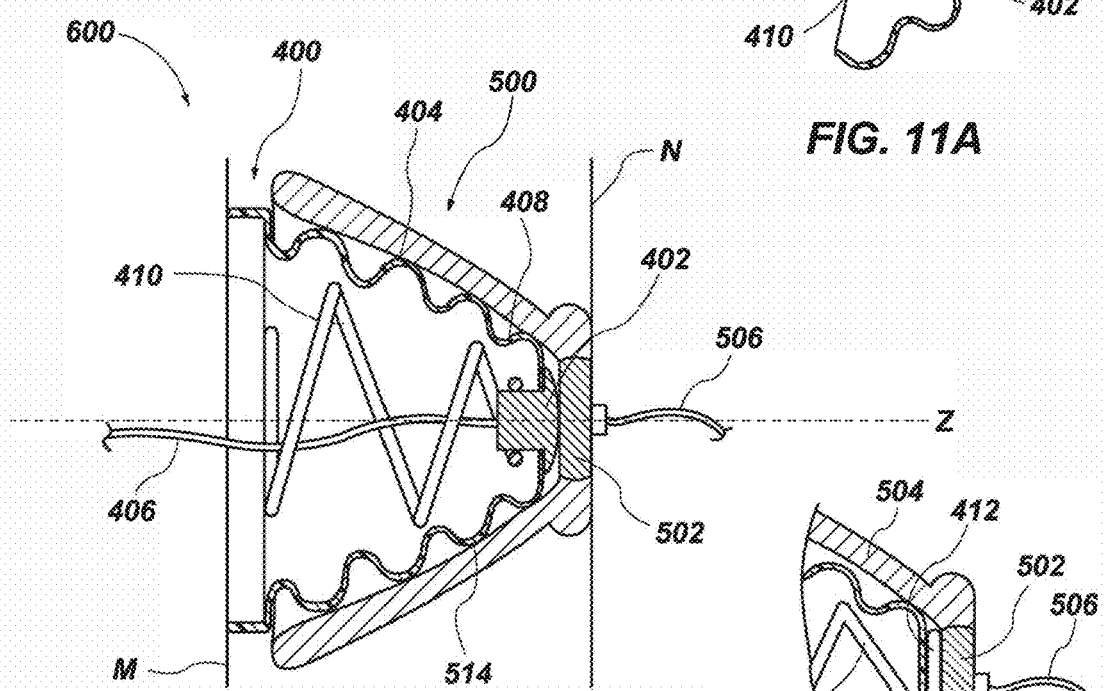
FIG. 12 illustrates a cross-sectional view of the plug of FIGS. 8B and 10 taken along line CC connecting with a cross-sectional view of the receptacle of FIGS. 9B and 10 taken along line DD.

FIG. 11 and FIG. 12 illustrate various steps of connection of the various parts or portions of the auto-connecting electrical contact system 600 (e.g., between the electrical contact 402 and the electrical contact 502, or in other words, the electrical plug 400 and the electrical receptacle 500). FIG. 11 and FIG. 12 show cross-sectional views of the electrical receptacle 500 and the electrical plug 400. The cross section of the electrical plug 400 is taken along line CC shown in FIGS. 8B and 10, and the cross section of the electrical receptacle 500 is taken along line DD shown in FIGS. 9B and 10.

As described above, FIG. 10 shows the electrical plug 400 and the electrical receptacle 500 in a disconnected state. From the disconnected state in FIG. 10 the plug 400 and/or the receptacle 500 can be moved in to a state in which the plug 400 initially enters the opening 510 and cavity 512 of the receptacle 512, as shown in FIG. 11. The plug 400 can be received within the receptacle 500 upon the solar panel 200 being moved into the installation position within the solar panel mount 100. In the cross-sectional views (e.g., FIGS. 11 and 12) of the plug 400 engaging with the receptacle 500, the housing 404 is inserted into the opening 510 and cavity 512 defined by the wall 508 of the housing 504 of the receptacle 500.

The auto-connecting electrical contact system 600 can function to facilitate automatic alignment of the plug 400 with the receptacle 500 as the solar panel is being installed with the solar panel mount for proper insertion of the plug 400 into the receptacle 500 and to ensure proper alignment and electrical connection between the electrical contact 402 and the electrical contact 502 by way of these components contacting one another. In the auto-connecting electrical contact system 600, the housing 504 of the receptacle 500 can include the opening 510 and the interior cavity 512 defined by the wall 508 of the housing 504. The wall 508 can have an inner surface 514 defining a plug interface, shaped to self-guide and self-align the housing 404 and the electrical contact 402 of the plug 400 to the electrical contact 502 of the receptacle 500 as the plug 400 with its housing 404 is inserted into the receptacle 500 with its housing 504. Accordingly, the inner surface 514 of the receptacle 500 forms a guiding surface that functions to guide the plug 400 into proper alignment relative to the receptacle 500 in order to achieve a proper electrical contact between the electrical contact 402 and the electrical contact 502. As used herein, the term "guiding surface" refers to an inner surface of a receptacle that defines a cavity that has a cross-sectional area that decreases from an opening of the cavity to a bottom of the cavity along the axis Z, and a plug interface. The inner surface and cavity providing the plug interface are configured to capture and interface with a corresponding outer surface of a plug. In other words, the guiding surface forms a funneling guide from an opening of a cavity to a feature (e.g., electrical contact) or element disposed at a bottom of the cavity 512.

In the auto-connecting electrical contact system 600 the housing 404 of the plug 400 can have an outer surface 408 that defines a receptacle interface, and that is sized and shaped to be received within the opening 510 and the cavity 512 defined by the inner surface 514 of the wall 508 of the housing 504 of the receptacle 500. The corresponding shapes/sizes of the housings 404 and 504 can ensure that the plug 400 is captured and guided within the interior cavity 512 of the receptacle 500, such that the electrical contact 402 electrically connects with the electrical contact 502 upon installing the solar panel 200 within the solar panel mount 100, such as, for example, upon the solar panel 200 being caused to transition from the installation position to an installed position within the solar panel mount 100.

FIG. 12 illustrates the housing 404 of the plug 400 captured and disposed or received within the housing 504 of the receptacle 500, wherein the electrical contact 402 is in contact with the electrical contact 502 so as to form an electrical connection between the electrical contact 402 and the electrical contact 502. For example, as a solar panel 200 is caused to be moved from the installation position to the installed position within the solar panel mount 100, the plug 400 and the housing 404 can initially be at least somewhat aligned with and inserted into the receptacle 500 via the opening 510 of the receptacle 500, such that the plug 400 is partially received within the receptacle 500. As the solar panel 200 is caused to be placed in the installed position, the plug 400 can be fully captured within the receptacle 500, wherein the plug 400 and the receptacle 500 are brought into proper alignment with one another even if slightly out of alignment during the installation process.

Being made of a compliant and/or elastic material, the housing 404 of the plug 400 can flex to a compressed state, which is shown in FIG. 12. The electrical contact 402 can initially contact the electrical contact 502 while the housing 404 is in an uncompressed state. However, as the plug 400 is further pushed into the receptacle 500, the housing 404, which can be made of a compressible, deformable, elastic or polymeric material, compresses between the structure M and the housing 504 and the electrical contact 502 of the receptacle 500. As the housing 404 compresses between the structures M and N along the axis Z, the housing 404 also expands laterally outward perpendicular to the axis Z and contacts the inner surface 514 of the wall 508 of the housing 504 of the receptacle 500. The compression of the housing 404 along the axis Z and the outward expansion perpendicular to the axis Z of the housing 404 can cause the housing 404 of the plug 400 to exert pressure on the housing 504 of the receptacle 500. The housing 504 being made of a compliant, compressible, deformable, elastic or polymeric material can cause the housing 504 to deform outward away from the axis Z as shown in FIG. 12. The housing 404 of the plug 400 and the housing 504 of the receptacle 500 can be made of elastic materials or structures that are compliant and able to return to the undeformed and original states and shapes of the housings 404 and 504 prior to any load being applied. Accordingly, the housing 404 of the plug 400 can be biased by an elastic biasing force to expand outward along axis Z toward its undeformed state. This biasing force biasing the housing 404 to expand along axis Z acts to bias the electrical contact 402 against the electrical contact 502, thereby providing a reliable mating of the plug 400 and the receptacle 500, wherein electrical connection between the electrical contact 402 and the electrical contact 502 is established.

Additionally, or alternatively, the plug 400 can comprise a spring 410 operable with the housing 404 of the plug 400. In one example, the spring can be supported on an exterior or interior surface of the plug 400. In another example, the spring 410 can be embedded or encapsulated completely or partially within the housing 404 material. The spring 410 can act to provide the biasing force to bias the electrical contact 402 against the electrical contact 502 and into electrical connection within the receptacle 500. In this case, the housing 404 can be made of a material that does not exhibit elastic behavior, meaning that there are no inherent properties in the material sufficient to bias the electrical contact 402 into an electrical connection with the electrical contact 502 with the solar panel in the installed position, and that the material does not return to an undeformed state (i.e., the material can be a non-elastic polymer or another type of material that is not necessarily intended to be spring-like or model a spring to some degree, but that is still capable of forming a seal with the receptacle). In this example, the spring 410 can be configured and positioned to provide a force (e.g., a biasing force), similar to the biasing force provided by the housing 404 formed of an elastic material, to ensure a reliable mating of the plug 400 and the receptacle 500 (with a seal formed between them) and a reliable electrical connection between the electrical contact 402 and the electrical contact 502. In still other examples, both the spring 410 can be provided and the housing 404 can be formed of an elastic material to provide complementary biasing forces to facilitate a more robust electrical connection between the electrical contact 402 and the electrical contact 502, or in other words, to help cause the electrical contact 402 to form and maintain an electrical connection with the electrical contact 502 by biasing the housing toward the receptacle. This also helps to facilitate and maintain a more robust seal between the plug 400 and the receptacle 600. The spring 410 can be disposed within an inner cavity defined in the housing 404 of the plug 400 and can be configured so as to bias the housing 404 to an extended state. Alternatively, the spring 410 can be all or partially embedded or encapsulated within the material of the housing 404 such that all or a majority part of the spring 410 cannot be seen without cutting through the material of the housing 404.

Figure 11A:
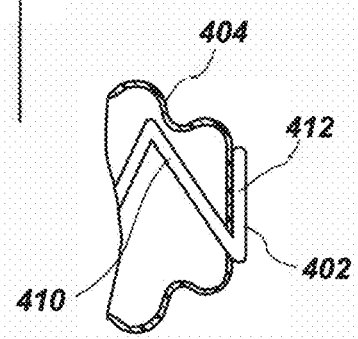
FIG. 11A illustrates a cross-sectional view of a plug similar to the plug of FIG. 11, with a portion of the spring forming the electrical contact of the plug rather than the plug comprising a separate and independent electrical contact.
Figure 12A:
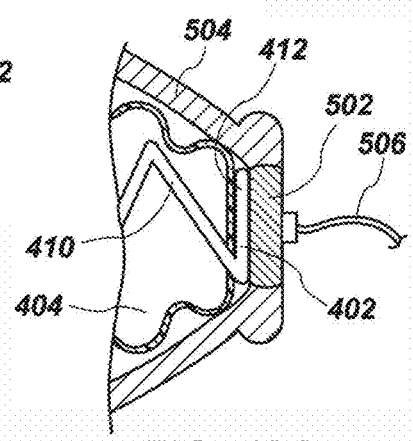
FIG. 12A illustrates the plug of FIG. 11A in electrical connection with the receptacle of FIG. 12.

In still another example, as shown in FIGS. 11A and 12A, the spring 410 can be formed of a conductive material (e.g., metal), and the plug 400 can be configured, such that a portion of the spring 410 is exposed and operable to function as the electrical contact of the plug 400, rather than the plug 400 comprising a separate and independent electrical contact 402 supported by the housing 404 and/or the spring 410. For example, an end portion 412 of the spring 410 can be configured to extend through the housing 404 at a position at or near an end of the housing 404, such that the end portion 412 of the spring 410 is exposed and comprises or forms the electrical contact 402 (e.g., plug electrical contact) that is configured to establish an electrical connection with the electrical contact 502 (e.g., receptacle electrical contact) supported by the housing 504 of the receptacle 500. In this example, the electrical contact 402 (which in this case comprises the end portion 412 of the spring 410) of the electrical plug 400 can be electrically connected to the electrically conductive pathway 406 (e.g., wire) that conducts electricity to and from the electrical contact 402 (i.e., spring 410) to facilitate collection of solar power by a solar panel associated with the plug 400. In this example, the receptacle 500 can be configured the same or similarly as the receptacle 500 shown in FIGS. 11 and 12, which can be connected to the electrically conducting pathway 506. This concept illustrates that a separate and independent electrical contact is not always needed or required to be part of the plug 400, and that indeed, the electrical contact 402 of the plug 400 can be formed of another component of the plug 400, in this case the spring 410.

As discussed above, the housing 504 of the receptacle 500 can be made of an elastic material that deforms under an applied load and that is able to return to an undeformed state upon removal of the applied load. The elastic material of the housing 504 provides a biasing force to bias the housing 504 of the receptacle 500 to the undeformed state and therefore biases the guiding interior surface/wall 508 of the housing 504 of the receptacle 500 into contact with the surface 408 of the housing 404 of the plug 400. With the housing 404 pressing against the housing 504, the biasing force operates to bias the housing 504 to its undeformed state, which housing 504 operates to exert a reaction force against the housing 404. By the forces acting to elastically deform the housing 404 and the housing 504 and to cause these to engage one another under an applied load, a seal is formed at an interface between the housing 504 of the receptacle 500 and the housing 404 of the plug 400.

The materials of the housings 404 and 504 can be selected so as to facilitate formation of a water-tight seal between the housings 404 and 504 to seal off the electrical contact 402 and the electrical contact 502 from outside contaminants and moisture that may be present in the surrounding environment. The auto-connecting electrical contact system 600, with its auto-connecting and auto-aligning features, therefore can further comprise a seal that can be formed from the components of the auto-connecting electrical contact system 600 via an auto-sealing function in which the electrical connection between the plug 400 and the receptacle 500 is automatically sealed off from the surrounding environment upon installing the solar panel 200 within the solar panel mount 100, such as, for example, upon transitioning a solar panel 200 from an installation position into an installed position within the solar panel mount 100, to cause the plug 400 to be captured within the receptacle 500.

The auto-connecting electrical contact system 600 that facilitates automatic alignment of the electrical contacts (e.g., electrical contact 402 and the electrical contact 502) when installing a solar panel into a solar panel mount can facilitate multi-axis alignment that provides alignment, guiding, and correction in multiple axes as the plug 400 is brought into contact with the receptacle 500. The multi-axis alignment will be discussed with reference to previously discussed FIGS. 11 and 12 and additional FIGS. 13A-15. As described above with respect to FIGS. 11 and 12, the biasing forces applied by at least one of the spring 410 or the housing 404 of the plug 400 function to bias the electrical contact 402 into electrical connection with the electrical contact 502, and to form a seal around these. In other words, the biasing forces applied by the spring 410 alone, by the housing 404 of the plug 400 alone, or by the spring 410 and the housing 404 together ensure proper alignment of the electrical contacts along the Z axis illustrated in FIGS. 11 and 12. In examples as shown in FIG. 11 and FIG. 12 in which the spring 410 is encapsulated within the housing 404 of the plug 400, the housing 404 and the spring 410 can be an elastic element that forms a seal by the elastic material of the housing 404 being in contact with the inner surface 514 of the receptacle 500. The spring 410 encapsulated within the housing 404 can exert a biasing force to maintain the seal formed between the housing 404 and the inner surface 514.

Therefore, the multi-axis alignment of the auto-connecting electrical contact system 600 can correct misalignment of the plug 400 and the receptacle 500 relative to each other about or relative to the Z axis. This is advantageous as the distance between an installed solar panel and the solar panel mount, and the respective surfaces in support of the electrical contact 402 and the electrical contact 502, can be within some range along the Z axis. As such, the plug 400 and the receptacle 500 can be configured to deform or displace relative to one another in the Z direction to accommodate or account for some degree of variance in distance between the solar panel and the solar panel mount, and particularly the surfaces in support of the electrical contact 402 and the electrical contact 502, from an ideal distance that would otherwise cause the electrical contact 402 and the electrical contact 502 to be out of contact with one another if the auto-alignment feature of the auto-connecting electrical contact system 600 were not present.

Figure 13B:
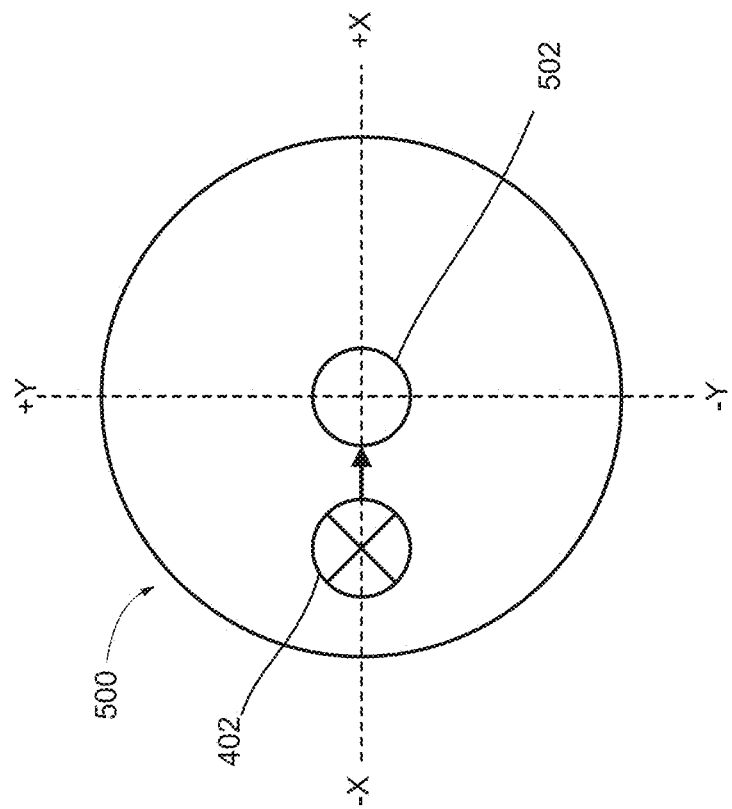
FIG. 13B illustrates a diagram of alignment in the X axis of the receptacle of FIG. 9A connecting with the plug of FIG. 8A.
Figure 13A:
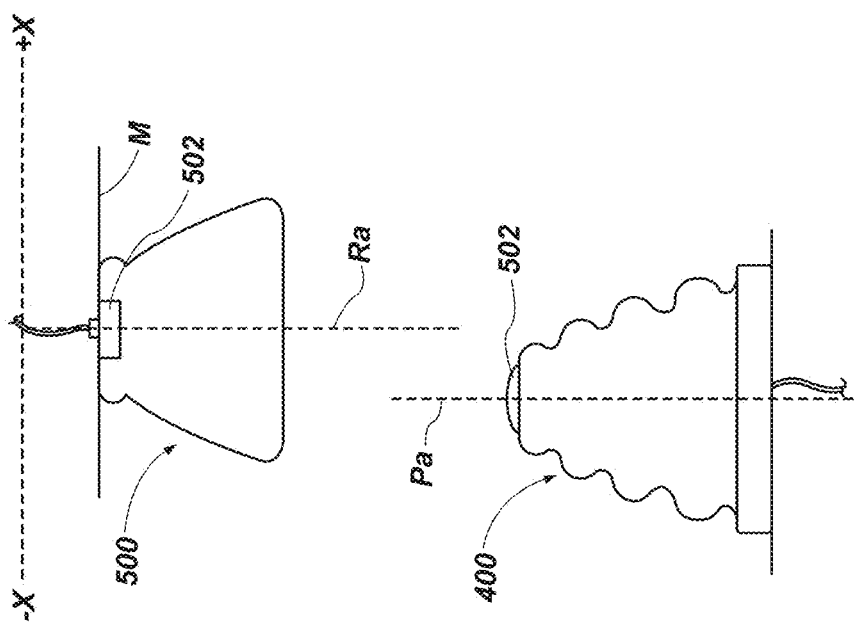
FIG. 13A illustrates a view of the alignment in the X axis of the receptacle of FIG. 9A connecting with the plug of FIG. 8A.

In some examples, the auto-alignment feature of the auto-connecting electrical contact system 600 can provide further alignment, guiding, and correction in or about other axes as well, such as the X and Y axes. With reference to FIGS. 13A and 13B, a view of the plug 400 and the receptacle 500 is shown in which the electrical contact 402, which is concentric with a plug axis Pa, is misaligned along the X axis with the electrical contact 502, which is concentric with a receptacle axis Ra. Accordingly, as shown in this state, the plug 400 is not properly aligned with the receptacle 500 in the X axis to ensure proper contact and connection between the electrical contact 402 and the electrical contact 502. However, the housings 404 and 504, as well as the shape of the guiding surface (e.g., the inner surface 514 of the wall 508) of the receptacle 500, can deform as these are caused to engage one another. Moreover, the housing 404 of the plug 400 can be guided by the housing 504 of the receptacle 500 into proper alignment along the X axis such that the plug axis Pa and the receptacle axis Ra are collinear with one another, thus facilitating proper alignment of the electrical contact 402 with the receptacle contact 502 to establish an electrical connection between these. For example, the housing 404 can deform towards the center of the housing 504 due to the flexible compliance and/or elasticity of the housing 404. In other words, the guiding surface (e.g., the inner surface 514 of the wall 508) of the housing 504 can apply a force to the housing 404 to deform and guide the housing 404 toward a center of the housing 504 and to guide the electrical contact 402 to the electrical contact 502. Therefore, the multi-axis alignment feature of the auto-connecting electrical contact system 600 can also, in addition to correction in the Z axis, correct misalignment in the X axis between the plug 400 and the receptacle 500 relative to each other.

Figure 14A:
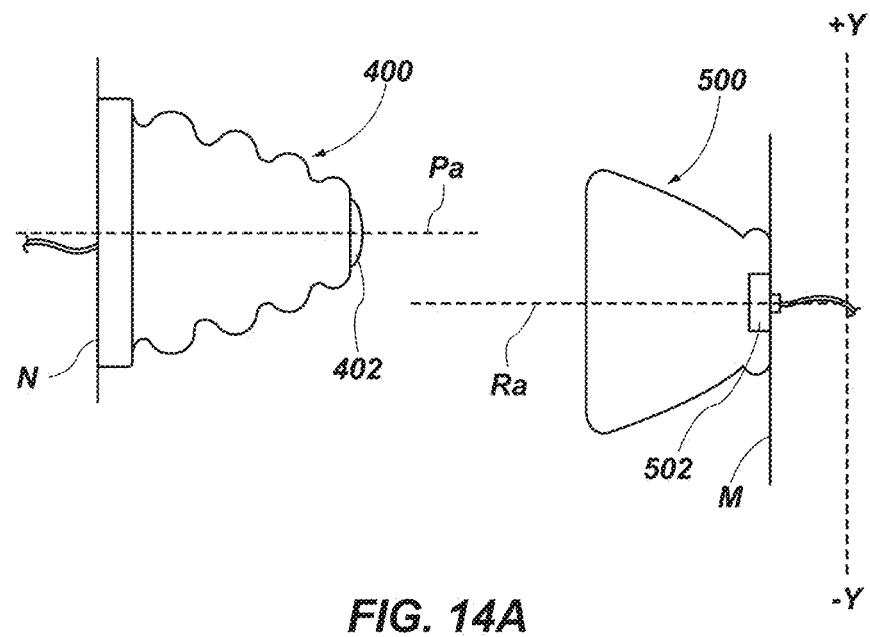
FIG. 14A illustrates a view of the alignment in the Y axis of the receptacle of FIG. 9A connecting with the plug of FIG. 8A.
Figure 14B:
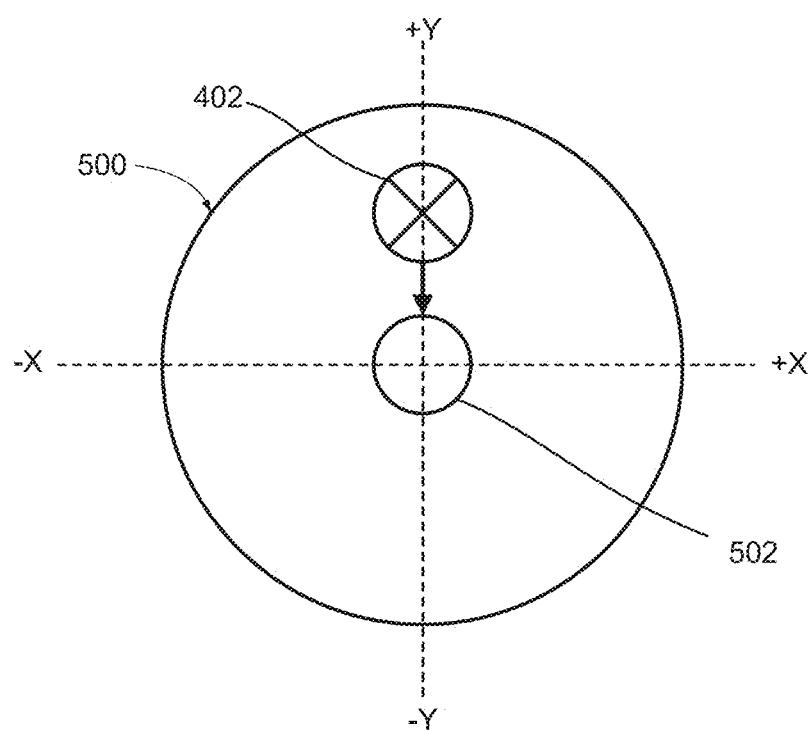
FIG. 14B illustrates a diagram of alignment in the Y axis of the receptacle of FIG. 9A connecting with the plug of FIG. 8A.

The auto-alignment feature of the auto-connecting electrical contact system 600 can provide further alignment, guiding, and correction in the Y axis. With reference to FIGS. 14A and 14B, a view of the plug 400 and the receptacle 500 is shown in which the electrical contact 402, which is concentric with a plug axis Pa, is misaligned along the X axis with the electrical contact 502, which is concentric with a receptacle axis Ra. Accordingly, as shown in this state, the plug 400 is not properly aligned with the receptacle 500 in the Y axis to ensure proper contact and connection between the electrical contact 402 and the electrical contact 502. However, similar to the correction in the X axis, the housings 404 and 504, as well as the shape of the guiding surface (e.g., inner surface 514 of the wall 508) of the receptacle 500, can deform as these are caused to engage one another. Moreover, the housing 404 of the plug 400 can be guided by the housing 504 of the receptacle 500 into proper alignment along the Y axis such that the plug axis Pa and the receptacle axis Ra are collinear with one another, thus facilitating proper alignment of the electrical contact 402 with the electrical contact 502 to establish the electrical connection between these. For example, the housing 404 can deform towards the center of the housing 504 due to the flexible compliance and/or elasticity of the housing 404. In other words, the guiding surface (e.g., inner surface 514 of the wall 508) of the housing 504 can apply a force to the housing 404 to deform and guide the housing 404 toward a center of the housing 504 and to guide the electrical contact 402 to the electrical contact 502. Therefore, the multi-axis alignment feature of the auto-connecting electrical contact system 600 can also, in addition to correction in the Z and X axes, correct misalignment in the Y axis between the plug 400 and the receptacle 500 relative to each other.

Figure 15:
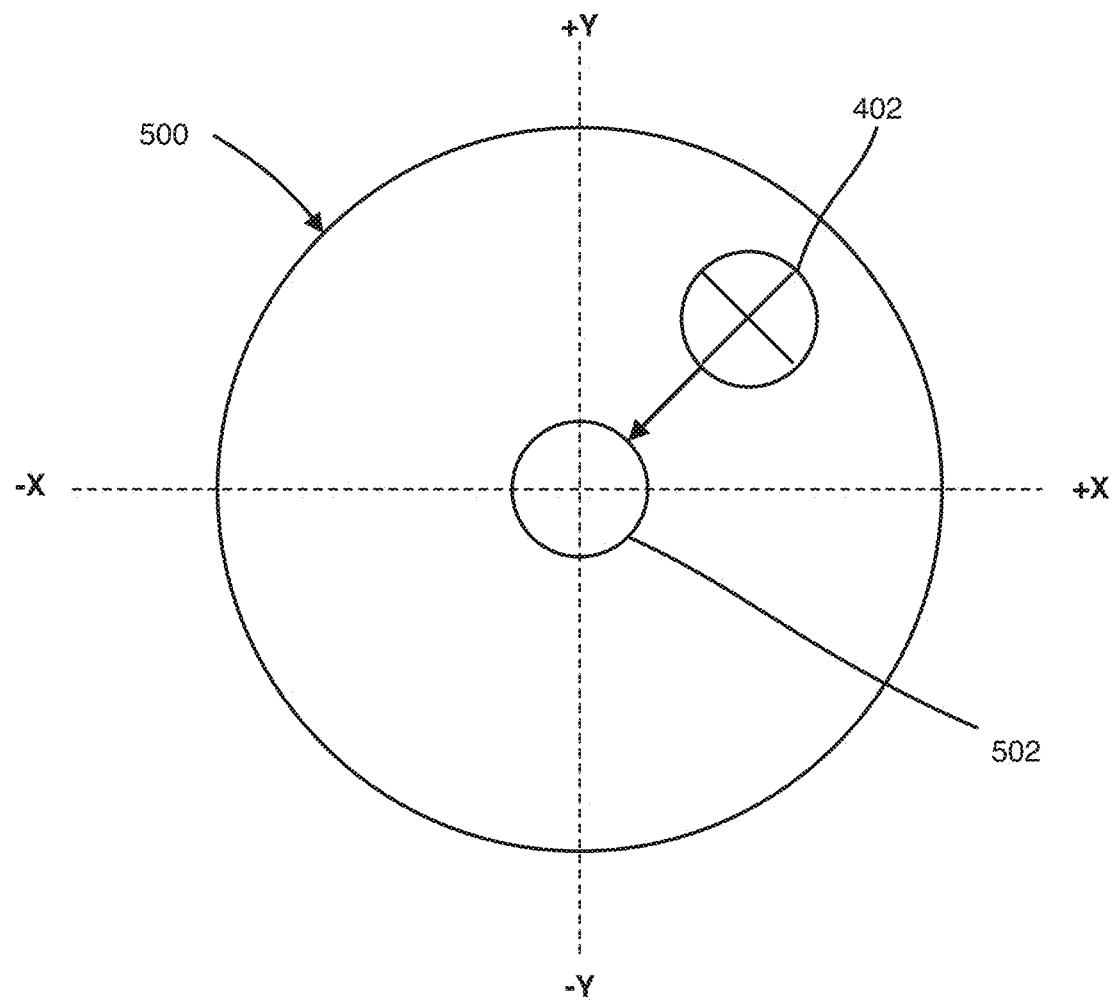
FIG. 15 illustrates a diagram of alignment in both the Y axis and the X axis of the receptacle of FIG. 9A connecting with the plug of FIG. 8A.

As shown in FIG. 15, the auto-alignment feature can provide correction in multiple axes at one time to ensure a proper connection between the electrical contact 402 and the electrical contact 502. For example, in addition to guiding and biasing the electrical contact 402 toward the electrical contact 502 along the Z axis (extending in and out of the page), the configuration of the plug 400 and the plug 500 can also function to correct misalignment of the plug 400 and the receptacle 500 along or about at least one of the X axis or the Y axis, or both of these simultaneously. For example, the housing 404 of the plug 400 can deform towards the center of the housing 504 of the receptacle 500 in both the X and Y directions due to the flexible compliance and/or elasticity of the housing 404. In other words, the guiding surface (e.g., the inner surface 514 of the wall 508) of the housing 504 of the receptacle 500 can apply a force to the housing 404 of the plug 400 to deform and guide the housing 404 toward a center of the housing 504 in both the X and Y directions and to guide the electrical contact 402 into alignment with the electrical contact 502. Therefore, the multi-axis alignment feature of the auto-connecting electrical contact system 600 can correct misalignment of the plug 400 and the receptacle 500 relative to each other in one, two, or all three of the X, Y, and Z directions as the solar panel is installed within the solar panel mount.

Figure 16A:
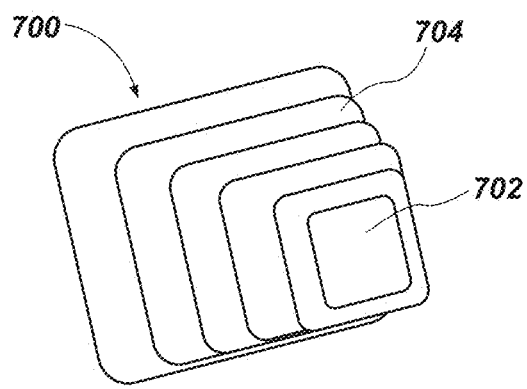
FIG. 16A illustrates a perspective view of a plug of an auto-connecting electrical contact system in accordance with at least one example of the present disclosure.
Figure 16B:
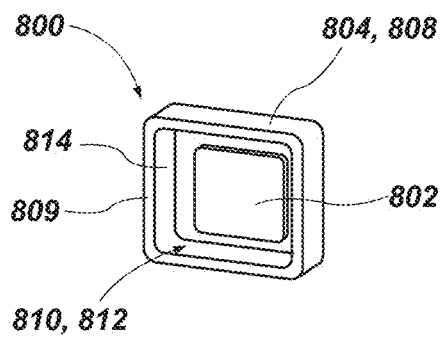
FIG. 16B illustrates a perspective view of a receptacle of an auto-connecting electrical contact system in accordance with at least one example of the present disclosure.
Figure 16C:
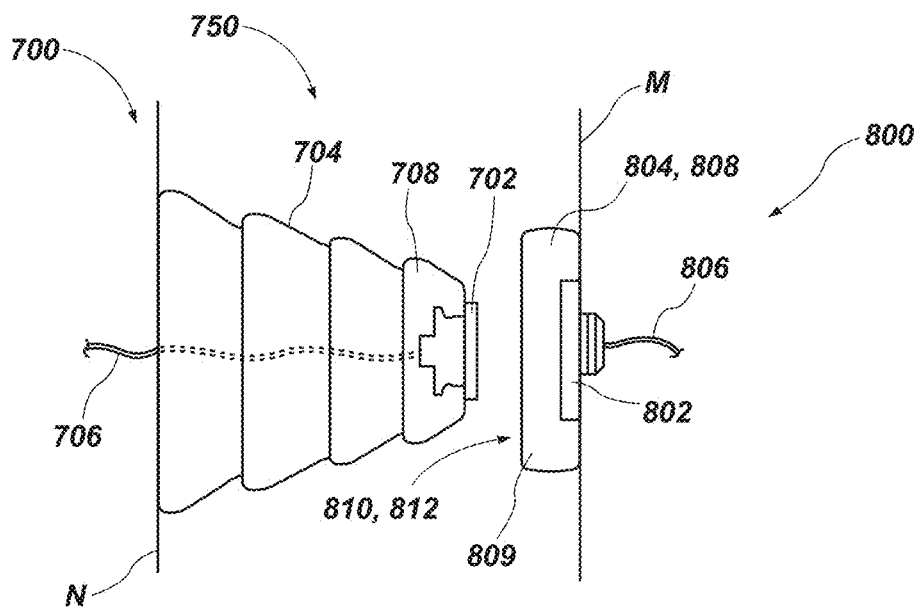
FIG. 16C illustrates a side view of the plug of FIG. 16A connecting with the receptacle of FIG. 16B.

In one example, the housing 404 of the plug 400 and the housing 504 of the receptacle 500 can comprise cone shapes with substantially circular perimeters, as shown in FIGS. 8A-9B. However, it is to be understood that no limitation is intended for the shape of the housings, plug, or receptacle and any suitable shape can be used without departing from the scope of this disclosure. For example, as shown in FIGS. 16A, 16B, and 16C, the plug 700 and a receptacle 800 can have a substantially square or rectangular cross-sectional shape. FIGS. 16A and 16C respectively illustrate a perspective view and a side view of the plug 700 as an electrical connector of an auto-connecting electrical contact system for solar panels in accordance with an example of the present disclosure. The plug 700 can include a housing 704 in support of an electrical contact 702 located at a distal end of the housing 704. The electrical contact 702 of the plug 700 can be electrically connected to a conductive pathway 706 (e.g., wire) that conducts electricity to and from the electrical contact 702 to facilitate collection of solar energy by a solar panel. The electrical contact 702 can be either of the electrical contact for the solar panel (i.e., the panel electrical contact) or the electrical contact for the solar panel mount (i.e., the mount electrical contact), similarly as discussed above.

The housing 704 can comprise a surface configuration comprising or defining a receptacle interface, and the housing 704 can be made of a material that is compressible and/or that deforms under an applied load. Furthermore, the material can be an elastic material that exerts a biasing force to bias the housing 704 to return to an uncompressed state upon removal of the applied load. The housing 704 can be formed of a polymer or elastomer material, or any material that is compressible and/or deformable under an applied load and/or is biased to return to an uncompressed or undeformed state. Additionally, the housing 704 can be made of a material suitable for forming a water-tight seal to seal the electrical contact 702 off from the environment. For example, the housing 704 can be made of one or more materials such as, but not limited to, natural rubber, butyl rubber, and nitrile rubbers, highly saturated nitrile rubber, carboxilated nitrile rubber, fluoroelastomers, fluororubber (Viton), fluorinated ethylene propylene, polytetrafluoroethylene (Teflon), polypropylene, polyethylene, acrylonitrile rubbers, silicone, polyurethane, Ethylene propylene diene monomer, fluorosilicone, ethylene propylene diene monomer (EPDM) rubber, polychloroprene synthetic rubber (Neoprene), butyl rubber, ethylene acrylic copolymer, chlorosulfonated polyethylene synthetic rubber, polyacrylate rubber, styrene-butadiene rubber.

FIG. 16B and FIG. 16C respectively illustrate a perspective view and a side view of an electrical receptacle 800 operable with the plug 700 as an electrical connector of an auto-connecting electrical contact system for solar panels in accordance with an example of the present disclosure, which can be incorporated into any solar panel mount system discussed herein (e.g., solar panel mount system 300). The receptacle 800 can include an electrical contact 802. The receptacle 800 can further include a housing 804 in support of the electrical contact 802 and disposed to house and surround a perimeter of the electrical contact 802. The electrical contact 802 can be either of the electrical contact for the solar panel (i.e., the panel electrical contact) or the electrical contact for the solar panel mount (i.e., the mount electrical contact). In some examples, the electrical contact 802 can be the panel electrical contact and the electrical contact 702 can be the mount electrical contact. In other examples, the electrical contact 802 can be the mount electrical contact and the electrical contact 702 can be the panel electrical contact.

The housing 804 of the receptacle 800 can include a wall 808 having a surface configuration defining or comprising a plug interface, and an opening 810 and an interior cavity 812 configured to receive the housing 704 of the plug 700 therein. The electrical contact 802 can be disposed and supported about or by a lower surface of the housing 804 within the interior cavity 812, and can be electrically connected to a conductive pathway 806 (e.g., wire) that conducts electricity to and from the electrical contact 802 of the receptacle 800 to facilitate collection of solar energy by a solar panel.

The housing 804 can be made of a material that is compressible and/or deforms under an applied load. Furthermore, the material can be an elastic material that exerts a biasing force to bias the housing 804 to return to an uncompressed or undeformed state upon removal of the applied load. The housing 804 can be formed of a polymer or elastomer material, or any material that is compressible or deformable under an applied load and/or is biased to return to an uncompressed state. Additionally, the housing 804 can be made of a material suitable for forming a water-tight seal to seal the electrical contact 802 off from the environment. For example, the housing 804 can be made of one or more materials such as, but not limited to, natural rubber, butyl rubber, and nitrile rubbers, highly saturated nitrile rubber, carboxilated nitrile rubber, fluoroelastomers, fluororubber (Viton), fluorinated ethylene propylene, polytetrafluoroethylene (Teflon), polypropylene, polyethylene, acrylonitrile rubbers, silicone, polyurethane, Ethylene propylene diene monomer, fluorosilicone, ethylene propylene diene monomer (EPDM) rubber, polychloroprene synthetic rubber (Neoprene), butyl rubber, ethylene acrylic copolymer, chlorosulfonated polyethylene synthetic rubber, polyacrylate rubber, styrene-butadiene rubber.

The receptacle 800 can be configured to receive the plug 700 therein. The electrical contact 802 of the receptacle 800 can be configured to contact the electrical contact 702 of the plug 700 to facilitate electrical conduction through the plug 700 and the receptacle 800. In other words, the housing 704 of the plug 700 can be inserted into the opening 810 and cavity 812 of the housing 804 of the receptacle 800 to make an electrical connection between the plug 700 and the receptacle 800, these being respective first and second parts of an electrical connector.

As shown in FIG. 16C the plug 700 can be coupled to a structure M and the receptacle 800 can be coupled to a structure N. For facilitating power transfer to/from a solar panel, one of the structures M or N can be a solar panel. It is to be understood that the receptacle 800 or the plug 700 can be coupled to a solar panel while the other of the receptacle 800 and the plug 700 is connected to another structure, such as a solar panel mount structure configured to receive and retain the solar panel therein. For example, the structure M can be the solar panel and the structure N can be the solar panel mount structure. Alternatively, the structure N can be the solar panel and the structure M can be the solar panel mount structure. The solar panel mount structure can be electrically connected to an electrical system (e.g., batteries, a power grid, or other electrical storage or disbursement system) configured to receive and/or store electricity generated by the solar panel collecting solar light/energy. Accordingly, electrical connection via the plug 700 and the receptacle 800 facilitates transfer of electrical power from the solar panel to an electrical system that utilizes the power from the solar panel. In addition, an auto-connecting electrical contact system 750 including the plug 700 and the receptacle 800 can be used to connect a solar panel (e.g., structure M) to an adjacent solar panel (e.g., structure N), or any structure or system without intended limitation in order to conduct electricity from a solar panel to another device.

As shown in FIGS. 16B and 16C, the receptacle 800 can be shallower than the plug 700 and need not receive the entire plug 700, or even most of the plug 700, therein. Even with a shallow receptacle 800 the plug 700 can deform such that the outer surface 708 of the housing 704 contacts an upper rim 809 and/or inner surface 814 of the receptacle 800 and creates a water-tight seal to isolate the electrical contacts 702 and 802 from the environment.

It will be appreciated by reading this disclosure that, in some examples, the auto-connecting electrical contact system 750 can be configured to facilitate auto-alignment similar to auto-connecting electrical contact system 600. For example, the plug 700 being received within the receptacle 800 is intended to automatically align and guide the electrical contact 702 into contact with the electrical contact 802. It is further to be understood that the auto alignment of the auto-connecting electrical contact system 750 can be multi-axis alignment similar to the multi-axis alignment of the auto-connecting electrical contact system 600 described above. The auto-connecting electrical contact system 750 can further be configured to facilitate auto-sealing similar to auto-connecting electrical contact system 600. Auto-sealing of the auto-connecting electrical contact system 750 can be similar to the auto-sealing function of the auto-connecting electrical contact system 600 described elsewhere herein. Accordingly, the auto-connecting electrical contact system 750 can further be configured to facilitate auto-alignment, multi-axis auto-alignment and auto-sealing similar to the auto-connecting electrical contact system 600.

Figure 17A:
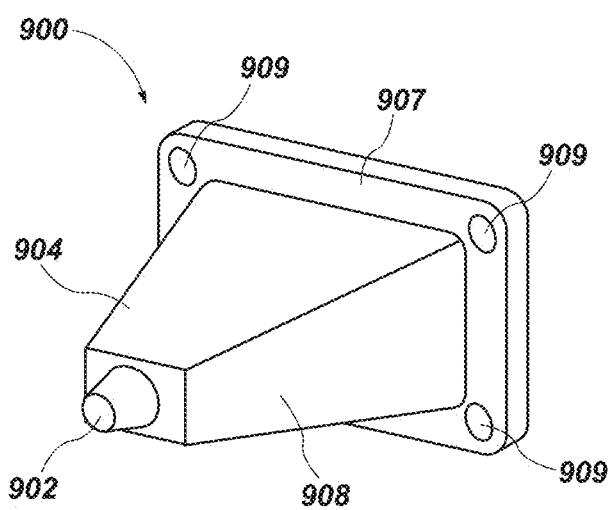
FIGS. 17A and 17B respectively illustrate a perspective view and a top view of a plug according to at least one example of the present disclosure.
Figure 17B:
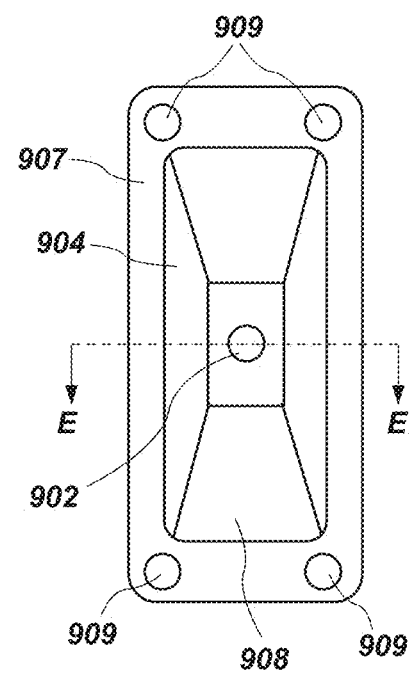

Further alternative configurations of plugs and receptacles operable with one another and part of an auto-connecting electrical contact system are also considered within the scope of this disclosure, which can be incorporated into any solar panel mount system discussed herein (e.g., solar panel mount system 300). FIGS. 17A and 17B respectively illustrate a perspective view and a side view of a plug 900 as a first part of an electrical connector of an auto-connecting electrical contact system for solar panels in accordance with an example of the present disclosure, which can be incorporated into any solar panel mount system discussed herein (e.g., solar panel mount system 300). The plug 900 can include a housing 904 in support of an electrical contact 902 located at and supported about a distal end of the housing 904. The electrical contact 902 of the plug 900 can be electrically connected to a conductive pathway 906 (e.g., wire) that conducts electricity to and from the electrical contact 902 to facilitate collection of solar energy by a solar panel. The electrical contact 902 can be either of the electrical contact for the solar panel (i.e., the panel electrical contact) or the electrical contact for the solar panel mount (i.e., the mount electrical contact). The plug 900 can further include a coupling or mounting assembly comprising a flange 907 comprising one or more holes 909 formed therein. The mounting assembly can further comprise one or more fasteners operable to be inserted through the holes 909 of the flange 907 to facilitate removable attachment of the plug 900 to a surface such as a surface of a solar panel and/or a solar panel mount. The mounting assembly shown is not intended to be limiting in any way. Indeed, those skilled in the art will recognize that the plug 900 can be coupled or removably coupled to either of the solar panel or the solar panel mount using a variety of different coupling or mounting assemblies. In addition, it is noted that the mounting assembly can be utilized with any of the plug examples discussed herein, as well as with any of the plug electrical contact examples discussed herein.

The housing 904 can comprise a surface configuration comprising or defining a receptacle interface, and can be made of a material that is compressible and/or deforms under an applied load. Furthermore, the material can be an elastic material that exerts a biasing force to bias the housing 904 to return to an uncompressed state upon removal of the applied load. The housing 904 can be formed of a polymer or elastomer material, or any material that is compressible and/or deformable under an applied load and/or is biased to return to an uncompressed or undeformed state. Additionally, the housing 904 can be made of a material suitable for forming a water-tight seal to seal the electrical contact 902 off from the outside environment. For example, the housing 904 can be made of one or more materials such as, but not limited to, natural rubber, butyl rubber, and nitrile rubbers, highly saturated nitrile rubber, carboxilated nitrile rubber, fluoroelastomers, fluororubber (Viton), fluorinated ethylene propylene, polytetrafluoroethylene (Teflon), polypropylene, polyethylene, acrylonitrile rubbers, silicone, polyurethane, Ethylene propylene diene monomer, fluorosilicone, ethylene propylene diene monomer (EPDM) rubber, polychloroprene synthetic rubber (Neoprene), butyl rubber, ethylene acrylic copolymer, chlorosulfonated polyethylene synthetic rubber, polyacrylate rubber, styrene-butadiene rubber.

Figure 18A:
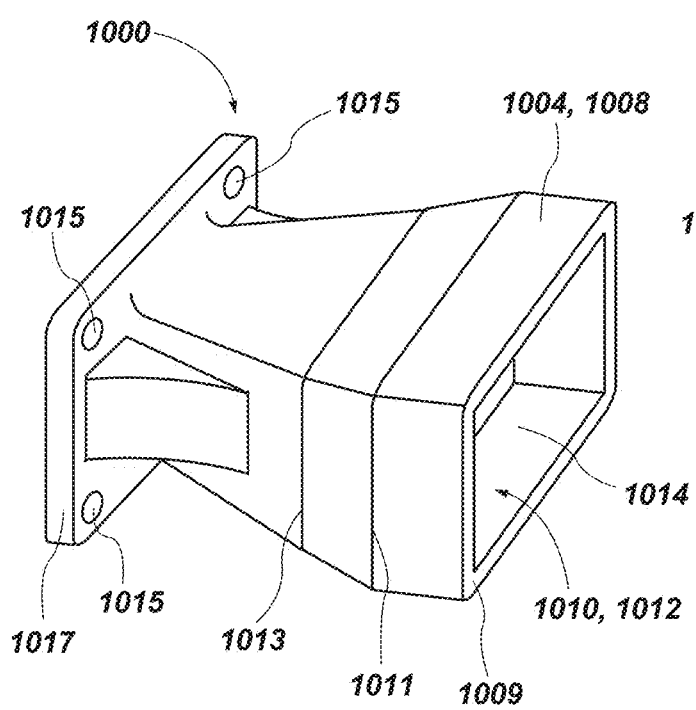
FIGS. 18A and 18B respectively illustrate a perspective view and a top view of a receptacle according to at least one example of the present disclosure.
Figure 18B:
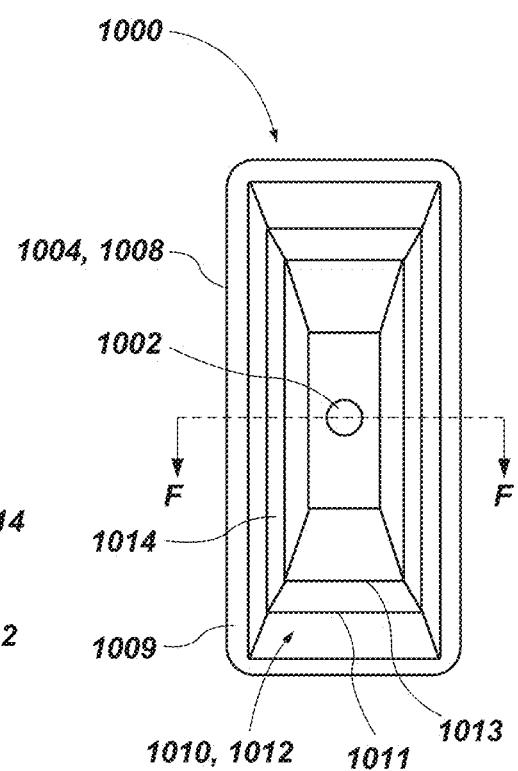

FIG. 18A and FIG. 18B respectively illustrate a perspective view and a side view of an electrical receptacle 1000 operable with the plug 900 as a second part of the electrical connector of the auto-connecting electrical contact system for solar panels in accordance with an example of the present disclosure, which can be incorporated into any solar panel mount system discussed herein (e.g., solar panel mount system 300). The receptacle 1000 can include an electrical contact 1002. The receptacle 1000 can further include a housing 1004 in support of the electrical contact 1002 and disposed to house and surround a perimeter of the electrical contact 1002. The electrical contact 1002 can be either of the electrical contact for the solar panel (i.e., the panel electrical contact) or the electrical contact for the solar panel mount (i.e., the mount electrical contact). In some examples, the electrical contact 1002 can be the panel electrical contact and the electrical contact 902 can be the mount electrical contact. In other examples, the electrical contact 1002 can be the mount electrical contact and the electrical contact 902 can be the panel electrical contact.

The housing 1004 of the receptacle 1000 can include a wall 1008 comprising a surface configuration comprising or defining a plug interface, and defining an opening 1010 and an interior cavity 1012 configured to receive the housing 904 of the plug 900 therein. The electrical contact 1002 can be disposed and supported by or about a lower surface of the housing 1004 and can be electrically connected to a conductive pathway 1006 (e.g., wire) that conducts electricity to and from the electrical contact 1002 of the receptacle 1000 to facilitate collection of solar energy by a solar panel. The wall 1008 can further include an upper rim 1009, a middle rim 1011 formed as a bend at a middle portion of the housing 1004, and a lower rim 1013 formed as a bend at a lower portion of the housing 1004. The upper rim 1009 can be disposed at the opening 1010 of the housing 1004, the middle rim 1011 can be disposed between the upper rim 1009 and the lower rim 1013 of the housing 1004, and the lower rim 1013 can be disposed between the upper rim 1009/middle rim 1011 and a bottom portion of the housing 1004 that is opposite the opening 1010.

The housing 1004 can be made of a material that is compressible and/or deforms under an applied load. Furthermore, the material can be an elastic material that exerts a biasing force to bias the housing 1004 to return to an uncompressed or undeformed state upon removal of the applied load. The housing 1004 can be formed of a polymer or elastomer material, or any material that is compressible or deformable under an applied load and/or is biased to return to an uncompressed state. Additionally, the housing 1004 can be made of a material suitable for forming a water-tight seal to seal the electrical contact 1002 off from the outside environment. For example, the housing 1004 can be made of one or more materials such as, but not limited to, natural rubber, butyl rubber, and nitrile rubbers, highly saturated nitrile rubber, carboxilated nitrile rubber, fluoroelastomers, fluororubber (Viton), fluorinated ethylene propylene, polytetrafluoroethylene (Teflon), polypropylene, polyethylene, acrylonitrile rubbers, silicone, polyurethane, Ethylene propylene diene monomer, fluorosilicone, ethylene propylene diene monomer (EPDM) rubber, polychloroprene synthetic rubber (Neoprene), butyl rubber, ethylene acrylic copolymer, chlorosulfonated polyethylene synthetic rubber, polyacrylate rubber, styrene-butadiene rubber.

The auto-connecting electrical contact system shown in FIGS. 17A-18B can further comprise an auto-alignment feature and function similar to the auto-alignment features of other auto-connecting electrical contact systems discussed herein.

The receptacle 1000 can be configured to receive the plug 900 therein. The electrical contact 1002 of the receptacle 1000 can be configured to contact the electrical contact 902 of the plug 900 to facilitate electrical conduction through the plug 900 and the receptacle 1000. In other words, the housing 904 of the plug 900 can be inserted into the opening 1010 and cavity 1012 of the housing 1004 of the receptacle 1000 to make an electrical connection between the plug 900 and the receptacle 1000. The receptacle 1000 can further include a coupling or mounting assembly comprising a flange 1017 comprising one or more holes 1015 formed therein. The mounting assembly can further comprise one or more fasteners operable to be inserted through the holes 1015 of the flange 1017 to facilitate removable attachment of the receptacle 1000 to a surface such as a surface of a solar panel and/or a solar panel mount. The mounting assembly shown is not intended to be limiting in any way. Indeed, those skilled in the art will recognize that the receptacle 1000 can be coupled or removably coupled to either of the solar panel or the solar panel mount using a variety of different coupling or mounting assemblies. In addition, it is noted that the mounting assembly can be utilized with any of the receptacle examples discussed herein, as well as with any of the receptacle electrical contact examples discussed herein.

Figure 19:
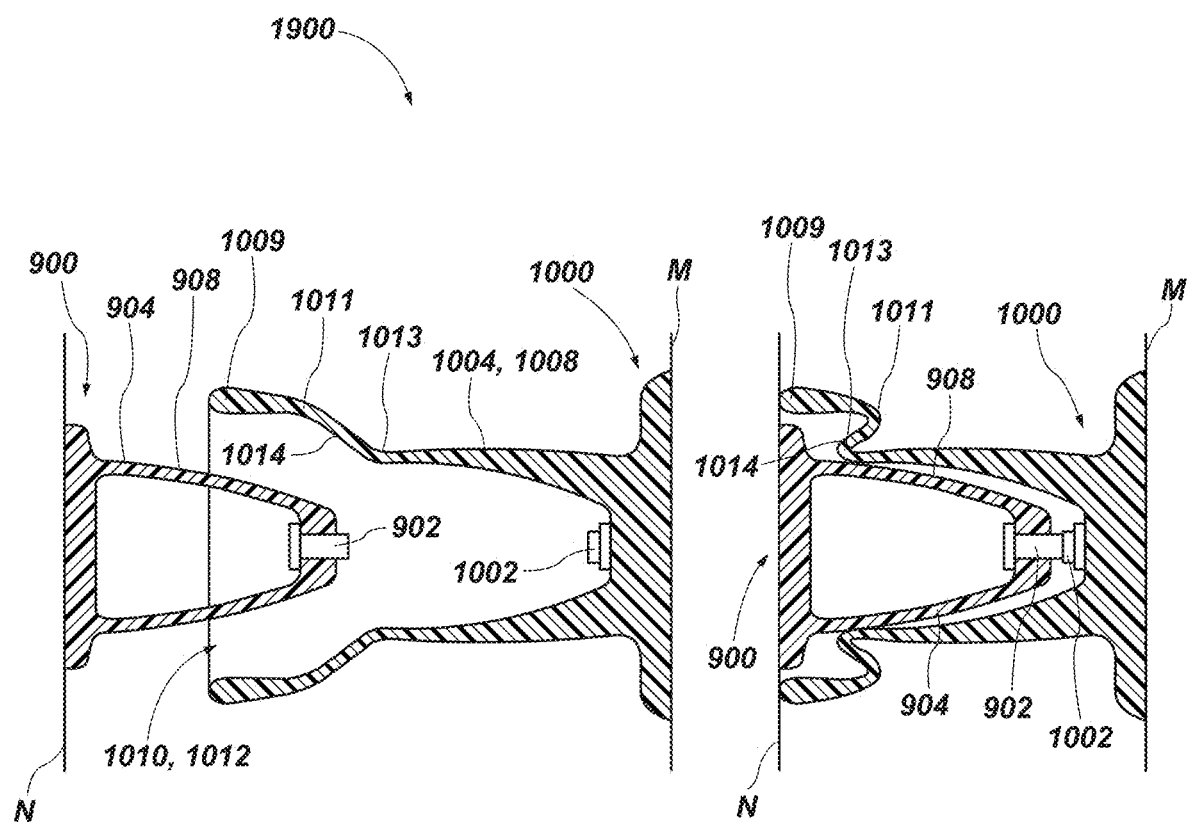
FIG. 19 illustrates cross-sectional views of the plug of FIGS. 17A and 17B taken along line EE connecting with the receptacle of FIGS. 18A and 18B taken along line FF.

FIG. 19 illustrates cross-sectional views of the plug 900 and the receptacle 1000 taken respectively along lines EE and FF shown in FIGS. 17B and 18B. As shown in FIG. 19 the plug 900 can be coupled to a structure M and the receptacle 1000 can be coupled to a structure N. For facilitating power transfer to/from a solar panel, one of the structures M or N can be a solar panel. It is to be understood that the receptacle 1000 or the plug 900 can be coupled to a solar panel while the other of the receptacle 1000 and the plug 900 is connected to another structure, such as a solar panel mount structure configured to receive and retain a solar panel therein. For example, the structure M can be the solar panel and the structure N can be the solar panel mount structure. Alternatively, the structure N can be the solar panel and the structure M can be the solar panel mount structure. The solar panel mount structure can be electrically connected to an electrical system (e.g., batteries, a power grid, or other electrical storage or disbursement system) configured to receive and/or store electricity generated by the solar panel collecting solar light. Accordingly, electrical connection via the plug 900 and the receptacle 1000 facilitates transfer of electrical power from the solar panel to an electrical system that utilizes the power from the solar panel. In addition, the electrical connection system including the plug 900 and the receptacle 1000 can be used to connect a solar panel (e.g., structure M) to an adjacent solar panel (e.g., structure N), or any structure or system without intended limitation in order to conduct electricity from a solar panel to another device.

As illustrated in FIG. 19, the plug 900 can be moved into the opening 1010 of the receptacle 1000. The electrical contact 902 of the plug 900 can be moved into place to make contact with the electrical contact 1002 of the receptacle 1000. The receptacle 1000 is illustrated as being deeper than the plug 900. Therefore, as the plug 900 is moved into the receptacle 1000, the upper rim 1009 of the receptacle 1000 will make contact with structure N before the electrical contact 902 makes contact with the electrical contact 1002. In order for the electrical contact 902 to make contact with the electrical contact 1002, the receptacle 1000 and housing 1004 can compress, deform, or collapse around the plug 900 to bring the electrical contact 902 closer to the electrical contact 1002.

As described above, the housing 1004 can include an upper rim 1009, a middle rim 1011, and a lower rim 1013. As illustrated by the right side of FIG. 19, the housing 1004 can collapse and bend at the lower rim 1013 and the middle rim 1011 to bring the electrical contact 902 into contact with the electrical contact 1002. The upper rim 1009 can form a first seal at an interface between the upper rim 1009 and the structure N to seal of the electrical contacts 1002 and 902 from the outside environment. The upper rim 1009 can also contact the flange 907 or outer surface 908 of the plug 900 to make the first seal. In other words, the upper rim 1009 can contact any surface without limitation to form the first seal.

Additionally, the lower rim 1013 of the housing 1004 of the receptacle 1000 can contact the outer surface 908 of the housing 902 of the plug 900 to form a second seal at the interface between the lower rim 1013 and the housing 902. Accordingly, the plug 900 and the receptacle 1000 can together form multiple redundant seals offering better sealing off of the electrical contacts 902 and 1002 from the outside environment. In this configuration, if one seal fails to make adequate contact, the other seal can provide isolation of the electrical contacts from the outside environment, thereby improving protection, life, and cleanliness of the electrical contacts during operation. Such configuration can further improve the life and operation of the solar panel mount and the solar panel used in conjunction with an auto-connecting electrical contact system 1900.

It will be appreciated by the disclosure that the auto-connecting electrical contact system 1900 can be configured to facilitate auto-alignment of the plug 900 within the receptacle 1000. The auto-alignment can be accomplished to guide the electrical contact 902 into alignment and contact with the electrical contact 1002. It is further to be understood that the auto-alignment of the auto-connecting electrical contact system 1900 is similar to the multi-axis alignment of the auto-connecting electrical contact systems 600 and 750 described elsewhere in this disclosure. The auto-connecting electrical contact system 1900 can furthermore be configured to facilitate auto-sealing of the electrical contacts 902 and 1002 similar to the auto-sealing of the auto-connecting electrical contact systems 600 and 750 described elsewhere herein. Accordingly, the auto-connecting electrical contact system 1900 can be configured to facilitate auto-alignment, automatic multi-axis alignment, and automatic sealing similar to auto-connecting electrical contact systems 600 and 750.

The electrical contacts 902 and 1002 of the plug 900 and the receptacle 1000 are shown in FIG. 19 to be similarly shaped cylindrical protrusions that contact each other at the flat faces of each of the electrical contacts 902 and 1002. However, the shape of the electrical contacts 902 and 1002 are not intended to be so limited. Alternative shapes and configurations of electrical contacts are intended to be within the scope of this disclosure. For example, as illustrated in FIGS. 20A, 20B, and 20C, one of the panel electrical contact (e.g., one of the electrical contact 902 or electrical contact 1002) or the mount electrical contact (e.g., the other of the electrical contact 902' and electrical contact 1002') can be formed to have a contact surface having a recess and the other of the panel electrical contact (e.g., one of the electrical contact 902' or electrical contact 1002') or the mount electrical contact (e.g., the other of the electrical contact 902' and electrical contact 1002') can include a contact surface having a protrusion shaped to engage with the recess.

In the example illustrated in FIGS. 20A, 20B, and 20C, the contact surface of the electrical contact 902' is formed to include a protrusion 903. The contact surface of the electrical contact 1002' can be formed to define a recess 1003 shaped to receive the protrusion 903 of the electrical contact 902'. Such a configuration provides for secure seating and electrical contact between the electrical contact 902' and the electrical contact 1002' and further provides guiding for the protrusion 903 to engage with the recess 1003. In other words, if the electrical contact 902' is misaligned with the electrical contact 1002' during insertion of the plug 900' into the receptacle 1000', then the cone shaped recess 1003 will guide the cone-shaped protrusion 903 of the electrical contact 902' into proper contact with the electrical contact 1002'. FIG. 20B illustrates the plug 900' inserted in to the receptacle 1000' without the electrical contacts 902' and 1002' being in contact with each other. FIG. 20C illustrates the plug 900' inserted in to the receptacle 1000' with the electrical contacts 902' and 1002' being in electrical contact with each other.

Figure 21:
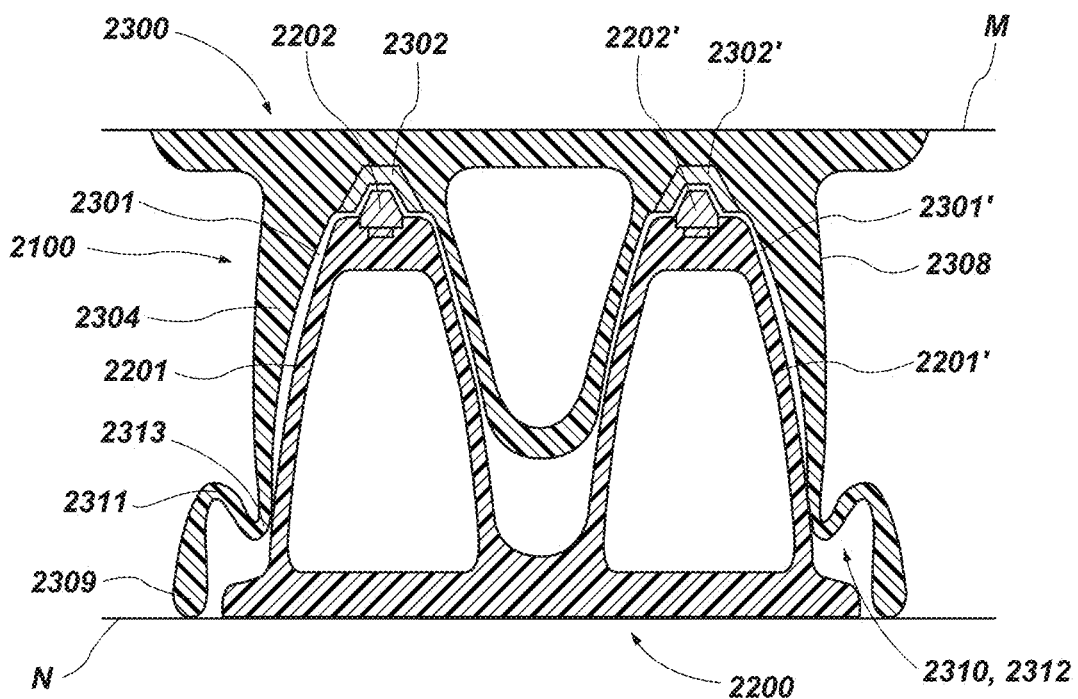
FIG. 21 illustrates an exemplary plug and receptacle of an auto-connecting electrical contact system according to at least one example of the present disclosure.

Additional alternative electrical contact systems will be described with reference to FIGS. 21-24. Illustrated in FIG. 21 is an auto-connecting electrical contact system 2100, which can be incorporated into any solar panel mount system discussed herein (e.g., solar panel mount system 300), including a plug 2200 and a receptacle 2300. FIG. 21 illustrates cross-sections of the plug 2200 and the receptacle 2300 taken along lines GG and HH shown in FIGS. 23 and 24. The plug 2200 can be an electrical connector of an auto-connecting electrical contact system 2100 for solar panels in accordance with an example of the present disclosure. The plug 2200 can include a housing 2204 in support of a pair of electrical contacts including a first electrical contact 2202 and a second electrical contact 2202' coupled to the housing 2204. The first and second electrical contacts 2202 and 2202' of the plug 2200 can each be electrically connected to separate conductive pathways (e.g., wires) that conduct electricity to and from the first and second electrical contacts 2202 and 2202' to facilitate collection of solar power by a solar panel.

The housing 2204 can comprise a surface configuration defining or comprising a receptacle interface, and can include a first protrusion 2201 in support of the first electrical contact 2202 and a second protrusion 2201' in support of the second electrical contact 2202'. The housing 2204 can be made of a material that is compressible and/or deforms under an applied load. Furthermore, the material can be an elastic material that exerts a biasing force to bias the housing 2204 to return to an uncompressed state upon removal of the applied load. The housing 2204 can be formed of a polymer or elastomer material, or any material that is compressible under an applied load and/or is biased to return to an uncompressed or undeformed state. Additionally, the housing 2204 can be made of a material suitable for forming a water tight seal to seal the first and second electrical contacts 2202 and 2202' off from the outside environment. For example, the housing 2204 can be made of one or more materials such as, but not limited to, natural rubber, butyl rubber, and nitrile rubbers, highly saturated nitrile rubber, carboxilated nitrile rubber, fluoroelastomers, fluororubber (Viton), fluorinated ethylene propylene, polytetrafluoroethylene (Teflon), polypropylene, polyethylene, acrylonitrile rubbers, silicone, polyurethane, Ethylene propylene diene monomer, fluorosilicone, ethylene propylene diene monomer (EPDM) rubber, polychloroprene synthetic rubber (Neoprene), butyl rubber, ethylene acrylic copolymer, chlorosulfonated polyethylene synthetic rubber, polyacrylate rubber, styrene-butadiene rubber.

FIG. 21 further illustrates an electrical receptacle 2300 as an electrical connector of the auto-connecting electrical contact system 2100 for solar panels in accordance with an example of the present disclosure. The receptacle 2300 can include a pair of electrical contacts including a first electrical contact 2302 and a second electrical contact 2302'. The receptacle 2300 can further include a housing 2304 in support of the first and second electrical contacts 2302 and 2302' and disposed to house and surround a perimeter of the first and second electrical contacts 2302 and 2302'.

The housing 2304 can include a wall 2308 having a surface configuration comprising or defining a plug interface and defining an opening 2310 and an interior cavity 2312 configured to receive the housing 2204 of the plug 2200 therein. The housing 2304 can include a first recess 2301 and a second recess 2301' within the interior cavity 2312, each configured to respectively receive the first protrusion 2201 and the second protrusion 2201'. The first electrical contact 2302 can be disposed at a bottom of the first recess 2301 of the housing 2304 and the second electrical contact 2302' can be disposed at a bottom of the second recess 2301' of the housing 2304. Each of the first and second electrical contacts 2302 and 2302' and can be electrically connected to separate conductive pathways (e.g., wires) that conduct electricity to and from the first and second electrical contacts 2302 and 2302' of the receptacle 2300 to facilitate collection of solar power by a solar panel.

The receptacle 2300 can be configured to receive the plug 2200 therein. The first and second electrical contacts 2302 and 2302' of the receptacle 2300 can be configured to contact the first and second electrical contacts 2202 and 2202' of the plug 2200 to facilitate electrical conduction through the plug 2200 and the receptacle 2300. In other words, the housing 2204 of the plug 2200 can be inserted into the opening 2310 and cavity 2312 of the housing 2304 of the receptacle 2300 to make an electrical connection between the plug 2200 and the receptacle 2300 by contacting the first electrical contact 2202 to the first electrical contact 2302 and the second electrical contact 2202' to the second electrical contact 2302'. A positive voltage can be supplied to one of the pairs of electrical contacts (e.g., the first plug and first electrical contact) while a negative or ground voltage is supplied to the other pair of electrical contacts (e.g., the second plug and second electrical contact). Alternatively, a negative or ground voltage can be supplied to one of the pairs of electrical contacts (e.g., the first plug and first electrical contact) while a positive voltage is supplied to the other pair of electrical contacts (e.g., the second plug and second electrical contact).

The first and second electrical contacts 2202 and 2202' can be either of the electrical contacts for the solar panel (i.e., the first and second panel electrical contacts) or the electrical contacts for the solar panel mount (i.e., the first and second mount electrical contacts). The first and second electrical contacts 2302 and 2302' can be either of electrical contacts for the solar panel (i.e., the first and second panel electrical contacts) or the electrical contacts for the solar panel mount (i.e., the first and second mount electrical contact). In some examples, the first and second electrical contacts 2302 and 2302' can be the panel electrical contacts and the first and second electrical contacts 2202 and 2202' can be the mount electrical contacts. In other examples, the first and second electrical contacts 2302 and 2302' can be the first and second mount electrical contacts and the first and second electrical contacts 2202 and 2202' can be the first and second panel electrical contacts. The first and second panel electrical contacts can be operable to respectively electrically connect with the first and second mount electrical contacts.

Similar to as described with respect to the auto-connecting electrical contact system 600 with reference to FIGS. 10-15, the auto-connecting electrical contact system 2100 can be auto-aligning as well as auto-sealing. For example, the housing 2304 of the receptacle 2300 can include an opening 2310 and an interior cavity 2312 formed from a guiding interior surface (e.g., of wall 2308) for both recesses 2301 and 2301'. The housing 2204 of the plug 2200 can include a pair of surfaces (e.g., the first and second protrusions 2201 and 2201') that are operable to be received within the opening 2310. The plug 2200 can be received within the receptacle 2300 upon the solar panel being moved into the installation position. The plug 2200 can be guided within the interior cavity 2312 of the receptacle 2300 such that the pair of electrical contacts 2202 and 2202' are automatically aligned to electrically connect with the pair of electrical contacts 2302 and 2302' upon installing the solar panel within the solar panel mount, such as, for example, upon the solar panel transitioning from the installation position to an installed position within a solar panel mount.

It will be appreciated by the disclosure that auto-alignment of the first and second protrusions 2201 and 2201' within the recesses 2301 and 2301' is accomplished to guide the first and second electrical contacts 2202 and 2202' into electrical contact with the first and second electrical contacts 2302 and 2302'. It is further to be understood that the auto-connecting electrical contact system 2100 can be auto-aligning similar to the multi-axis alignment of the auto-connecting electrical contact systems 600, 750, and 1900 described elsewhere in this disclosure. The auto-connecting electrical contact system 2100 can furthermore be configured to facilitate auto-sealing similar to the auto-sealing of the auto-connecting electrical contact systems 600, 750, and 1900 described elsewhere herein. Accordingly, the auto-connecting electrical contact system 2100 can be configured to facilitate auto-alignment, multi-axis auto-alignment, and auto-sealing similar to auto-connecting electrical contact systems 600, 750, and 1900.

As further illustrated in FIG. 21, the housing 2304 of the receptacle 2300 can form a seal disposed between the solar panel (e.g., one of structure M or structure N) and the solar panel mount (e.g., the other of structure M or structure N), the seal being configured to seal the panel electrical contact (e.g., one of the contact 2202 or 2302), the second panel electrical contact (e.g., one of the contact 2202' or 2302'), the mount electrical contact (e.g., the other of the contact 2202 or 2302), and the second mount electrical contact (e.g., the other of the contact 2202' or 2302') from the environment upon the panel electrical contact and the mount electrical contact being electrically connected to one another and the second panel electrical contact and the second mount electrical contact being electrically connected to one another. As shown in FIG. 21, the housing 2304 can include an upper rim 2309, a middle rim 2311, and a lower rim 2313 similar to receptacle 1000 of FIGS. 18A-19. Also similar to receptacle 1000, the lower rim 2313 can form a seal against the protrusions 2201 and 2201' while the upper rim can form seal against the structure N.

Figure 23:
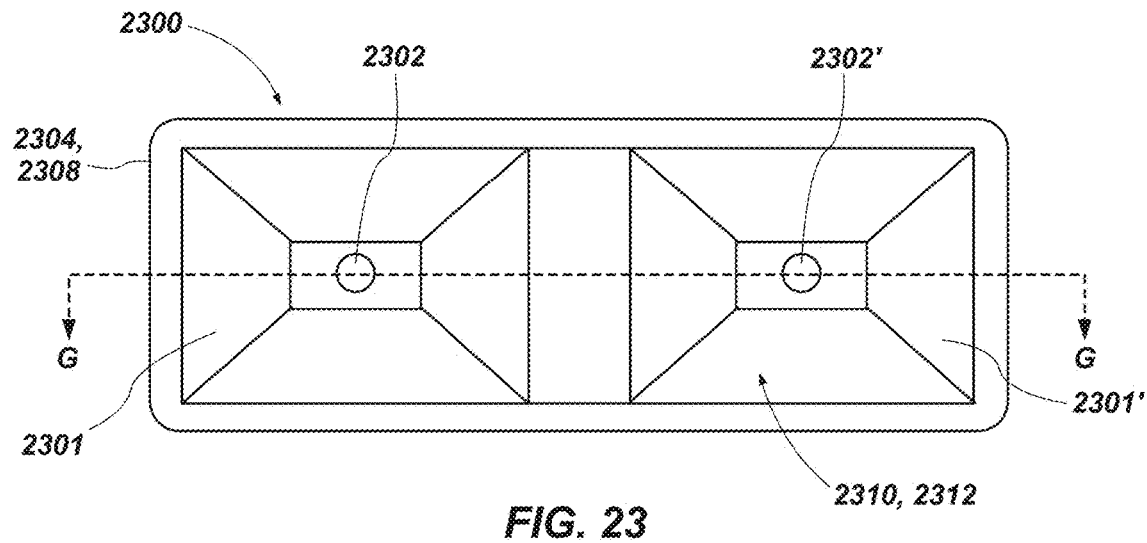
FIG. 23 illustrates a top view of the receptacle of FIG. 21.
Figure 24:
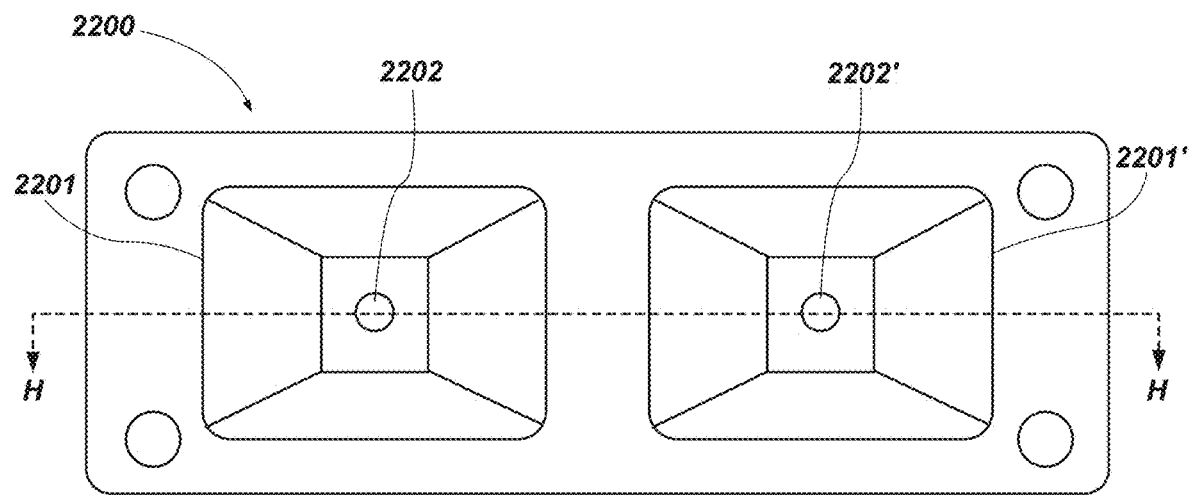
FIG. 24 illustrates a top view of the plug of FIG. 21.

It will be understood by the disclosure that a dual electrical contact system auto-connecting electrical contact system such as that shown in FIGS. 21 and 23 can also be achieved with any electrical contact configurations, auto-connecting electrical contact systems, plugs, receptacles or otherwise illustrated and/or described herein with reference to FIGS. 4A-20C without departing from the disclosure.

Figure 22:
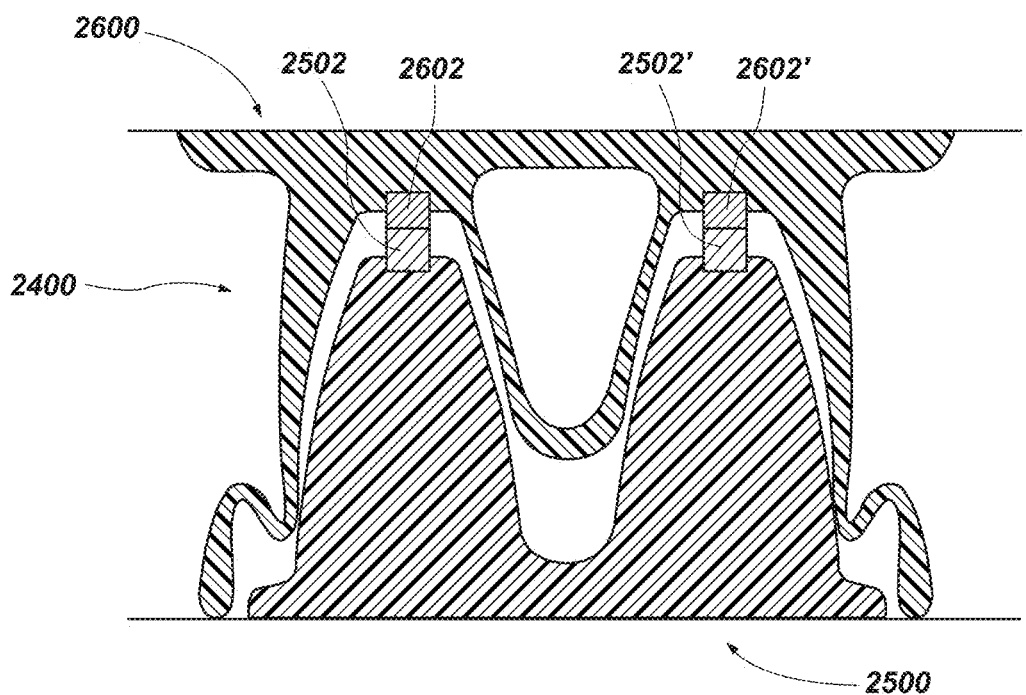
FIG. 22 illustrates an exemplary plug and receptacle of an auto-connecting electrical contact system according to at least one example of the present disclosure.

FIG. 22 illustrates an auto-connecting electrical contact system 2400 including a plug 2500 and a receptacle 2600. The plug 2500 can be an electrical connector of an auto-connecting electrical contact system 2600 for solar panels in accordance with an example of the present disclosure. The auto-connecting electrical contact system 2400 is similar to the auto-connecting electrical contact system 2100 of FIG. 21. However, FIG. 21 illustrates that first and second electrical contacts 2202 and 2202' comprise a protrusion similar to as shown in FIGS. 20A-20C. Furthermore, FIG. 21 illustrates that the first and second electrical contacts 2202 and 2202' comprise recesses similar to as shown in FIGS. 20A-20C. In contrast, first and second electrical contacts 2502 and 2502' and first and second electrical contacts 2602 and 2602' do not include the protrusions and recesses.

In FIGS. 21-24 two electrical contacts are shown for each of the plug 2200 and the receptacle 2300. However, the number of electrical contacts on a solar panel or solar panel mount are not intended to be limited in any way. For example any number n of electrical contacts can be disposed on a solar panel. Furthermore, any number "n" of electrical contacts can be disposed on a solar panel mount. Accordingly, the numbers 1 and 2 merely represent exemplary numbers of n electrical contacts that can be disposed on a solar panel or a solar panel mount. However, any number n of electrical contacts (e.g., 1, 2, 3, 4, 5, and so on) can be disposed on a solar panel and/or solar panel mount without departing from the scope of this disclosure.

Solar Panel Mount

To further describe the present technology, examples are now provided with returning reference to FIGS. 1-3. FIG. 1 illustrates a front elevation view of a solar panel mount 100 in accordance with an example of the present disclosure. As illustrated the solar panel mount 100 can be configured to hold a solar panel in an installed position in which the solar panel is operable to function as intended, namely to receive solar energy and generate electricity. In accordance with the examples of auto-aligning, auto-sealing, and auto-connecting electrical contact systems described herein, the solar panel mount 100 can be used to automate solar panel installation and connection in a single operation. The installation of solar panels into an installed position within solar panel mounts such as mount 100 are described with reference to FIGS. 1-3, 25A-25C, 27, and 28A-28D.

Figure 25A:
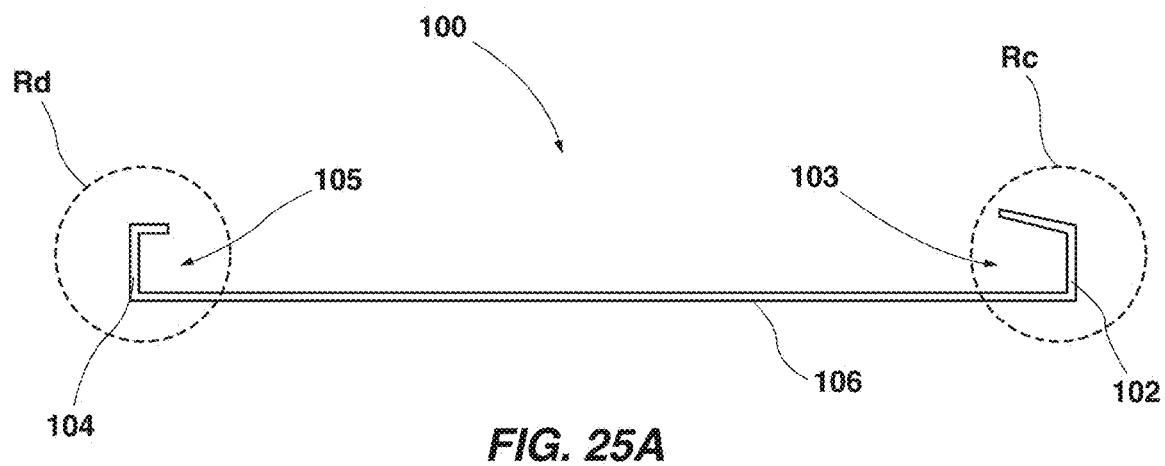
FIG. 25A illustrates a front view of the solar panel mount of FIG. 1.
Figure 25B:
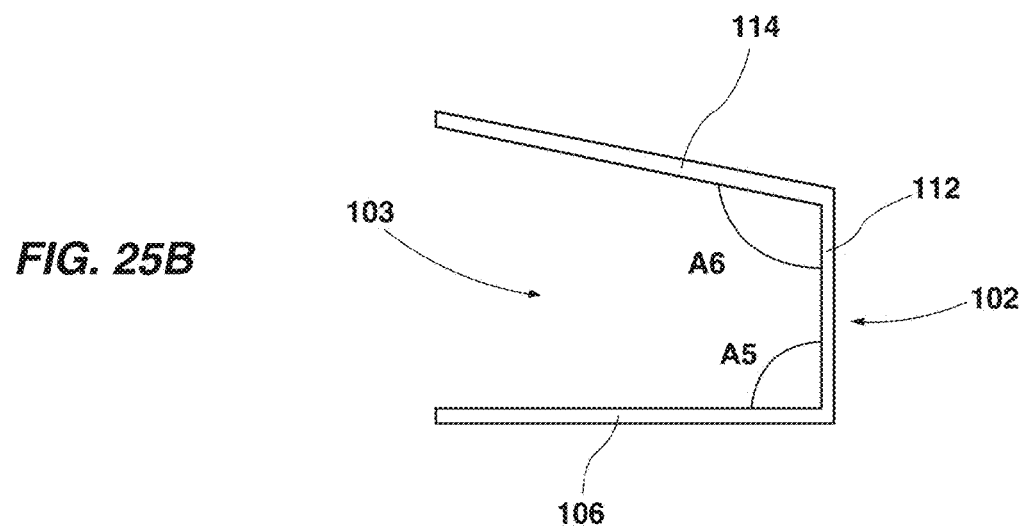
FIG. 25B illustrates a detailed view of a portion of the solar panel mount of FIG. 1 that is shown in region Rd of FIG. 2A.
Figure 25C:
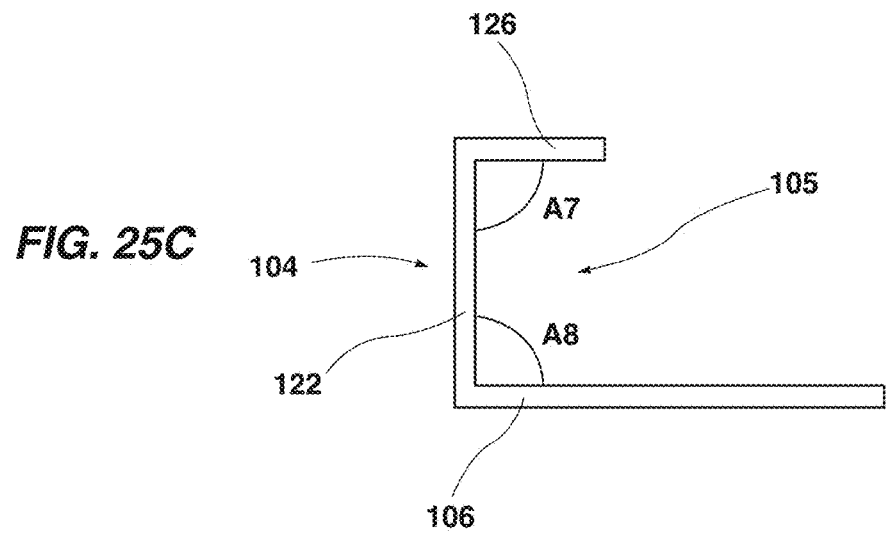
FIG. 25C illustrates a detailed view of a portion of the solar panel mount of FIG. 1 that is shown in region Rc of FIG. 2A.

FIGS. 25A, 25B, and 25C illustrate side and detailed views of solar panel mount 100 comprising the first support structure 102, and the second support structure 104, which can be incorporated into any solar panel mount system discussed herein (e.g., solar panel mount system 300). As illustrated in FIG. 25A, the first support structure 102 of the solar panel mount 100 can be shaped substantially to define the first retaining channel 103 that opens toward the second support structure 104. The second support structure 104 of the solar panel mount 100 can also be shaped substantially to define the second retaining channel 105 that opens toward the first support structure 102. The first support structure 102 and the second support structure 104 can be disposed at opposing positions from each other and can be supported in their respective positions by the panel rest 106 at a distance sufficient to allow a solar panel to be inserted into and secured within and by the solar panel mount 100. The panel rest 106 can be a length that is greater than a length of a solar panel that is to be retained in the solar panel mount 100 in order to fully accommodate a solar panel 200 in the mount 100. In other words, the first and second retaining channels 103 and 105 spaced apart by the panel rest 106 can be spatially positioned apart from, and oriented relative to, one another at a distance greater than a length of the solar panel 200 such that the first retaining channel is positioned to receive the first edge 202 of the solar panel 200 and the second retaining channel is positioned to receive a second edge 204 of the solar panel 200 opposite the first edge to secure the solar panel in the installed position (see FIG. 2D).

FIG. 25B illustrates a detailed view of the first support structure 102 viewed from the side of FIG. 25A. As illustrated, the first support structure 102 can include a back stop 112 extending upward from the panel rest 106 at a first angle A5 and being configured to provide support to the first edge of the solar panel in the solar panel mount 100. The back stop 112 can be configured to have a height that is greater than the first edge 202 of the solar panel 200 so that the first retaining channel 103 can be sized to accommodate the solar panel 200 at the first edge 202. The first support structure 102 can further include an upper guide stop 114 extending from the back stop 112 at a second angle A6 with respect to the back stop 112, and configured to facilitate guidance of the solar panel towards the back stop 112 and within the first retaining channel 103 during installation of the solar panel. Insertion of the solar panel into the first support structure 102 will be described in further detail with reference to other figures.

The back stop 112 can act as a stop for a solar panel being inserted into the solar panel mount 100 to restrict movement of the solar panel within the solar panel mount 100. The back stop 112 can further provide support for other members and structures extending from the back stop structure 112. For example, as shown, the back stop 112 can act as a support for the upper guide stop 114 extending from an upper end of the back stop 112. The back stop 112 can further act as a support for, or be supported by, the panel rest 106 adjoining a lower end of the back stop 112.

The panel rest 106 can extend away from the back stop 112 at an angle A5. As illustrated, the angle A5 can be perpendicular to the back stop 112. However, the disclosure is not intended to limit the angular degree of angle A5 in any way. The angle A5 (e.g., the angle of the panel rest) can correspond to an angle at which the solar panel is supported by the panel rest 106 when the solar panel is in the installed position within the solar panel mount 100. The upper guide stop 114 can extend away from the back stop 112 at an angle A6. As illustrated in FIG. 25B, the angle A6 can be offset from perpendicular (e.g., an obtuse angle) with respect to the back stop 112 and angled away from the panel rest 106 to form an angle that is greater than perpendicular with respect to the back stop 112 and to facilitate installing the solar panel into the solar panel mount 100 at a different angle than the final resting angle of the solar panel when finally installed within the solar panel mount 100. As will be described in further detail below, the, different, open (e.g., wider) quality of the angle A6 compared to the other angles (A5, A7, and A8) described herein allows for the solar panel to be easily inserted into the solar panel mount 100 and then moved to the final installed angle and position. The angle of the upper guide stop 114 allows for a wide range of installation angles. Stated another way, the solar panel being inserted into the first retaining channel 103 can be installed at a wide range of installation angles without binding of the solar panel against the first support structure 102.

The angle A6 of the upper guide stop 114 with respect to the back stop 112 corresponds to an angle having a sufficient size to receive a solar panel at an angle at which the solar panel is inserted in to the first support structure 102, during installation of the solar panel into the solar panel mount 100. In other words, the angle A6 of the guide structure 114 can correspond to an insertion angle of the solar panel. The angle A6 can also be larger than the insertion angle of the solar panel to facilitate insertion of the solar panel into the first support structure 102 during installation. The upper guide stop 114 can be angled toward the back stop 112 to guide an edge of the solar panel toward the back stop 112 to seat the solar panel at the back stop 112.

FIG. 25C shows a side view of the second support structure 104 in greater detail. As illustrated, the second support structure 104 can include a back stop 122 operable to provide support to a second edge of a solar panel. The back stop 122 can be configured to have a height that is greater than the second edge 204 of the solar panel 200 so that the second retaining channel 105 can be sized to accommodate the solar panel 200 at the second edge 204. The back stop 122 can act as a stop and support for an edge of the solar panel being inserted into and secured within the solar panel mount 100 to restrict movement of the solar panel within the solar panel mount 100. The back stop 122 can further provide support for other members and structures extending from the back stop 122. As shown, the back stop 122 can act as a support for or be supported by the panel rest 106 extending from a lower end of the back stop 122. The back stop 122 can further act as a support for an upper stop 126 extending from an upper end of the back stop 122. As illustrated, the upper stop 126 and the panel rest 106 can face each other to provide opposing surfaces to support faces of the solar panel inserted into the second support structure 104. In other words, the upper stop 126 and the panel rest 106 and the back stop 122 can together form a second retaining channel 105 operable to support a second edge of the solar panel opposite to the first edge of the solar panel supported in the first retaining channel 103 of the first support structure 102.

The upper stop 126 and the panel rest 106 can extend away from the back stop 122 at angles A7 and A8, respectively. As illustrated, the angles A7 and A8 can be perpendicular to the back stop 122. However, the disclosure is not intended to limit the angular degree of angles A7 and A8 in any way. Additionally, the angles A7 and A8 can be the same as each other or different.

The angles A7 and A8 can be selected from any range as long as the distance between the upper stop 126 and the panel rest 106 (whether in a relaxed position or in a flexed position in which the upper stop 126 and the panel rest 106 are flexed apart from each other) is sufficient to receive an edge of the solar panel inserted into the solar panel mount 100. Additionally, the size of the back stop 122 can be of any size adequate to support an edge of a solar panel. Both of the angles A7 and A8 can be sized such that the upper stop 126 and the panel rest 106 are parallel to each other and that the upper stop 126 is oriented toward with the upper guide stop 114 of the first support structure 102. Furthermore, the upper guide stop 114 of the first support structure 102 can be offset from parallel to the panel rest 106.

The angles A7 and A8 of the upper stop 126 and the panel rest 106 with respect to the edge support structure 122 can correspond to an angle at which the solar panel rests when installed into the first support structure 102 and the second support structure 104 of the solar panel mount 100. In other words, the angles A7 and A8 of the upper stop 126 and the panel rest 106 can correspond to an installed angle of the solar panel at which the solar panel rests in the installed position. Accordingly, the angles A7 and A8 can be set such that the upper stop 126 is in alignment with, or parallel to the panel rest 106 of the solar panel mount 100. The upper stop 126 and the panel rest 106 can be angled with respect to the edge support structure 122 to facilitate support of an edge of the solar panel by the edge support structure 122 and support of opposing faces of the solar panel by the upper stop 126 and the panel rest 106 when the solar panel is installed in the second support structure 104 of the solar panel mount 100. Alternative configurations of the second support structure 104 also exist. For example, upper stop 126 can be omitted and still have the second support structure 104 provide adequate support for the solar panel therein. The upper stop 126 can provide a retention surface to support and retain the solar panel in the solar panel mount 100. The back stop 112 and the back stop 122 can each act to provide support for an edge of the solar panel within the solar panel mount 100.

Since the first retention channel 103 defined by the first support structure 102 has a much wider opening than the dimension of the edge 202 of the solar panel 200, wide angles of installation are possible for the solar panel 200 to be inserted into the solar panel mount 100. Smaller angles are also possible for the solar panel 200 to be inserted into the first support structure 102. For example, with reference to FIG. 26, exemplary angles of insertion are illustrated with reference to the solar panel 200. The solar panel can be inserted as an example at an orientation of a solar panel 200A in which the solar panel is inserted at an access angle of $\theta_a$ in which the solar panel 200A is substantially aligned with or parallel to the upper guide stop 114. The solar panel can be inserted as an example at an orientation of a solar panel 200B in which the solar panel is inserted at an access angle of $\theta_b$ in which the solar panel 200B is at a steeper angle than $\theta_a$. With the wide opening of the first retention channel 103, the first retention channel 103 can receive the solar panel 200B to the back stop 112 at a plurality of angles as long as the angle of access allows for the solar panel 200B between the upper guide stop 114 and the panel rest 106. Additionally, the solar panel can be inserted as an example at an orientation of a solar panel 200C in which the solar panel is inserted at an access angle of $\theta_c$ in which the solar panel 200C is at a shallower angle than $\theta_a$. With the wide opening of the first retention channel 103, the first retention channel 103 can receive the solar panel 200B to the back stop 112 at a plurality of angles (e.g., angles steeper than, shallower than, or aligned with the upper guide stop) as long as the angle of access allows for the solar panel 200B between the upper guide stop 114 and the panel rest 106.

Figure 26:
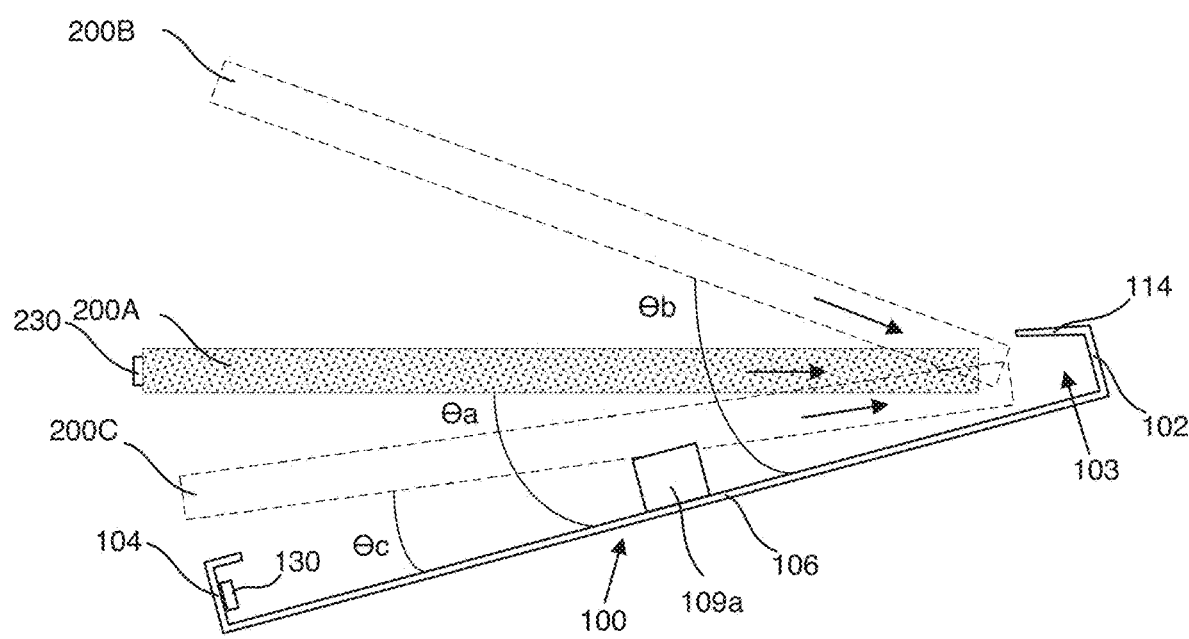
FIG. 26 illustrate various steps and insertion/installation angles of a solar panel being installed in the solar panel mount of FIG. 1.

As further shown in FIG. 26, the solar panel 200 can comprise an auto-connecting electrical contact system (as part of a solar panel mount system, such as solar panel mount system 300) comprising an electrical contact 230 mounted to or otherwise supported by the solar panel 200, such as about an edge of the solar panel 200. Furthermore, the solar panel mount 100 can comprise an auto-connecting electrical contact system (as part of a solar panel mount system, such as solar panel mount system 300) comprising an electrical contact 130 mounted to or otherwise supported by the support structure 104 that is configured to align and electrically connect with the electrical contact 230 on the solar panel. It is to be understood that the electrical contacts 230 and 130 can be configured as or comprise any of the various electrical contacts discussed in accordance with the principles of this disclosure without limitation. For example, contact 230 can be any of the plug, receptacle, panel, or panel mount electrical contacts described anywhere in this disclosure. Similarly, contact 130 can be any of the plug, receptacle, panel, or panel mount electrical contacts described anywhere in this disclosure. For example, a solar panel can have a panel electrical contact that can be any of the configurations B, C, D, and E from FIGS. 4B-4E, any of the configurations W, X, Y, and Z from FIGS. 5B-5E, any of the plugs 400, 700, 900, 900', 2200, and 2500, any of the receptacles 500, 800, 1000, 1000', 2300, and 2600, or any modification or combination of any of the above structures based on the principles described herein. Furthermore, the solar panel mount can have a mount electrical contact that can be any of the configurations B, C, D, and E from FIGS. 4B-4E, any of the configurations W, X, Y, and Z from FIGS. 5B-5E, any of the plugs 400, 700, 900, 900', 2200, and 2500, any of the receptacles 500, 800, 1000, 1000', 2300, and 2600, or any modification or combination of any of the above structures based on the principles described herein. Additionally, the panel and mount electrical contacts together can be configured as any of the examples shown in FIG. 6A-7H, 12, 16C, 19, 20C, 21, or 22.

Each of the electrical contact configurations and combinations described herein include one or more of the auto-aligning, auto-connecting, and auto-sealing features described herein. Particularly, when a solar panel is mounted in a mount, guides 109a and 109b ensure that the solar panel and its electrical contacts are substantially aligned with the electrical contacts of the solar panel mount. Therefore, as shown in FIGS. 2A-2D, as the solar panel 200 is moved from an installation position to an installed position within the mount 100, the electrical contacts 230 and 130 (e.g., any of the auto-connecting electrical contact systems or electrical contacts described herein) at least one of automatically align with each other, automatically connect with each other, or automatically form a seal from the outside environment. Accordingly, whether the solar panel is installed by a solar panel dispensing/installation machine or whether the solar panel is installed by hand by a human, the panel is installed, aligned, connected, and sealed automatically without further interaction or operation by the installation device or user to establish an electrical connection with the installed solar panels. Thereby convenience and efficiency in installing solar panels into solar panel mounts is increased by the principles described herein.

Figure 27A:
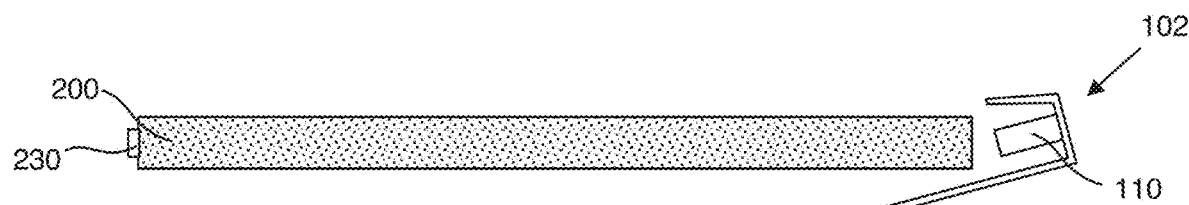
FIGS. 27A-27D illustrate various steps of a solar panel being installed in the solar panel mount of FIG. 1, which in some examples can include biasing members.
Figure 27B:
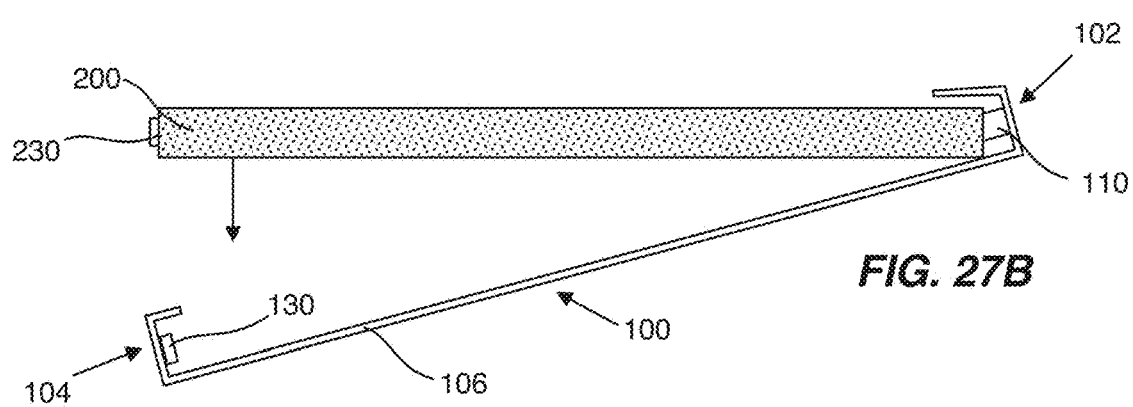
Figure 28A:
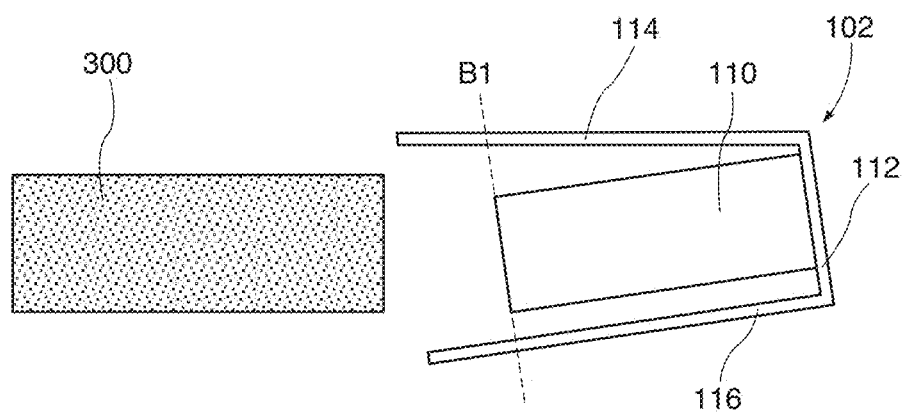
FIGS. 28A-28D illustrate various detailed views of steps of a solar panel being installed in the solar panel mount of FIG. 1 including biasing members.

The support structures described herein can include additional features to facilitate capture, install, and proper retention/support of a solar panel within a solar panel mount. FIGS. 27A-27B illustrate a configuration of a solar panel 200 being installed into panel mount 100, wherein the first support structure 102 comprises one or more biasing structures 110 supported on the first support structure 102 and configured to bias the solar panel 200 toward the second support structure 104, thereby biasing the contacts 230 and 130 into contact with each other. As illustrated in FIG. 27A, the solar panel 200 can be aligned with the first support structure 102 as described elsewhere in this disclosure. A detail view of the panel aligned with the support structure 102 is illustrated in FIG. 28A. In the alignment of the solar panel 200 with the first support structure 102, the biasing member 110 is in an uncompressed, or relaxed state, in which the biasing member 110 is extended to line B1 shown in FIG. 28A.

Figure 28B:
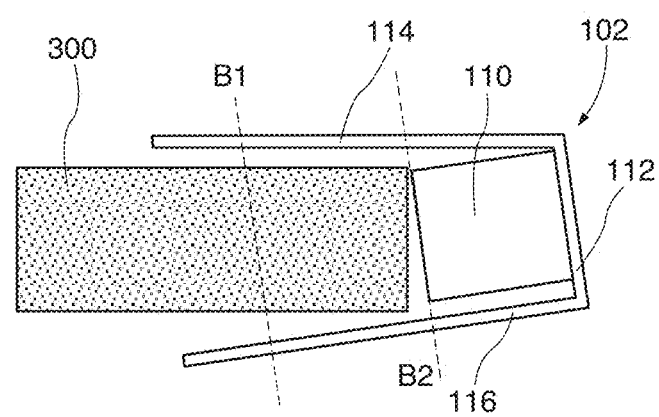

The solar panel 200 can be inserted into the first support structure 102 and brought into contact with the biasing structure 110 as shown in FIG. 27B. A detail view is illustrated in FIG. 28B. As shown, upon installing the solar panel 200 and making contact with the biasing structure 110, this causes the biasing structure 110 to compress from line B1 to line B2. In this state of compression, the biasing structure 110 can be exerting a force on the solar panel 200 due to a spring force of the biasing member trying to return to the relaxed/uncompressed state.

Figure 27C:
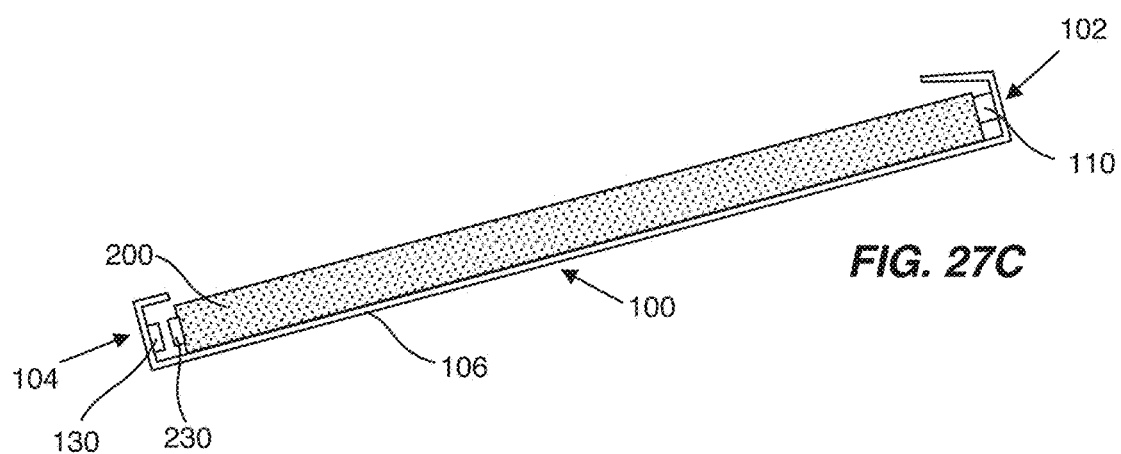
Figure 27D:
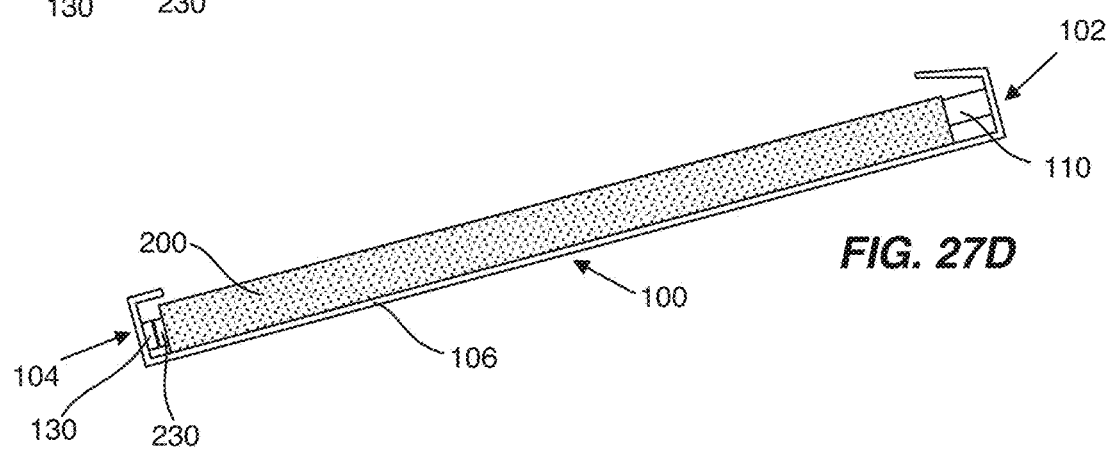
Figure 28C:
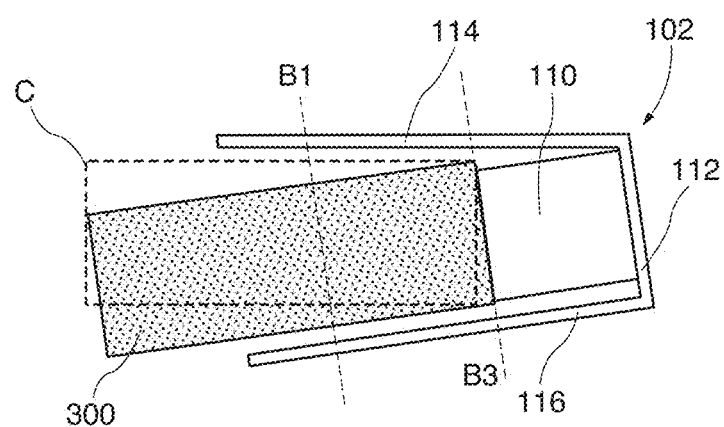
Figure 28D:
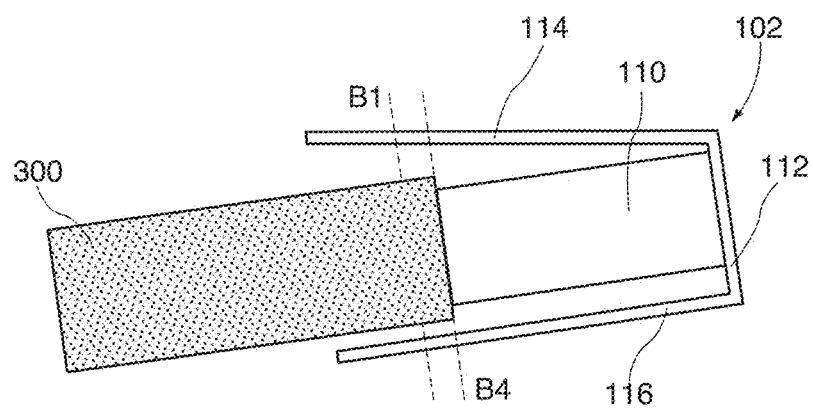

As shown in FIGS. 27C and 28C, the solar panel 200 can be moved from a position C substantially in alignment with the upper guide stop 114 to a position aligned with or resting against the panel rest 106. In this position, the biasing structure 110 can be compressed to a position B3, which can be the same or different from B2. Once the solar panel 200 is aligned with the panel rest of the mount and in between the two support structures 102 and 104, the solar panel 200 can be biased toward the second support structure 104 such that contacts 130 and 230 are biased into contact with each other and the solar panel is biased to the installed position. With the solar panel 200 in the installed position (as shown in FIGS. 27D and 28D), the biasing structure 110 can be at least partially uncompressed to a state in which the biasing structure is aligned with line B4. In this state the biasing structure 110, being partially compressed, can exert a force against solar panel 200 to bias the solar panel 200 toward the second support structure 104 and to bias the contacts 130 and 230 into contact with each other.

The biasing structures can be incorporated with any of the solar panel mounts described herein, or with any of the support structures described herein, in order to bias the solar panel 200 to an installed position. The biasing structure 110 can comprise any configuration or form of any material configured to compress and exert a force and propensity to return to an uncompressed state. For example, the biasing structure 110 can be a coil spring that deflects under an applied load and exerts a force according to known spring mechanics. The biasing member 110 can further comprise a compliant material such as a block or three-dimensional piece of rubber, plastic, polymer, foam, sponge, or other material known to compress or deform under an applied load and to return to a relaxed state on release of the applied load. These examples are not intended to be limiting in any way as those skilled in the art will recognize other devices, objects, systems that can perform a biasing function as intended and discussed herein.

Figure 29:
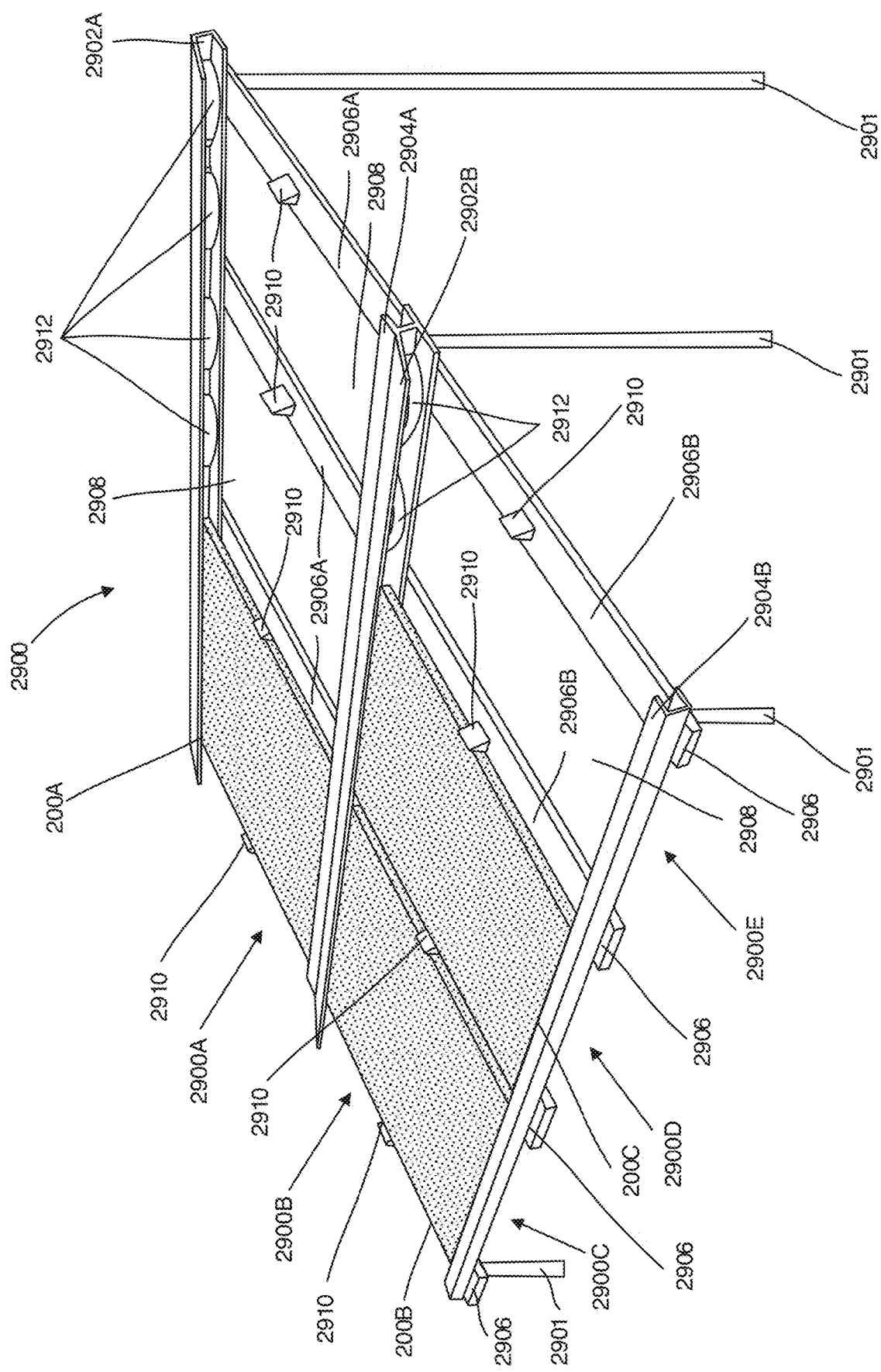
FIG. 29 illustrates a front elevation view of a solar panel mount array system in accordance with an example of the present disclosure.

A plurality of the solar panel mounts described herein and associated mount electrical contacts, in any combination or arrangement, which can be incorporated into any solar panel mount system discussed herein (e.g., solar panel mount system 300), can be combined into a solar panel array frame system. An exemplary array frame system 2900 is illustrated in FIG. 29. The solar panel array frame system 2900 can include one or more solar panel mount supports 2901 configured to support one or more solar panel mounts on an installation surface. The installation surface can be a roof, a parking lot, a field, or any other structure or surface to which a solar panel or solar panel mount can be installed without limitation.

The array frame system 2900 can include a plurality of solar panel mounts 2900A and 2900B. Each solar panel mount can receive, support, and retain one or more solar panels, which can also be incorporated into any solar panel mount system discussed herein (e.g., solar panel mount system 300). For example, as shown in FIG. 29, each of the solar panel mounts 2900A and 2900B are configured to receive one, two, or three solar panels. The solar panel mount 2900A is shown retaining at least one solar panel 300A and has space for an additional two more solar panels. The solar panel mount 2900B is shown retaining at least two solar panels 300B and 300C and has space for an additional solar panel. It will be appreciated that the solar panel mounts 2900A and 2900B are merely exemplary. Solar panel mounts according to this disclosure can be configured to receive any number of solar panels desired. Additionally, the solar panel mounts 2900A and 2900B are configured to hold solar panels in a row. Alternatively, the solar panel mounts can be configured to hold solar panels in a column. Furthermore, as with any of the solar panel mounts described herein, the solar panels can be inserted into the solar panel mounts in either a portrait, landscape, or other orientation without limitation. Any possible orientation of solar panel is intended to be contemplated in conjunction with the principles described herein.

As illustrated in FIG. 29, the solar panel mount 2900A can receive a first row of solar panels in the array system 2900. The solar panel mount 2900B can receive a second row of solar panels in the array system 2900. The solar panel mount 2900A can be arranged parallel to and above the solar panel mount 2900B. In this arrangement, the solar panel mounts 2900A and 2900B can define columns 2900C, 2900D, and 2900E configured to receive a plurality of solar panels in a column configuration. While each column shown has space available to capture two solar panels, it will be appreciated that a column can be configured to receive any number of solar panels desired.

It is to be understood, that while the solar panel mounts 2900A and 2900B are described herein as individual solar panel mounts that can each hold up three solar panels, that the array 2900 shown in FIG. 29 can also be considered to have 6 individual solar panel mounts that each hold one solar panel. In other words, each single solar panel can be held in a single solar panel mount, or each solar panel mount can hold a plurality of solar panels.

The solar panel mounts 2900A and 2900B of the array frame system 1600 can each include structures similar or the same as those described in connection with any of the solar panel mounts described herein The solar panel mounts 2900A and 2900B can comprise an auto-connecting electrical contact system comprising electrical contacts (e.g., mount electrical contacts) supported on any of the support structures 2902A, 2902B, 2904A, and 2904B and configured in accordance with any of the examples described herein. The electrical contacts can be further be configured to contact with corresponding panel electrical contacts, which are also part of the auto-connecting electrical contact system, as supported on the solar panels. The solar panel mount 2900A can include a first support structure 2902A defining, at least in part, a first retaining channel configured to receive and retain a first edge of the solar panel in an installed position. Similar to other solar panel mounts described herein, the first support structure of the solar panel mount 2900A can comprise a back stop configured to provide support to the first edge of the solar panel, and an upper guide stop extending from the back stop at a first angle with respect to the back stop, and configured to facilitate guidance of the solar panel towards the back stop and within the first retaining channel during installation of the solar panel. Additionally, or alternatively, the first support structure 2902A can be configured as any of the support structures described herein.

The solar panel mount 2900A can further comprise a second support structure 2904A positioned offset from the first support structure, and defining, at least in part, a retaining channel configured to receive and retain a second edge of the solar panel in the installed position. The second support structure can be configured as any of the support structures described herein. The first retaining channel and the second retaining channel of the first and second support structures 2902A and 2904A can be spatially positioned and oriented relative to one another to facilitate quick capture of the solar panel, and to secure the solar panel in the installed position, as shown in FIG. 29.

Similar to the solar panel mount 2900A, the solar panel mount 2900B of the array frame system 2900 can include structures similar or the same as those described in connection with all solar panel mounts described herein. For example, the solar panel mount 2900B can include a first support structure 2902B defining, at least in part, a first retaining channel configured to receive and retain a first edge of the solar panel in an installed position. Similar to other solar panel mounts described herein, the first support structure of the solar panel mount 2900B can comprise a back stop configured to provide support to the first edge of the solar panel, and an upper guide stop extending from the back stop at a first angle with respect to the back stop, and configured to facilitate guidance of the solar panel towards the back stop and within the first retaining channel during installation of the solar panel. Additionally, or alternatively, the first support structure 2902B can be configured as any of the support structures described herein.

The solar panel mount 2900B can further comprise a second support structure 2904B positioned offset from the first support structure, and defining, at least in part, a retaining channel configured to receive and retain a second edge of the solar panel in the installed position. The second support structure can be configured as any of the support structures described herein. The first retaining channel and the second retaining channel of the first and second support structures 2902B and 2904B can be spatially positioned and oriented relative to one another to facilitate quick capture of the solar panel, and to secure the solar panel in the installed position, as shown in FIG. 29.

The array frame system 2900 can further include one or more panel rests 2906 configured to support one or more of the plurality of solar panel mounts 2900A and 2900B. Each of the panel rests 2906 can comprise one or more seating surfaces 2906A and 2906B configured to receive and support a lower surface of one or more solar panels in the installed position. As illustrated in FIG. 29, each of the panel rests 2900 can be a single elongated member that supports both of the first panel mount 2900A and the second panel mount 2900B. Alternatively, the first and second panel mounts 2900A and 2900B can include their own separate panel rests that are separate from the panel rests of the other solar panel mount. Alternatively, a single monolithic panel rest can be used to support both of the first and second solar panel mounts 2900A and 2900B. Apertures 2908 can be left between or formed in the panel rests 2906 in order to provide access for people or other elements (e.g., a retention latch) to the solar panels disposed in the array frame system 2900.

The first and second panel mounts 2900A and 2900B can further comprise one or more dividers 2910 supported by or extending from the one or more panel rests 2906. In one example, as shown, the dividers 2910 can extend upward from the panel rests 2906 to provide spacing between solar panels disposed on the array frame system 2900. In alternative embodiments, dividers 2910B can span an entire length of the solar panel mount 2920 from a first support structure 2922 to a second support structure 2924. Furthermore, dividers 2910C can be segmented and of any number, whether one, two, or more, and disposed along a side of solar panel mount 2930. The dividers 2910C can be placed within the retention channels of the first and/or second support structures 2932 and 2934 to provide division and spacing of the solar panels in the supporting structures. In addition to providing division and spacing of solar panels, the dividers 2910, 2910B, 2910C, or of any other shape or configuration, can function as guides that provide lateral constraint and guidance to the solar panels as the solar panels are being installed and moved into place within solar panel mounts during installation as described herein.

The first support structures 2902A and 2902B can comprise one or more biasing members or springs 2912 configured to bias solar panels installed into the solar panel mounts (e.g., into the second support structures). The springs 2912 can be of any kind of biasing member or spring described herein that is configured to bias a solar panel in the solar panel mounts 2900A and 2900B. The array frame system 2900 can be made of any of the solar panel mounts and configurations disclosed herein and in any combination thereof. The solar panel array frame system 2900 can further include any additional elements described herein (e.g., friction inducing material, set screws, leaf springs, biasing springs).

It is to be understood that additional modifications are within the scope of this disclosure. For example, in any of the solar panel mounts described herein, the mount electrical contacts (e.g., 130) can be disposed on either of the first support structure (e.g., 102) or the second support structure (e.g., 104) of a solar panel mount. Additionally, the electrical contact's respective housings themselves (e.g., any of the plugs or receptacles described with reference to FIGS. 8A-12 and 16A-22) can be made of an elastic material or include a spring to apply a biasing force to bias electrical contacts of the panel and the mount into electrical contact with each other. It will be understood from the disclosure that the plugs and mounts described herein that are configured to apply a biasing force can be used in place of, or in addition to, the biasing structures 110 and/or 2912 to apply a biasing force to a solar panel to improve retention of the solar panel within the solar panel mount. Accordingly, the electrical contact systems, plugs, and receptacles described herein can serve the dual purposes of biasing electrical contacts into contact with each other and biasing the solar panel to be retained in a solar panel mount.

Figure 30A:
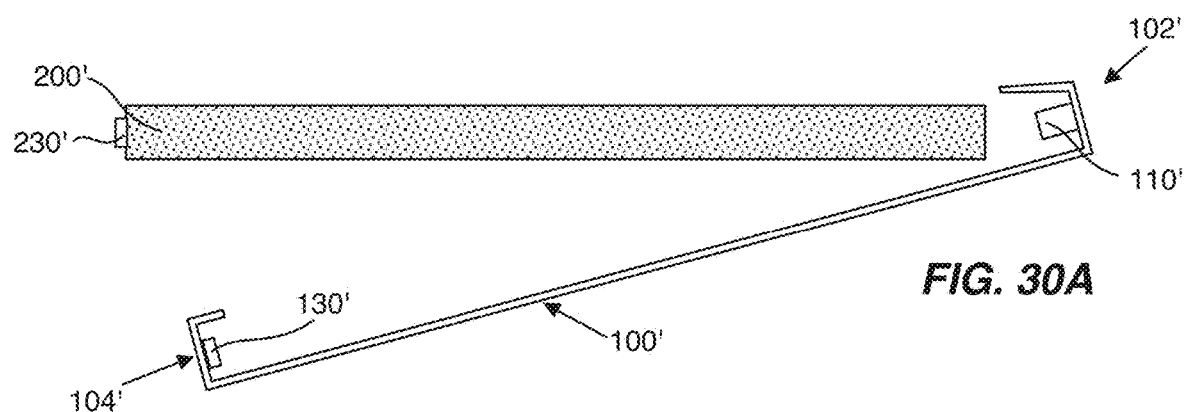
FIGS. 30A-30B illustrate various detailed views of steps of a solar panel being installed in the solar panel mount of FIG. 1 including biasing members.

For example, FIG. 30A illustrates a configuration of a solar panel 200' being mounted in a solar panel mount 100', which can be incorporated into any solar panel mount system discussed herein (e.g., solar panel mount system 300). As shown, the solar panel 200' can include a panel electrical contact 230' on a bottom end thereof. The solar panel mount 100' can include a first support structure 102' and a second support structure 104'. The second support structure 104' can be configured to receive the bottom end of the solar panel 200' and can include an electrical contact 130' thereon corresponding to the electrical contact 230' on the solar panel 200'. Therefore, as the solar panel 200' is installed into the solar panel mount 100', the electrical contact 230' can align and connect with the electrical contact 130'. Gravity may be used to slide the contacts 130' and 230' into contact with each other or the mount 100' can include a biasing structure 110' that exerts a biasing force on the solar panel 200' to bias electrical contact 230' of the solar panel 200' into contact with the electrical contact 130' of the solar panel mount 130'. It is to be understood that the electrical contacts 130' and 230' can be any of the plugs, receptacles, face connecting electrical contacts, or any other electrical contacts described herein without limitation.

Figure 30B:
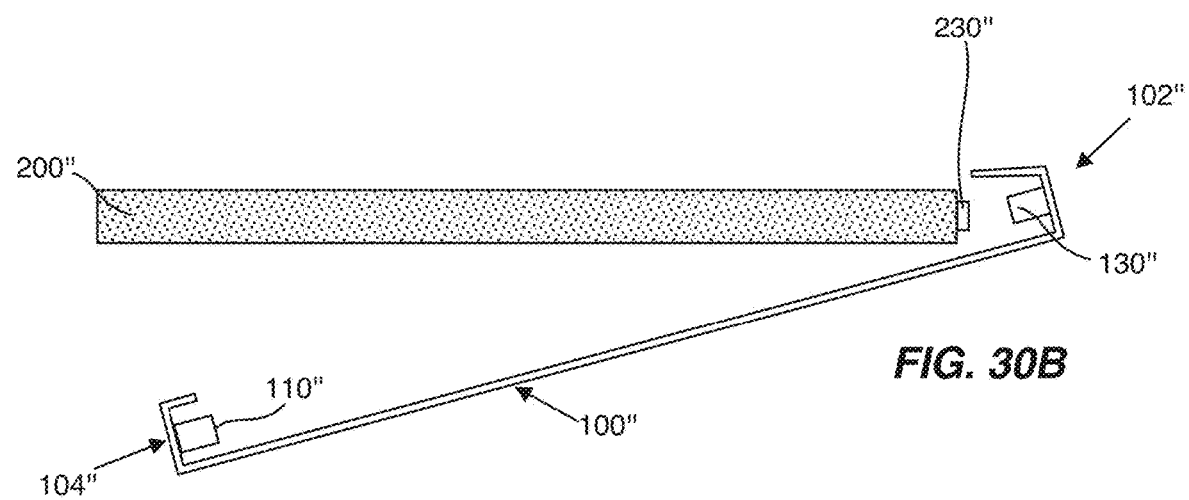

In an alternative example shown in FIG. 30B, a configuration of a solar panel 200" being mounted in a solar panel mount 100" can have electrical contacts 130" and 230" on opposite edges and ends of the solar panel mount 100" and the solar panel 200" when compared to the configuration of FIG. 30A including the solar panel mount 100'. As shown, the solar panel 200" can include a panel electrical contact 230" on an upper end thereof. The solar panel mount 100" can include a first support structure 102" and a second support structure 104". The second support structure 104" can be configured to receive the bottom end of the solar panel 200". The first support structure 102" can include an electrical contact 130" thereon corresponding to the electrical contact 230" on the solar panel 200". Therefore, as the solar panel 200" is installed into the solar panel mount 100", the electrical contact 230" can align and connect with the electrical contact 130". The mount 100" can include a biasing structure 110" that exerts a biasing force on the solar panel 200" to bias electrical contact 230" of the solar panel 200" into contact with the electrical contact 130" of the solar panel mount 130". It is to be understood that the electrical contacts 130' and 230' can be any of the plugs, receptacles, face connecting electrical contacts, or any other electrical contacts described herein without limitation. For example, the electrical contacts 230" and 130" can be any of the elastic plugs or receptacles that exert a biasing force to bias the solar panel 200" toward the second support structure 104", thereby biasing the contacts 130" and 230" into electrical contact with each other.

Figure 31A:
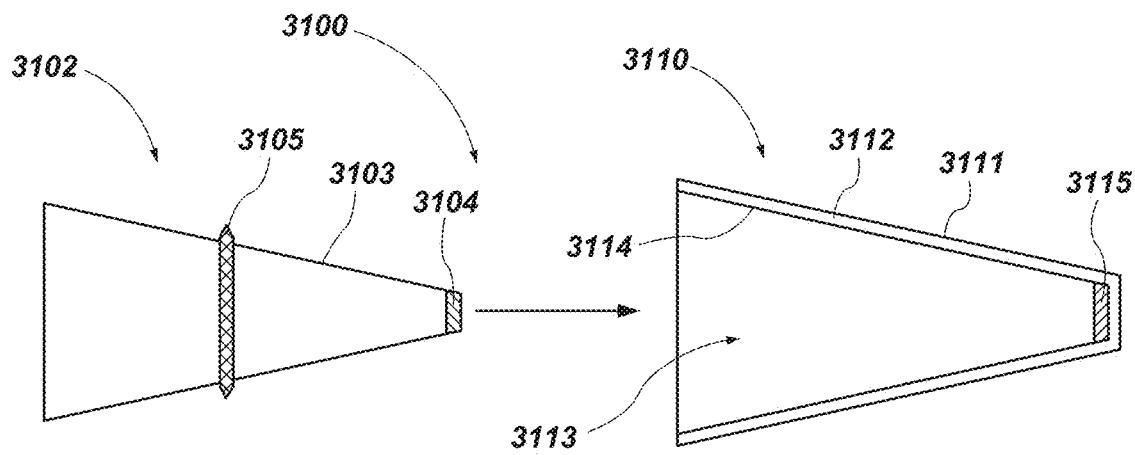
FIGS. 31A and 31B illustrate a view of an exemplary receptacle connecting an exemplary plug according to at least one example of the present disclosure.
Figure 31B:
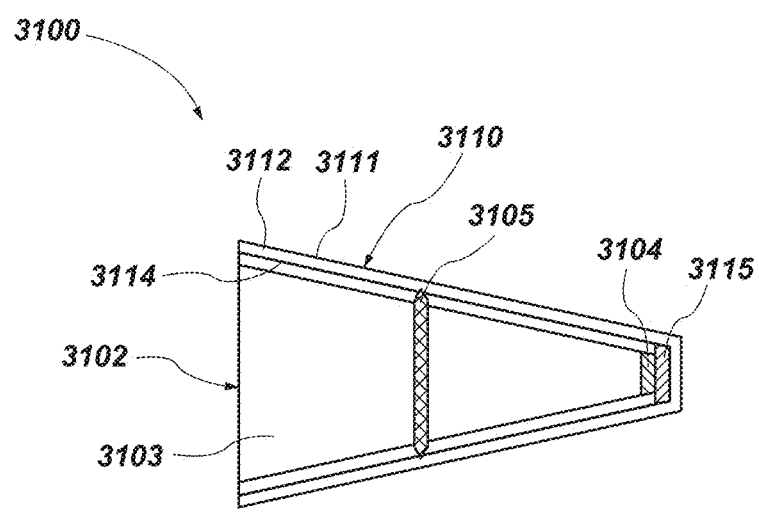

Additional configurations of auto-connecting electrical contact systems are also within the scope of this disclosure. For example, with reference to FIG. 31A-FIG. 31B, an additional auto-connecting electrical contact system 3100 is illustrated. As shown in FIG. 31A, the auto-connecting electrical contact system 3100 can include a rigid plug 3102 and a rigid receptacle 3110 sized such that the plug 3102 can be received within the receptacle 3110. The plug 3102 can include a housing 3103 and the receptacle 3110 can include a housing 3111. One or more of the housings 3103 and 3111 can be made of a rigid material. The plug 3102 can further include an electrical contact 3104 at the end thereof, and a seal 3105 surrounding an outer perimeter of the housing 3103. The seal 3105 can be made of a compliant, elastic, or other deformable material suitable to create a water-tight seal without limitation.

The receptacle 3110 can include a wall 3112 defining an inner cavity 3113. The wall 3112 can include an inner surface 3114. The receptacle 3110 can further include an electrical contact 3115 disposed in the inner cavity 3113. As shown in FIG. 30B, the rigid plug 3102 can be inserted into the inner cavity 3113 of the receptacle 3110. The electrical contact 3104 of the plug 3102 can contact the electrical contact 3115 of the receptacle 3110. In addition, the seal 3105 can contact the inner surface 3114 of the wall 3112 of the receptacle 3110 to seal off the electrical contacts 3115 and 3104 from an outside environment. One or both of the plug 3102 and the receptacle 3110 can be made of a rigid material. Alternatively, one of the plug 3102 and the receptacle 3110 can be made of a rigid material while the other is made of a compliant or elastic material.

Figure 32A:
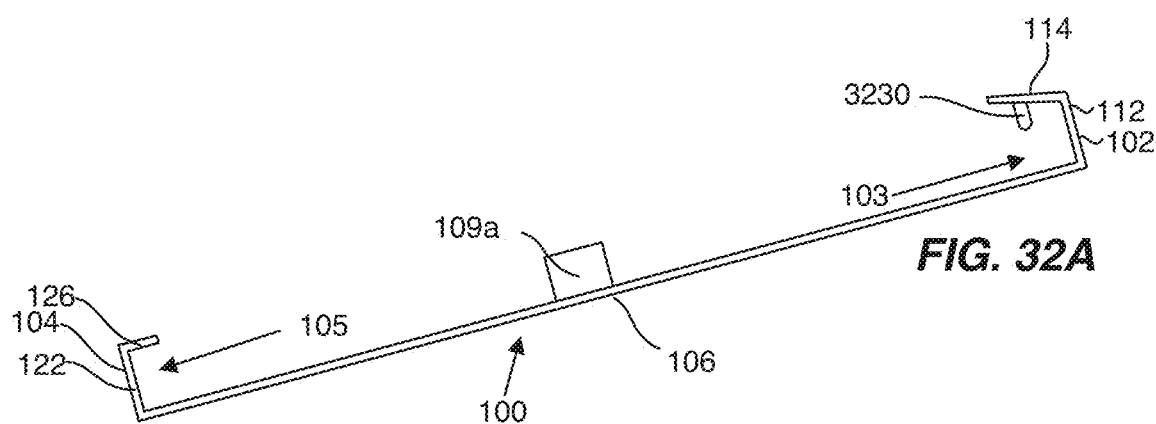
FIGS. 32A-32D illustrate side views of exemplary solar panel mounts in accordance with examples of the present disclosure.
Figure 32B:
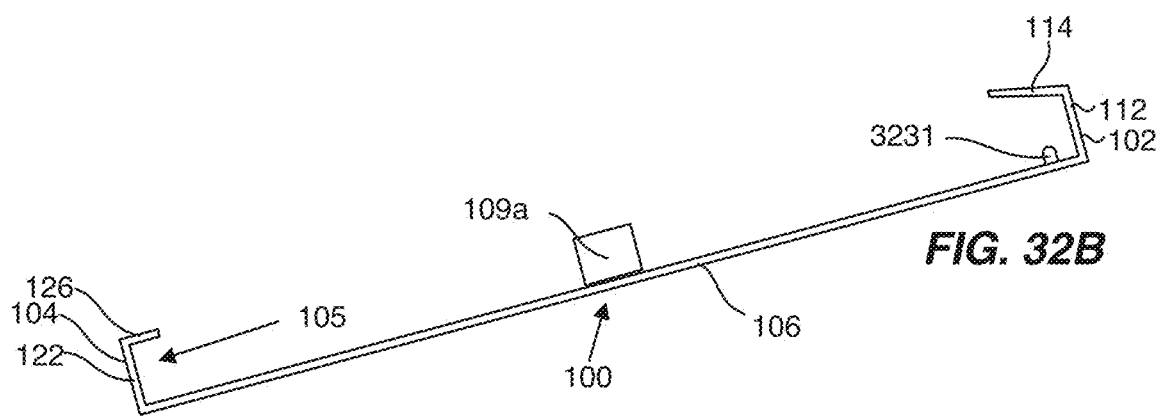
Figure 32C:
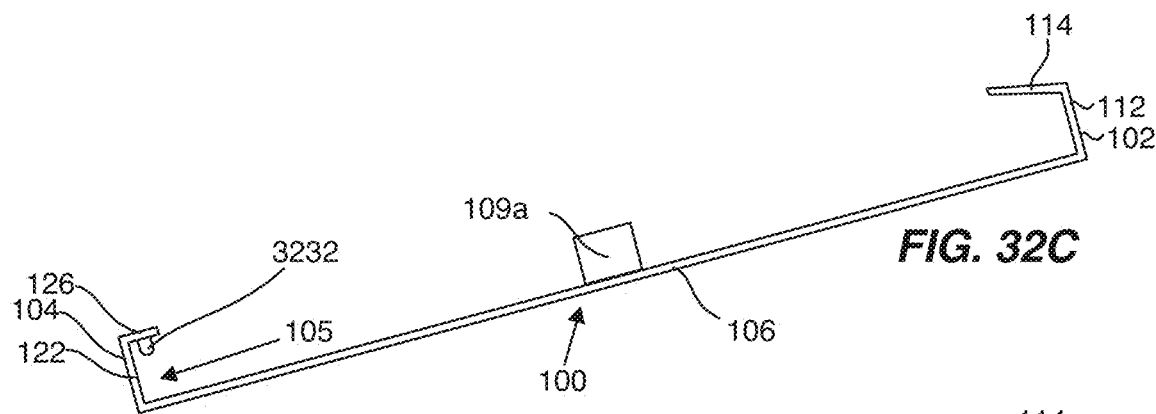
Figure 32D:
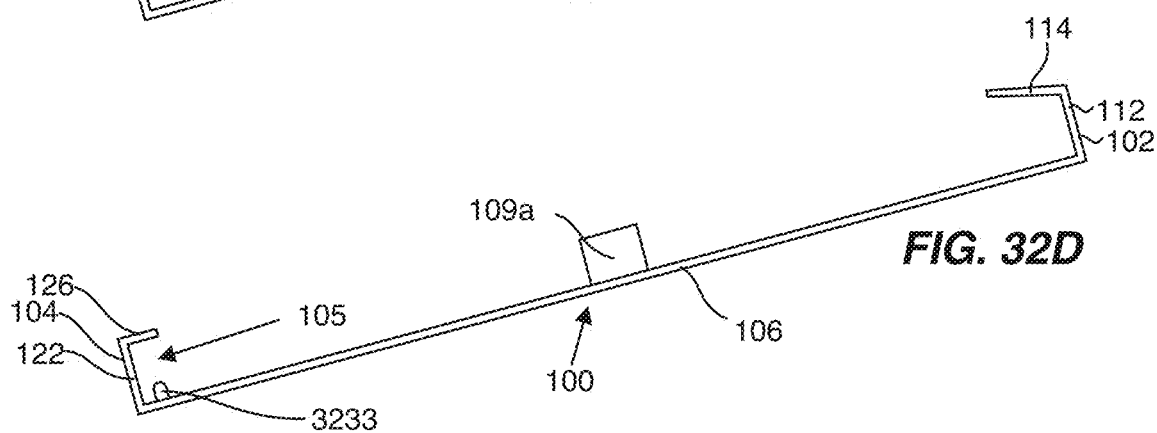

In alternative configurations of a solar panel mount 100 shown in FIGS. 32A-32D, which can be incorporated into any solar panel mount system discussed herein (e.g., solar panel mount system 300), an electrical contact 3230 can be disposed on the first support structure 102 or the second support structure 104. Instead of being disposed on the back stops 112 or 122 of the first support structure 102 and the second support structure 104, the electrical contact 3230 can be disposed on the upper guide stop 114 of the first support structure 102 of the solar panel mount 100 as shown in FIG. 32A. In an alternative configuration shown in FIG. 32B, an electrical contact 3231 can be disposed on the panel rest 106 within the first channel 103 defined by the first support structure 102. In another alternative configuration, an electrical contact 3232 can be disposed on the upper guide stop 126 of the second support structure 104 of the solar panel mount 100 as shown in FIG. 32C. In an alternative configuration shown in FIG. 32D, an electrical contact 3233 can be disposed on the panel rest 106 within the second channel 105 defined by the second support structure 102.

Figure 33A:
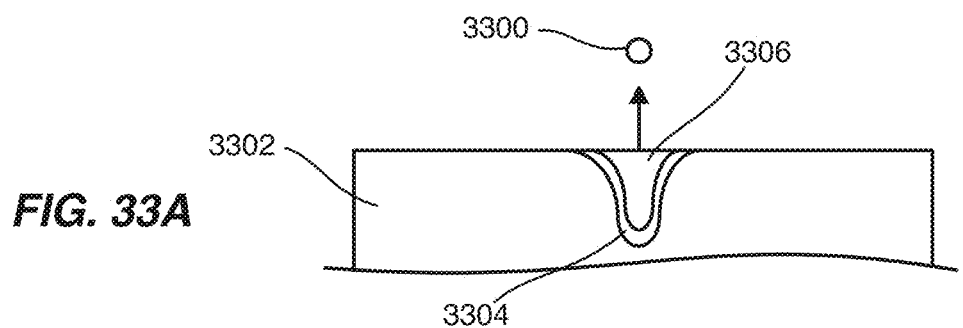
FIGS. 33A-33D illustrate exemplary solar panel mount electrical contacts and panel electrical contacts in accordance with examples of the present disclosure.
Figure 33B:
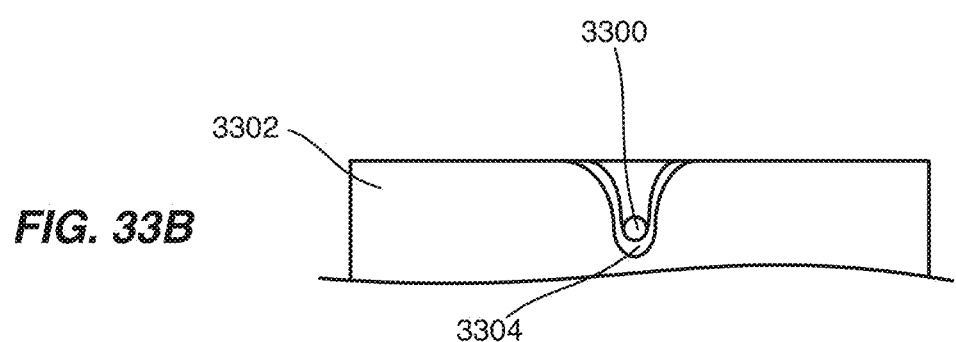

Exemplary configurations of the electrical contacts 3230, 3231, 3232, and 3233 and corresponding solar panel electrical contacts are illustrated in FIGS. 33A-33D, which can be incorporated into any solar panel mount system discussed herein (e.g., solar panel mount system 300). It is to be understood that any of the electrical contacts 3230, 3231, 3232, and 3233 can be configured as any of the mount electrical contacts 3300 and 3301 shown in FIGS. 33A-33D. FIG. 33A illustrates a top view of protrusion electrical contact (e.g., in place of any of electrical contacts 3230, 3231, 3232, and 3233 shown in FIG. 33A-33D). As shown, a solar panel 3302 can include an electrical contact 3304 formed in an upper or lower surface thereof. The upper surface of the solar panel 3302 can be a surface of the solar panel 3302 configured to face the upper guide stops 114 and 126 of the solar panel mount 100 when the solar panel 3302 is installed in the mount. The lower surface of the solar panel 3302 can be a surface configured to face the panel rest 106 of the solar panel mount 100 when the solar panel 3302 is installed in the mount 100. The electrical contact 3304 can define a recess 3306 formed in the upper or lower surface of the solar panel 3302. As shown, the recess 3306 can have a wide opening configured to receive electrical contact 3300 therein and can guide the electrical contact 3300 to the electrical contact 3304 of the solar panel. FIG. 33B illustrates the electrical contact 3300 of the mount in contact with the electrical contact 3304 of the panel. The electrical contacts 3302 and 3304 are brought into contact with each other by moving the solar panel from an installation position to an installed position within the mount (e.g., mount 100).

Figure 33C:
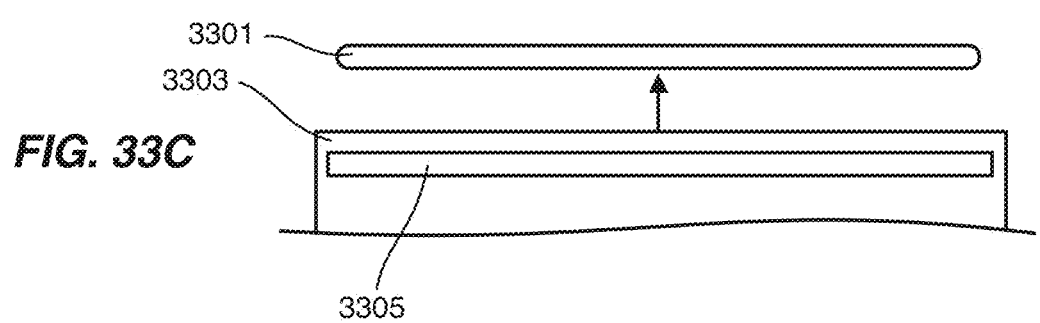
Figure 33D:
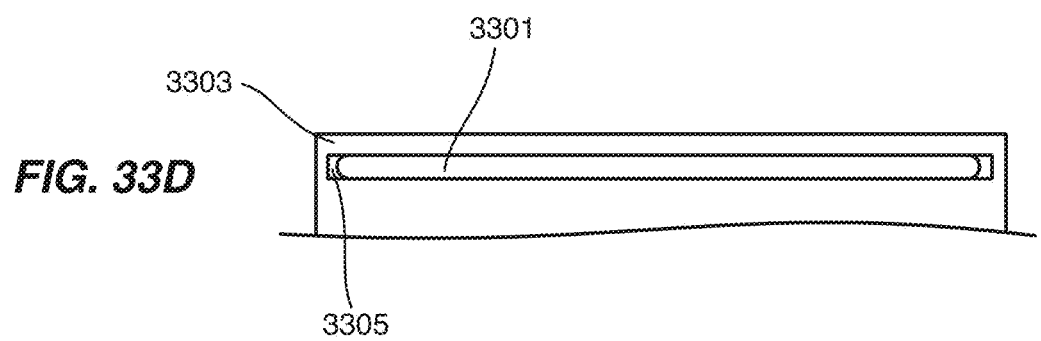
Figure 34:
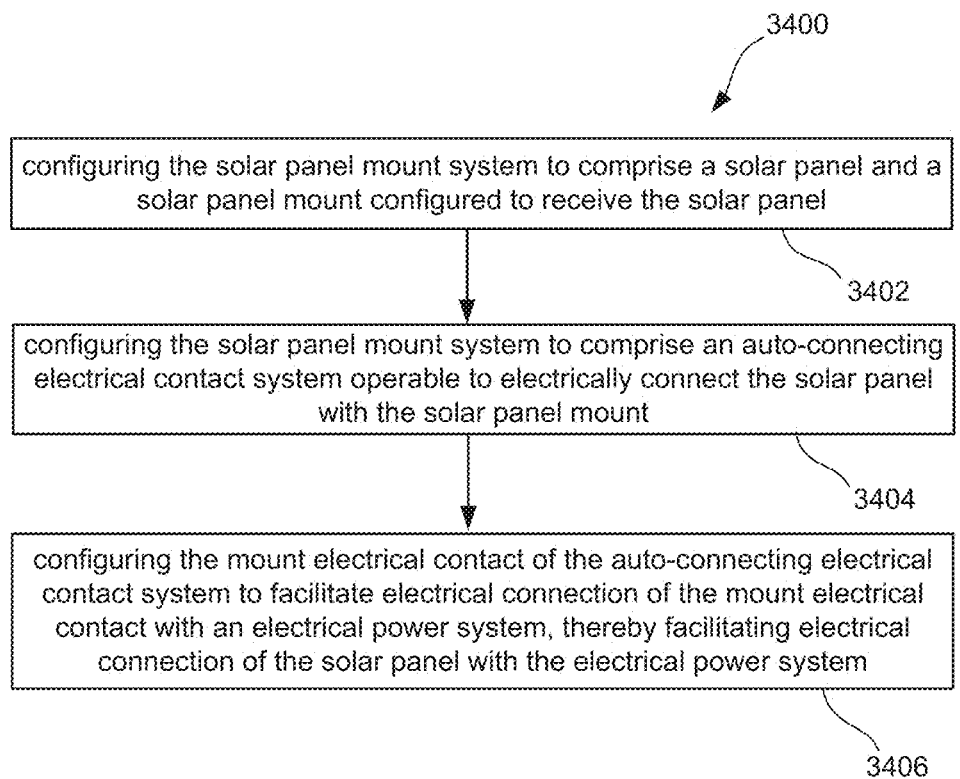
FIG. 34 illustrates a method of configuring a solar panel mount system for electrically connecting an installed solar panel with an electrical power system.

The electrical contact on the mount can be any shape or configuration without limitation. For example, a mount electrical contact 3301 (e.g., in place of any of electrical contacts 3230, 3231, 3232, and 3233) can be elongated as shown in FIG. 33C to extend a length of the corresponding solar panel 3303. As shown, a solar panel 3303 can include an electrical contact 3305 formed in an upper or lower surface thereof. The upper surface of the solar panel 3303 can be a surface of the solar panel 3303 configured to face the upper guide stops 114 and 126 of the solar panel mount 100 when the solar panel 3303 is installed in the mount. The lower surface of the solar panel 3303 can be a surface configured to face the panel rest 106 of the solar panel mount 100 when the solar panel 3303 is installed in the mount 100. The solar panel 3303 can include an electrical contact 3305 corresponding to the mount electrical contact 3301. The mount electrical contact 3301 can be a protrusion and the electrical contact 3305 can be a groove or flat electrical contact configured to receive and contact electrical contact 3301. FIG. 33D illustrates the electrical contact 3301 overlapping and in contact with the electrical contact 3305. The electrical contacts 3301 and 3305 are brought into contact with each other by moving the solar panel from an installation position to an installed position within the mount (e.g., mount 100).

Further described herein is a method 3400 of configuring a solar panel mount system, such as the various solar panel mount systems described above, for electrically connecting an installed solar panel with an electrical power system through an electrical connection with a solar panel mount. The method can include a step 3402 of configuring the solar panel mount system to comprise a solar panel and a solar panel mount configured to receive the solar panel. The method can further include a step 3404 of configuring the solar panel mount system to comprise an auto-connecting electrical contact system operable to electrically connect the solar panel with the solar panel mount. The auto-connecting electrical contact system can include a panel electrical contact coupled to the solar panel and a mount electrical contact coupled to the solar panel mount. The panel electrical contact can be operable to electrically connect with the mount electrical contact, or to a panel electrical contract of an adjacent solar panel. The method 3400 can further comprise configuring the solar panel mount, the solar panel, and the auto-connecting electrical contract system to comprise any of the elements discussed above with respect to FIGS. 1-33D. The method 3400 can further comprise a step 3406 of configuring the mount electrical contact of the auto-connecting electrical contact system to facilitate electrical connection of the mount electrical contact with an electrical power system, thereby facilitating electrical connection of the solar panel with the electrical power system.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein can be combined with other embodiments or features described herein, this disclosure should be read to describe any such combinations that would be practicable by one of ordinary skill in the art. The use of "or" in this disclosure should be understood to mean non-exclusive or, e.g., "and/or," unless otherwise indicated herein.

Furthermore, the described features, structures, or characteristics can be combined in any suitable manner in one or more examples. In the preceding description, numerous specific details were provided, such as examples of various configurations to provide a thorough understanding of examples of the described technology. It will be recognized, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A solar panel comprising:
 a photovoltaic cell;
 a support structure in support of the photovoltaic cell; and
 an auto-connecting electrical contact system comprising a panel electrical contact coupled to the support structure, and operable to electrically connect to a mount electrical contact of a corresponding solar panel mount in an installed position,
 wherein the panel electrical contact comprises a plug comprising a housing in support of a plug electrical contact,
 wherein the plug further comprises a spring operable with the housing of the plug, the spring being operable to supply a biasing force to bias the plug electrical contact away from the support structure and into electrical connection with a receptacle electrical contact, the biasing force being sufficient to form a seal at an interface between the plug and the receptacle.

2. The solar panel of claim 1, wherein the housing of the plug comprises a surface configuration having a receptacle interface.

3. The solar panel of claim 1, wherein the housing of the plug comprises one or more materials configured to deform under an applied load.

4. The solar panel of claim 1, wherein the housing of the plug comprises an elastic material configured to deform under an applied load and to be biased to return to an undeformed state.

5. The solar panel of claim 1, wherein the seal is formed at an interface between a housing of the receptacle and the housing of the plug.

6. The solar panel of claim 1, wherein the plug comprises a spring encapsulated in the housing of the plug, wherein the spring is operable to supply a biasing force to the plug electrical contact, and to the housing of the plug.

7. The solar panel of claim 6, wherein a portion of the spring is exposed, and comprises the plug electrical contact, such that the spring is in electrical communication with the receptacle electrical contact and an electrically conductive pathway of the solar panel.

8. The solar panel of claim 1, wherein the panel electrical contact comprises a plug comprising a housing in support of a pair of plug electrical contacts.

9. The solar panel of claim 1, wherein the panel electrical contact comprises a receptacle comprising a housing in support of a receptacle electrical contact.

10. The solar panel of claim 9, wherein the housing of the receptacle comprises an opening and an interior cavity formed from a guiding interior surface that facilitates multi-axis alignment between the receptacle and a connecting plug.

11. The solar panel of claim 10, wherein the guiding interior surface comprises a plug interface.

12. The solar panel of claim 9, wherein the housing of the receptacle comprises one or more materials configured to deform under an applied load.

13. The solar panel mount of claim 9, wherein the housing of the receptacle is operable to form a seal with a housing of a connected plug.

14. The solar panel mount of claim 9, wherein the receptacle comprises an elastic material configured to deform under an applied load and biased to return to an undeformed state.

15. The solar panel of claim 1, wherein the panel electrical contact comprises a receptacle comprising a housing in support of a pair of receptacle electrical contacts.

16. The solar panel of claim 1, wherein the auto-connecting electrical contact system further comprises a plurality of panel electrical contacts, including the panel electrical contact, coupled to the support structure.

17. The solar panel of claim 1, further comprising a conductive pathway electrically connecting the panel electrical contact to the photovoltaic cell of the solar panel.

18. The solar panel of claim 1, further comprising a seal disposed about the panel electrical contact, the seal being configured to seal the panel electrical contact from an environment upon the panel electrical contact connecting with the mount electrical contact.

19. The solar panel of claim 1, wherein the panel electrical contact comprises a recess configured to engage with a protrusion.

20. The solar panel of claim 1, wherein the panel electrical contact comprises a protrusion configured to engage with a recess.

21. The solar panel of claim 1, wherein the auto-connecting electrical contact system comprises a mounting assembly operable to couple the panel electrical contact to the support structure.

22. A solar panel mount system comprising the solar panel of claim 1, and a solar panel mount, wherein the solar panel is configured to be supported in an installed position within the solar panel mount.

23. The solar panel mount system of claim 22, wherein the auto-connecting electrical contact system further comprises the mount electrical contact coupled to the solar panel mount, and wherein the mount electrical contact is electrically connected with the panel electrical contact with the solar panel in the installed position.

* * * * *